United States Patent
Bouve

(10) Patent No.: US 9,677,903 B2
(45) Date of Patent: *Jun. 13, 2017

(54) SELECTED DRIVER NOTIFICATION OF TRANSITORY ROADTRIP EVENTS

(71) Applicant: TRIP ROUTING TECHNOLOGIES, LLC., Hilton Head Island, SC (US)

(72) Inventor: Thomas Bouve, Annapolis, MD (US)

(73) Assignee: TRIP ROUTING TECHNOLOGIES, LLC., Hilton Head Island, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 14/886,810

(22) Filed: Oct. 19, 2015

(65) Prior Publication Data

US 2016/0040999 A1 Feb. 11, 2016

Related U.S. Application Data

(63) Continuation of application No. 14/225,579, filed on Mar. 26, 2014, now Pat. No. 9,175,973.

(51) Int. Cl.
*G01C 21/36* (2006.01)
*G01C 21/34* (2006.01)
(Continued)

(52) U.S. Cl.
CPC ..... *G01C 21/3682* (2013.01); *G01C 21/3484* (2013.01); *G01C 21/3605* (2013.01);
(Continued)

(58) Field of Classification Search
CPC .... G01C 21/36; G01C 21/26; G01C 21/3688; G01C 21/3611; G01C 21/3632; G01C 21/3679; G01C 21/3682; G06F 17/30241; G05D 1/0272; G08G 1/096827; G08G 1/0969
(Continued)

(56) References Cited

U.S. PATENT DOCUMENTS 5,272,638 A 12/1993 Martin et al.
5,648,768 A 7/1997 Bouve
(Continued)

OTHER PUBLICATIONS

International Search Report and Written Opinion for PCT/US15/18414 dated Jun. 18, 2015.

*Primary Examiner* — Jerrah Edwards
*Assistant Examiner* — Majdi Alsomiri
(74) *Attorney, Agent, or Firm* — Sughrue Mion, PLLC; David P. Emery

(57) ABSTRACT

An event search area for searching for events of interest to the user, including a maximum off-route crow-fly distance from a user in-route travel path is established. One or more events of interest to the user is determined based on the established event search area. Each of the off-route travel paths that connect each event to the user in-route travel path is also determined. An off-route driving time and a total in-route and off-route driving time from the user in-route travel path to the applicable determined event and back are computed. The one determined off-route travel path that has a minimum computed off-route driving time and the one or more of the determined off-route travel paths that has a minimum computed total in-route and off-route driving time are identified and notified to the user.

32 Claims, 52 Drawing Sheets

(51) Int. Cl.
*G08G 1/01* (2006.01)
*G08G 1/0967* (2006.01)
*G05D 1/02* (2006.01)
*G08G 1/0969* (2006.01)
*G06F 17/30* (2006.01)

(52) U.S. Cl.
CPC ...... *G01C 21/3611* (2013.01); *G01C 21/3617* (2013.01); *G01C 21/3679* (2013.01); *G01C 21/3691* (2013.01); *G01C 21/3697* (2013.01); *G08G 1/012* (2013.01); *G08G 1/0129* (2013.01); *G08G 1/0141* (2013.01); *G08G 1/09675* (2013.01); *G08G 1/096716* (2013.01); *G08G 1/096775* (2013.01); *G01C 21/3688* (2013.01); *G05D 1/0272* (2013.01); *G06F 17/30241* (2013.01); *G08G 1/0969* (2013.01)

(58) Field of Classification Search
USPC .................................. 701/25, 26, 426, 538
See application file for complete search history.

(56) References Cited

U.S. PATENT DOCUMENTS

| | | | |
|---|---|---|---|
| 6,216,086 | B1 | 4/2001 | Seymour et al. |
| 6,282,489 | B1 | 8/2001 | Bellesfield et al. |
| 6,591,188 | B1 | 7/2003 | Ohler |
| 6,611,754 | B2 | 8/2003 | Klein |
| 6,615,130 | B2 | 9/2003 | Myr |
| 6,622,084 | B2 | 9/2003 | Cardno et al. |
| 6,622,087 | B2 | 9/2003 | Anderson |
| 6,772,213 | B2 | 8/2004 | Glorikian |
| 6,865,476 | B1 | 3/2005 | Jokerst, Sr. |
| 6,973,384 | B2 | 12/2005 | Zhao et al. |
| 7,007,228 | B1 | 2/2006 | Carro |
| 7,082,365 | B2 | 7/2006 | Sheha et al. |
| 7,263,664 | B1 | 8/2007 | Daughtrey |
| 7,271,742 | B2 | 9/2007 | Sheha et al. |
| 7,302,343 | B2 | 11/2007 | Beatty |
| 7,411,493 | B2 | 8/2008 | Smith |
| 7,565,239 | B2 | 7/2009 | De Silva et al. |
| 7,617,042 | B2 | 11/2009 | Horvitz et al. |
| 7,698,062 | B1 | 4/2010 | McMullen et al. |
| 7,777,648 | B2 | 8/2010 | Smith et al. |
| 7,822,426 | B1 | 10/2010 | Wuersch |
| 7,822,546 | B2 | 10/2010 | Lee |
| 7,835,859 | B2 | 11/2010 | Bill |
| 7,903,029 | B2 | 3/2011 | Dupray |
| 7,920,962 | B2 | 4/2011 | D'Andrea et al. |
| 7,983,835 | B2 | 7/2011 | Lagassey |
| 8,014,939 | B2 | 9/2011 | Sheha et al. |
| 8,082,096 | B2 | 12/2011 | Dupray |
| 8,265,817 | B2* | 9/2012 | Tener ..................... F41G 7/34 701/23 |
| 8,374,785 | B2* | 2/2013 | McBurney ............ G01C 21/12 701/472 |
| 8,527,121 | B2 | 9/2013 | Tate, Jr. |
| 8,880,336 | B2 | 11/2014 | van Os et al. |
| 9,151,614 | B2 | 10/2015 | Poppen et al. |
| 2001/0029425 | A1 | 10/2001 | Myr |
| 2002/0068585 | A1 | 6/2002 | Chan et al. |
| 2002/0165665 | A1 | 11/2002 | Kim |
| 2003/0018428 | A1 | 1/2003 | Knockeart et al. |
| 2003/0036848 | A1 | 2/2003 | Sheha et al. |
| 2003/0040946 | A1 | 2/2003 | Sprenger et al. |
| 2003/0171870 | A1 | 9/2003 | Gueziec |
| 2004/0068364 | A1 | 4/2004 | Zhao et al. |
| 2004/0198386 | A1 | 10/2004 | Dupray |
| 2004/0230348 | A1 | 11/2004 | Mann et al. |
| 2005/0023524 | A1 | 2/2005 | Beatty |
| 2005/0085998 | A1 | 4/2005 | Bless et al. |
| 2006/0030983 | A1 | 2/2006 | Bautista |
| 2006/0095199 | A1 | 5/2006 | Lagassey |
| 2006/0148488 | A1 | 7/2006 | Syrbe |
| 2006/0229807 | A1 | 10/2006 | Sheha et al. |
| 2006/0265489 | A1 | 11/2006 | Moore |
| 2007/0005240 | A1 | 1/2007 | Oumi et al. |
| 2007/0061266 | A1 | 3/2007 | Moore et al. |
| 2007/0087756 | A1 | 4/2007 | Hoffberg |
| 2007/0208503 | A1 | 9/2007 | Harnsberger |
| 2007/0219706 | A1 | 9/2007 | Sheynblat |
| 2007/0273558 | A1 | 11/2007 | Smith et al. |
| 2007/0287473 | A1 | 12/2007 | Dupray |
| 2008/0046169 | A1 | 2/2008 | Beatty |
| 2008/0046174 | A1 | 2/2008 | Johnson |
| 2008/0046298 | A1 | 2/2008 | Ben-Yehuda et al. |
| 2008/0048890 | A1 | 2/2008 | Sheha et al. |
| 2008/0051985 | A1 | 2/2008 | D'Andrea et al. |
| 2008/0243564 | A1 | 10/2008 | Busch et al. |
| 2008/0281518 | A1 | 11/2008 | Dozier et al. |
| 2008/0294662 | A1 | 11/2008 | Chen |
| 2009/0150062 | A1 | 6/2009 | Han |
| 2009/0157307 | A1 | 6/2009 | Krumm et al. |
| 2009/0157664 | A1 | 6/2009 | Wen |
| 2009/0160676 | A1 | 6/2009 | Stehle et al. |
| 2009/0276151 | A1 | 11/2009 | Bucchieri |
| 2010/0030471 | A1* | 2/2010 | Watanabe .............. G01C 21/26 701/494 |
| 2010/0088012 | A1 | 4/2010 | O'Sullivan et al. |
| 2010/0118025 | A1 | 5/2010 | Smith et al. |
| 2010/0235285 | A1 | 9/2010 | Hoffberg |
| 2010/0248746 | A1 | 9/2010 | Saavedra et al. |
| 2010/0305842 | A1 | 12/2010 | Feng |
| 2010/0317420 | A1 | 12/2010 | Hoffberg |
| 2011/0004513 | A1 | 1/2011 | Hoffberg |
| 2011/0021234 | A1 | 1/2011 | Tibbitts et al. |
| 2011/0022304 | A1 | 1/2011 | Lee |
| 2011/0043377 | A1 | 2/2011 | McGrath et al. |
| 2011/0106429 | A1 | 5/2011 | Poppen et al. |
| 2011/0143719 | A1 | 6/2011 | Jung et al. |
| 2011/0160988 | A1 | 6/2011 | Rogers |
| 2011/0169660 | A1 | 7/2011 | Gueziec |
| 2011/0171950 | A1 | 7/2011 | Ivanchikov |
| 2011/0184642 | A1 | 7/2011 | Rotz et al. |
| 2011/0196601 | A1 | 8/2011 | Miura et al. |
| 2011/0208417 | A1 | 8/2011 | Fink et al. |
| 2011/0224892 | A1 | 9/2011 | Speiser |
| 2011/0227724 | A1 | 9/2011 | Zhao et al. |
| 2011/0273568 | A1 | 11/2011 | Lagassey |
| 2011/0282573 | A1 | 11/2011 | Ting |
| 2011/0300894 | A1 | 12/2011 | Roberts et al. |
| 2011/0320275 | A1 | 12/2011 | O'Sullivan et al. |
| 2012/0089326 | A1 | 4/2012 | Bouve |
| 2012/0184293 | A1 | 7/2012 | Li et al. |
| 2013/0204525 | A1 | 8/2013 | Pfeifle |
| 2013/0297207 | A1 | 11/2013 | Mason et al. |
| 2013/0322702 | A1 | 12/2013 | Piemonte et al. |
| 2013/0345975 | A1 | 12/2013 | Vulcano et al. |

\* cited by examiner

|    |         |        |
|----|---------|--------|
| 12 | LAT12   | LONG12 |
| 13 | LAT13   | LONG13 |
| 14 | LAT14   | LONG14 |
| 15 | LAT15   | LONG15 |
| 16 | LAT16   | LONG16 |
| 17 | LAT17   | LONG17 |
| 18 | LAT18   | LONG18 |
| 19 | LAT19   | LONG19 |
| 20 | LAT20   | LONG20 |
| 21 | LAT21   | LONG21 |
| 22 | LAT22   | LONG22 |
| 23 | LAT23   | LONG23 |
| 24 | LAT24   | LONG24 |
| 25 | LAT25   | LONG25 |
| 26 | LAT26   | LONG26 |
| 27 | LAT27   | LONG27 |
| 28 | LAT28   | LONG28 |
| 29 | LAT29   | LONG29 |

|    |    |    |          |           |
|----|----|----|----------|-----------|
| L  | 19 | 25 | MPLAT-L  | MPLONG-L  |
| M  | 24 | 25 | MPLAT-M  | MPLONG-M  |
| N  | 24 | 26 | MPLAT-N  | MPLONG-N  |
| O  | 20 | 21 | MPLAT-O  | MPLONG-O  |
| P  | 3  | 15 | MPLAT-P  | MPLONG-P  |
| Q  | 22 | 29 | MPLAT-Q  | MPLONG-Q  |
| R  | 17 | 22 | MPLAT-R  | MPLONG-R  |
| S  | 16 | 17 | MPLAT-S  | MPLONG-S  |
| T  | 21 | 28 | MPLAT-T  | MPLONG-T  |
| U  | 21 | 27 | MPLAT-U  | MPLONG-U  |
| V  | 15 | 16 | MPLAT-V  | MPLONG-V  |
| W  | 21 | 22 | MPLAT-W  | MPLONG-W  |
| X  | 8  | 12 | MPLAT-X  | MPLONG-X  |
| Y  | 8  | 9  | MPLAT-Y  | MPLONG-Y  |
| Z  | 2  | 9  | MPLAT-Z  | MPLONG-Z  |
| AA | 4  | 16 | MPLAT-AA | MPLONG-AA |
| BB | 10 | 17 | MPLAT-BB | MPLONG-BB |
| CC | 5  | 10 | MPLAT-CC | MPLONG-CC |

|    |         |
|----|---------|
| L  | 727     |
| M  | 727     |
| N  | 727     |
| O  | 722     |
| P  | 726     |
| Q  | 724,725 |
| R  | 724,725,726 |
| S  | 724,726 |
| T  | 722     |
| U  | 726     |
| V  | 726     |
| W  | 726     |
| X  | 722,723 |
| Y  | 723     |
| Z  | 723     |
| AA | 724     |
| BB | 725     |
| CC | 725     |

FIG. 6 CONTINUED
PRIOR ART

| SEGMENT DRIVER TABLE 6642 ||
|---|---|
| SEGMENT | DRIVERS |
| A | 723 |
| B | 723 |
| C | 723 |
| D | 722,723,727 |
| E | 727 |
| F | 727 |
| G | 722 |
| H | 722 |
| I | 727 |
| J | 722 |
| K | 722,727 |
| L | 727 |
| M | 727 |
| N | 727 |
| O | 722 |
| P | 726 |
| Q | 724,725 |
| R | 724,725,726 |
| S | 724,726 |
| T | 722 |
| U | 726 |
| V | 726 |
| W | 726 |
| X | 722,723 |
| Y | 723 |
| Z | 723 |
| AA | 724 |
| BB | 725 |
| CC | 725 |

| ROUTE TABLE 6641 |||||||||||
|---|---|---|---|---|---|---|---|---|---|---|
| DRIVER ID | CONTACT | EVENT PREFERENCE CATEGORY ||| ROUTE SEGMENT PATH SEQUENCE ||||||
| | | HOTEL DISCOUNT $ | ROAD EMERGENCIES | SCENIC VIEWS | | | | | | |
| 722 | 312-555-4321 | 1 | 1 | 1 | G | H | X | D | K | J | O | T |
| 723 | 312-555-5562 | 1 | 1 | 0 | Z | Y | X | D | C | B | A |
| 724 | 312-555-7854 | 0 | 1 | 1 | AA | S | R | Q | | | |
| 725 | 312-555-0266 | 1 | 1 | 1 | CC | BB | R | Q | | | |
| 726 | 312-555-4933 | 0 | 1 | 1 | U | W | R | S | V | P | |
| 727 | 312-555-7344 | 1 | 1 | 0 | N | M | L | K | D | E | F | I |

| NODE COORDINATE TABLE 6643 | | |
|---|---|---|
| NODE | LATITUDE | LONGITUDE |
| 1 | LAT1 | LONG1 |
| 2 | LAT2 | LONG2 |
| 3 | LAT3 | LONG3 |
| 4 | LAT4 | LONG4 |
| 5 | LAT5 | LONG5 |
| 6 | LAT6 | LONG6 |
| 7 | LAT7 | LONG7 |
| 8 | LAT8 | LONG8 |
| 9 | LAT9 | LONG9 |
| 10 | LAT10 | LONG10 |
| 11 | LAT11 | LONG11 |
| 12 | LAT12 | LONG12 |
| 13 | LAT13 | LONG13 |
| 14 | LAT14 | LONG14 |
| 15 | LAT15 | LONG15 |
| 16 | LAT16 | LONG16 |
| 17 | LAT17 | LONG17 |
| 18 | LAT18 | LONG18 |
| 19 | LAT19 | LONG19 |
| 20 | LAT20 | LONG20 |
| 21 | LAT21 | LONG21 |
| 22 | LAT22 | LONG22 |
| 23 | LAT23 | LONG23 |
| 24 | LAT24 | LONG24 |
| 25 | LAT25 | LONG25 |
| 26 | LAT26 | LONG26 |
| 27 | LAT27 | LONG27 |
| 28 | LAT28 | LONG28 |
| 29 | LAT29 | LONG29 |

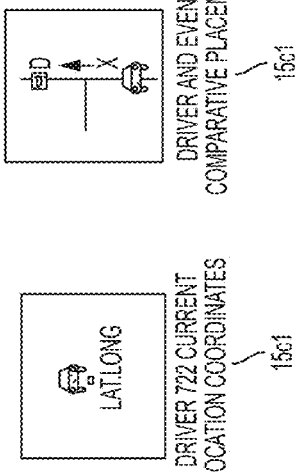

ROUTE TABLE 6641

| DRIVER ID | CONTACT | EVENT PREFERENCE CATEGORY ||| ROUTE SEGMENT PATH SEQUENCE |||||||||
|---|---|---|---|---|---|---|---|---|---|---|---|---|
| | | HOTEL DISCOUNT $ | ROAD EMERGENCIES | SCENIC VIEWS | | | | | | | | |
| 722 | 312-555-4321 | 1 | 1 | 1 | G | H | X | D | K | J | T | |
| 723 | 312-555-5562 | 1 | 1 | 0 | Z | Y | X | D | C | B | O | |
| 724 | 312-555-7854 | 0 | | 1 | AA | S | R | Q | | | A | |
| 725 | 312-555-0266 | 1 | 1 | 1 | CC | BB | R | Q | | | | |
| 726 | 312-555-4933 | 0 | 1 | 1 | U | W | R | S | V | P | | |
| 727 | 312-555-7344 | 1 | | 0 | N | M | L | K | D | E | F | |

SEGMENT MIDPOINT TABLE 6644

| SEGMENT | ANODE | BNODE | MIDPOINT LATITUDE | MIDPOINT LONGITUDE |
|---|---|---|---|---|
| A | 18 | 23 | MPLAT-A | MPLONG-A |
| B | 13 | 18 | MPLAT-B | MPLONG-B |
| C | 13 | 14 | MPLAT-C | MPLONG-C |
| D | 12 | 14 | MPLAT-D | MPLONG-D |
| E | 11 | 12 | MPLAT-E | MPLONG-E |
| F | 7 | 11 | MPLAT-F | MPLONG-F |
| G | 6 | 7 | MPLAT-G | MPLONG-G |
| H | 7 | 8 | MPLAT-H | MPLONG-H |
| I | 1 | 7 | MPLAT-I | MPLONG-I |
| J | 19 | 20 | MPLAT-J | MPLONG-J |
| K | 14 | 19 | MPLAT-K | MPLONG-K |
| L | 19 | 25 | MPLAT-L | MPLONG-L |
| M | 24 | 25 | MPLAT-M | MPLONG-M |
| N | 24 | 26 | MPLAT-N | MPLONG-N |
| O | 20 | 21 | MPLAT-O | MPLONG-O |
| P | 3 | 15 | MPLAT-P | MPLONG-P |
| Q | 22 | 29 | MPLAT-Q | MPLONG-Q |
| R | 17 | 22 | MPLAT-R | MPLONG-R |
| S | 16 | 17 | MPLAT-S | MPLONG-S |
| T | 21 | 28 | MPLAT-T | MPLONG-T |
| U | 21 | 27 | MPLAT-U | MPLONG-U |
| V | 15 | 16 | MPLAT-V | MPLONG-V |
| W | 21 | 22 | MPLAT-W | MPLONG-W |
| X | 8 | 12 | MPLAT-X | MPLONG-X |
| Y | 8 | 9 | MPLAT-Y | MPLONG-Y |
| Z | 2 | 9 | MPLAT-Z | MPLONG-Z |
| AA | 4 | 16 | MPLAT-AA | MPLONG-AA |
| BB | 10 | 17 | MPLAT-BB | MPLONG-BB |
| CC | 5 | 10 | MPLAT-CC | MPLONG-CC |

FIG. 15c CONTINUED
PRIOR ART

AVERAGE SPEED TO TRAVEL 300 FEET

| MILES PER HOUR | TIME (IN SECONDS) |
|---|---|
| 80 | 2.6 |
| 70 | 2.9 |
| 60 | 3.4 |
| 50 | 4.1 |
| 40 | 5.1 |
| 30 | 6.8 |
| 20 | 10.2 |
| 10 | 20.4 |

FIG. 24c

SELECTED DRIVER NOTIFICATION OF TRANSITORY ROADTRIP EVENTS

CROSS-REFERENCE TO RELATED APPLICATIONS

The present application is a continuation of U.S. patent application Ser. No. 14/225,579 filed Mar. 26, 2014, the entire contents of which is incorporated herein by reference.

FIELD OF THE INVENTION

The present Invention is related generally to information technology and more particularly to a technique for generating trip routing for travelers and informing travelers, such as highway drivers, of transitory commercial, emergency, recreational and/or other events that occur along or near their trip routes.

BACKGROUND OF THE INVENTION

For decades, information concerning enroute events, most commonly traffic congestion, has been provided by radio station announcements to drivers as well as other listeners in the broadcast vicinity. The traffic information consisted primarily of events that could impact drivers, such as traffic congestion and accidents. Typically, the event location, such as road name and intersection, would be included so that those driving or considering driving along the affected road would be informed and have the option of changing their driving plans. The radio station would receive information about traffic jams and accidents, from traffic reporting helicopters that overfly the roads, and recently, also from reports by drivers themselves who observe traffic events first-hand and report same to the radio station via cell phone. With the advent of Global Positioning System (GPS) navigation and smartphone technology, the available traffic information has become more accurate, useful and varied.

One proposed methodology for utilizing these new technologies includes an in-vehicle device which determines both the location of the vehicle and the road on which the vehicle is located. Such device also receives road-specific event information from a centralized service. The in-vehicle device then filters the road-specific information and determines the relevance of the information for the driver based on current vehicle road location and/or vicinity. What a driver receives, however, includes event information which would not necessarily be relevant or useful to that driver. This would be the case where a driver's planned driving route veers off to another road prior to where the event was reported to be located on the current road. As a result, information about this event would not only be meaningless but potentially misleading and confusing to certain drivers.

Another proposed methodology provides a means for reporting an event based upon the GPS position of the reporting mobile units. Event information (i.e. locations and descriptions) is transmitted from the mobile units to a centralized system. The centralized system stores said event information and makes such information available to vehicle drivers through various forms of textual and graphic displays, including event placement on electronic road maps. This methodology requires each driver to examine the location of the event on a map, as well as examine the subject matter, in conjunction with the knowledge of the planned route to determine if the event is located along each driver's actual route, and thus whether or not the information is relevant and useful.

Yet another proposed methodology allows users to create a highway driving trip plan that includes enroute events and activities by accessing a proprietary database of stored events and activity sites that are located along specified routes. Those items can be displayed in electronic map format. The user can personalize the trip plan by having only preferred items displayed and can cause those items to be rearranged and resequenced for presentation in a desired order. The user can enhance the information by assigning visiting times to each selected item, so that an entire itinerary can be created. However, the user must select the events and site information from a database during creation of the trip route; while the user is driving on the trip there is no capability to acquire, let alone notify drivers of short-term events that occur spontaneously ahead along specific routes.

Still another proposed methodology allows users to create trip plans including map displays by accessing a centralized system. These trip plan maps, with user-created event location icons and symbols, can be shared with other users. Thus, all users are able to create highway trip plans and make use of event and activity information provided by other users that are located along a specified route. However, each user must discern from the information received, whether the event is on a particular user's intended route path and whether the event is of an activity that is of particular interest.

While all the above described methodologies may provide helpful assistance to travelers, each suffers from various deficiencies. For example, none of the proposed methodologies is capable of consistently providing relevant and useful information to a driver in a timely and efficient manner.

Accordingly, it is an objective of the present Invention to provide improvements beyond those found in the previously proposed methodologies. It is yet another object of the present Invention to provide an improved technique for notifying travelers of transitory events along their travel path. It is still another object of the present Invention to provide an improved technique which facilitates the consistent delivery of relevant and useful information to a driver in a timely and efficient manner.

It is another objective of the present Invention to provide an improved methodology for alerting travelers to transitory events that are located ahead along the planned travel route.

It is yet another objective of the present Invention to provide an improved technique to inform travelers of events that are not only located directly on the travel route, but events located in the proximity of the route that might be of interest but would require the motorist to drive off the planned travel route to reach them.

It is further objective of the present Invention to provide an improved methodology to allow a traveler to specify preferred events of interest located ahead on the planned route and to allow the traveler to provide on- and off-route driving time parameters.

DESCRIPTION OF INVENTION

When driving a planned route, stopping for preferred events, such as fuel, restaurant, retail or other services obviously adds to the overall trip driving time. Preferred events that are in the proximity of, but off of, the motorist's direct route can cause considerable trip driving time delay because the motorist must drive off the planned route on connecting roads to reach the "off-route" event.

In accordance with the present Invention, informing the driver of off-route driving times to alternative off-route events empowers the driver to determine which off-route event to visit, given the driver's preferences and needs. Specifically, being informed of off-route driving times to different events proximate to a driver's route provides the driver the opportunity to choose between accessing an event that would require significant off-route driving time and another similar event, accessible from a point further along the driver's route, or perhaps even back along the driver's route, that minimizes overall trip driving time delay. Of course choosing an off-route event that is back along the driver's route will necessarily need to account for the trip driving time delay resulting from not only the off-route driving time, but also the driving time along the travel route that must be travelled again.

While a broad number of factors effect an actual driving time to access an off-route events, including unexpected traffic conditions, estimated driving time is influenced primarily by posted speed limits and road connectivity. The speed limits that are posted are based on road type and surface (curve, hill, etc.), location and type of access points (intersections, entrances, etc.), existing traffic control devices (signs, signals, etc.), sight distances, and other factors.

A lack of direct road connectivity from the driver's route to the event can exist for a number of reasons. A rural road network with long distances between road intersections, a limited access highway, a land bridge overpass with a road beneath it, or topographic obstructions such as a body of water, can each add considerable driving time to an event.

Thus, even if an event is located on a road that is near the driver's planned route in terms of geographic "crow-fly" distance, low speed limits and/or travelling over a few or many adjoining road segments to reach an event may be significant in terms of off-route driving time.

For example, a driver whose planned route includes the entirety of the FDR Drive in Manhattan is probably not interested in accessing an event in Queens, even though it is less than 1000 yards off of the travel route; this is because of the obstruction of the East River which separates Manhattan from Queens. Due to this topographical barrier, it would take the driver considerable time to drive to an event in Queens.

An event driving time value could be a maximum set by the event notification system, based on event type or based on some other predefined criteria. The event driving time value could also be a maximum set by the driver for all events, for a specific event, based on event type, or based on some other predefined criteria.

A fundamental aspect of an off-route event is that it is subordinate to the main objective of the planned trip, namely for the driver to reach the trip destination. As such, the driver's objective is almost always to minimize the impact of travelling to off-route events on total route driving time. As such, the driver typically is interested in events that meet a specific need but can be accessed within an acceptable amount of additional driving time.

In addition to being alerted to preferred events anticipated during the trip planning process, a driver would benefit from knowing the availability of specific unanticipated events in the vicinity of the intended route, the need for which was unknown to the driver, and hence unplanned, at the beginning of the trip. For example, fuel stops and restaurant locations are generally not specifically identified when planning a road trip because the time variation of road travel can effect actual travel time. Thus, these needs are normally met as they arise while underway, particularly along well-travelled highways. Unanticipated and unforeseen needs for specific events typically arise for a variety of reasons, such as vehicle malfunction, personal needs, or sudden impulses. Examples of these could be the need to obtain vehicle servicing at a specific auto service dealership due to the activation of a vehicle warning light while in route, or to stop at a particular drugstore chain which offers the driver a member discount, or to stop at a tailor to repair clothing that is torn while in route, or to visit a specific cultural museum as a result of a sudden whim. Even common services, such as fuel stops and restaurants, could be sparsely located events when driving less travelled roads and desolate areas.

The present invention allows the driver to inquire as to the availability and driving times to a multiplicity of both anticipated and unanticipated events of interest ahead along the driver's route, thus providing the driver with the ability to choose off-route events that minimize the driver's trip driving time delay. For example, a driver whose gas tank is half full, can inquire and be alerted to a preferred filling station 3 hours and 200 miles ahead along the driver's route and thereby avoid the off-route travel time delay of stopping at a gas station to refill only half the tank. Inquiring and being informed that there is a brand name drugstore several hours ahead along the route, a driver can contact his doctor and request the doctor to call-in a needed prescription to the distant drugstore so that the filled prescription will be "ready for pickup" immediately upon the driver's arrival at the distant drugstore, rather than having the doctor call-in the prescription to a drugstore close to driver's current location and the driver having to wait for the prescription to be called-in and prepared by the pharmacist, causing avoidable trip driving time delay.

In accordance with the present invention, a system for determining whether to notify a traveler of events proximate to a travel path, includes a user data store configured to store an identifier of the user in association with (i) contact information, such as a cellular phone number, for contacting the user while traveling and (ii) a user in-route travel path including geographic coordinates defining a start point and an end point of each of multiple contiguous segments between a start location and an end location of the user in-route travel path. It should be understood that the user date store will typically store this same type of information of many different users.

The system also includes an event data store configured to store, for each of multiple known events, an event identifier in association with (i) a description of the applicable event and (ii) geographic coordinates defining a location of the applicable event. Events can be of any type. The stored events will typically include non-transient events, such as in the case of long term service providers, e.g. gas stations, fast food and other restaurants, drug stores, hospitals, national historic sites, etc. The stored events will also typically include transient events such festivals, country fairs, flee markets etc. The event data store may be continually updated with upcoming transient events and new non-transient events added and with expired transient events or closed non-transient events removed.

It will be recognized that that the user and the event date stores may be of any type, so long as the data stored thereon can be accessed from the data store by a computer processor. For example, the data store might be a hard drive, compact disc (CD), or computer memory. The user data store and the event data store may be stored on the same device, e.g. the same hard drive on the same data server, or different devices, e.g. different had drives on different data servers. Preferably, the user identifier, user contact information, and user in-route travel path will be stored in a user relational database, and the event identifier, event description and event location will be stored in a event relational database.

The system also includes a processor configured with logic, i.e. programmed instructions, which typically will be in the form of software, but could be in other forms. The processor functions to receive, from the user, a description of an event of interest to the user, and geographic coordinates of a current travel location of the user along the stored user in-route travel path. That is, the processor receives, from the user, a description of an event of interest to the user, and a current travel location of the user along a user in-route travel path;

This information may be received in a single query message sent after the user has begun his/her trip, and is at some point along the user's in-route travel path, e.g. received at the time the user has a need to consider stopping at a gas station to refuel. On the other hand, this information could alternatively be received in separate communications at different times, for example the description of the event of interest could be received before the user has begun his/her trip and only the user's current location is received after the user has begun his/her trip, and is at some point along the user's in-route travel path. That is, in the alternative scenario, only the user's current location would be received at the time the user has a need while travelling to consider stopping at a gas station to refuel. In this later case, the user data store preferably also stores the description of the event of interest received from the user.

In any event, after both the event description and current location have been received, the processor proceeds by establishing an event search area for searching for events of interest to the user, based on the received geographic coordinates of the user's current travel location. Stated another way, the processor establishes an event search area based on the received user current travel location.

The established search area includes a maximum off-route crow-fly distance from the stored user in-route travel path. Preferably, the maximum off-route crow-fly distance included in the established search area is a distance extending out from both sides of the user in-route travel path in a direction substantially perpendicular thereto. In some implementation, the processor is further configured to receive a maximum off-route driving time to event value, from the user, and determine a crow-fly distance based on the received maximum off-route driving time to event value, in which case the maximum crow-fly distance included in the established search area is based on, and will preferably be identical to, the determined crow-fly distance. In some implementation it will be preferable that the maximum crow-fly distance included in the search area be establish based also on a predetermined maximum speed limit of the user in-route travel path.

In some implementations, the start and end points of the search area along the user in-route travel path may be set to default values. For example, the start point might be set to the current location and end point might be set some distance from the user's current location, such as the point along the user in-route travel path that the user is expected to reach in 1 hour from the current time or that is 100 miles from the user's current location.

However, preferably, the processor is further configured to receive, from the user, at least one of (a) a minimum travel distance or travel time value for travel along the user in-route travel path from the received geographic coordinates of the user's current travel location to the event of interest, and (b) a maximum travel distance or travel time value for travel along the user in-route travel path from the received geographic coordinates of the user's current travel location to the event of interest. In such a case, the processor determines based on the received minimum travel distance or time value, if the minimum travel distance or time value is received from the user, a start search area distance extending from the received geographic coordinates of the user's current travel location along the user in-route travel path. The processor also determines based on the received maximum travel distance or time value, if the maximum travel distance value is received from the user, an end search area distance extending from the received geographic coordinates of the user's current travel location along the user in-route travel path.

That is, the processor (i) receives, from the user, at least one of (a) a minimum travel distance or time value for travel along the user in-route travel path from the received user current travel location to the event of interest, and (b) a maximum travel distance or time value for travel along the user in-route travel path from the received user current travel location to the event of interest, (ii) determines based on the received minimum travel distance or time value, if received, a start search area distance extending from the received user current travel location along the user in-route travel path, and (iii) determines based on the received maximum travel distance or time value, if received, an end search area distance extending from the received user current travel location along the user in-route travel path.

The established search would then (i) begin at the determined start search area distance from the received geographic coordinates of the user's current travel location along the user in-route travel path, if the minimum travel distance or time value is received, and (ii) end at the determined end search area distance from the received geographic coordinates of the user's current travel location along the user in-route travel path if the maximum travel distance or time value is received. Of course, if any of the necessary values are not received from the user, the default value could be used. Stated another way, the established search area (i) begins at the determined start search area distance from the received user current travel location along the user in-route travel path, if the minimum travel distance or time value is received, and (ii) ends at the determined end search area distance from the received user current travel location along the user in-route travel path, if the maximum travel distance or time value is received.

The processor next determines that one or more of the multiple events identified by the stored event identifiers is of interest to the user, based on the received event description, the established event search area, the stored descriptions of the multiple events, and the stored geographic coordinates of the multiple event locations. That is, the processor determines that one or more of multiple events are of interest to the user, based on the event description received from the user, the established event search area, known descriptions of the multiple events, and known locations of the multiple events. For example, if the event of interest is a particular brand drugstore or gas station, the determined one or more events might includes different locations of that particular brand of drugstore or gas station within the established search area. If, on the other hand the event of interest to the user was described as any brand of drugstore or any gas station, the determined one or more events might includes locations of all brands of drugstores or gas stations within the established search area.

The processor continues by determining each of the off-route travel paths that connects each of the determined one or more events to the stored user in-route travel path.

The processor next computes, for each of the determined off-route travel paths, (i) an off-route driving time from the stored user in-route travel path to the applicable determined event and (ii) an off-route driving time from the applicable determined event to the stored user in-route travel path.

Next, the processor computes for each of the determined one or more events, based on the computed off-route driving time for each of the determined off-route travel paths, a total in-route and off-route driving time to go from the stored user in-route travel path to the applicable determined event and from the applicable determined event to the stored user in-route travel path.

The processor identifies, for each of the determined one or more events, the one of the determined off-route travel paths connecting the stored user in-route travel path to the applicable determined event that has a minimum computed off-route driving time to go from the stored user in-route travel path to the applicable determined event and from the applicable determined event to the stored in-route travel path.

The processor also identifies, for each of the determined one or more events, the one or more of the determined off-route travel paths connecting the stored user in-route travel path to the applicable determined event that has a minimum computed total in-route and off-route driving time to go from the stored user in-route travel path to the applicable determined event and from the applicable determined event to the stored user in-route travel path.

It should be understood that the identified one or more off-route travel paths having the minimum computed total in-route and off-route driving time may include one off-route travel path for going from the stored user in-route travel path to that event and another different off-route travel path for going from that event back to the stored user in-route travel path. Furthermore, these different off-route travel paths may be partially overlapping.

Finally, the processor directs transmission to the user in accordance with the stored user contact information, e.g. the user's cell phone number, for each of the determined one or more events, at least one of (i) the minimum computed off-route driving time and the identified off-route travel path having the minimum computed off-route driving time, and (ii) the minimum computed total in-route and off-route driving time and the identified one or more off-route travel paths having the minimum computed total in-route and off-route driving time.

It will be recognized by those skilled in the art that although in the implementation of the invention being described, the user data store stores a predefined user in-route travel path, in other implementations the in-route travel path may not be predefined by the user and/or stored in the user data store. For example, techniques have been proposed for predicting a user's in-route travel path based on the user's current location and direction of travel. Hence, if such a technique were being used, a predicted user in-route travel path might be used instead of a stored user in-route travel path. Additionally, it might be possible for the user to store the user in-route travel path on a user device, e.g. the user's smartphone, and transmit the user in-route travel path with the current location, once again eliminating the need to store the user in-route travel path in the user data store. Thus, if the user in-route travel path is not stored in the user data store, the generated or otherwise available user in-route travel path, rather than a predefined user in-route travel path stored in a user data store, would be utilized by the processor to perform the above functions.

BRIEF DESCRIPTION OF THE DRAWINGS

FIG. 24c illustrates the impact of speed on the driving time for a particular coordinate distance.

DETAILED DESCRIPTION OF PREFERRED EMBODIMENTS OF THE INVENTION

Figure 1:
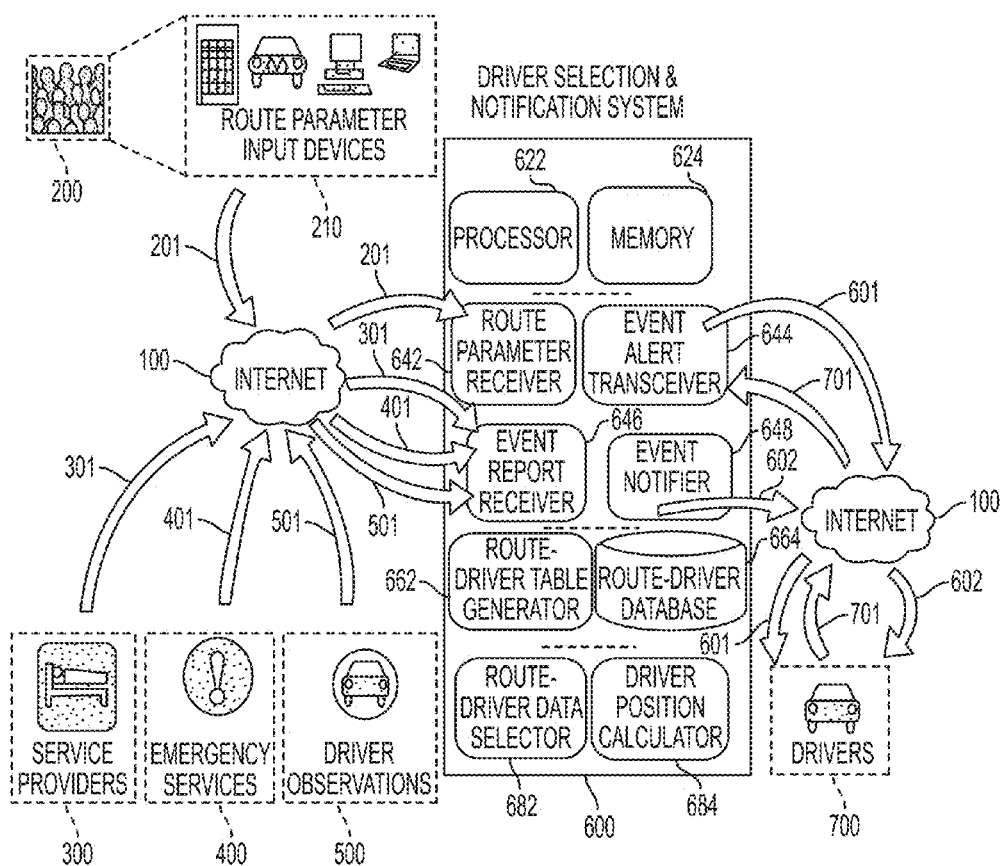
FIG. 1 is a high-level data flow diagram of the Driver Selection & Notification System (DSNS), including major input/output elements, in accordance with prior work described in U.S. Pat. No. 8,566,026.

Overview of Prior Work Described in U.S. Pat. No. 8,566,026

The system described in U.S. Pat. No. 8,566,026 includes a receiving device, such as a modem, for receiving route parameter information (origination, destination, driver information, such as cell phone number, and trip preferences) a route table generator, typically logic in the form of software stored on memory and executed by a processing unit, that is configured for generating, based on the received route parameter information, a set of route-driver data tables, namely: (1) route segment strings with driver identification, trip preference and contact information, (2) segments and drivers who use those segments, (3) segment node geographic coordinate values, and (4) segments with nodes and midpoint geographic coordinate values, and a route-driver database storage device for storing said route-driver data tables.

The system may also include a receiving device, such as the same or a different modem, for receiving event information, such as commercial travel offerings, emergency situation information, and observations from fellow drivers or others. Said event information includes geographic location information (e.g. geographic coordinates or address or route and mile point) and event description information and, optionally, event category information.

Logic, executable by the same or a different processing unit, configured for assembling said event information, and route-driver data search logic, also executable by the same or a different processing unit, that is configured for searching and calculating the geographic route segment location of said event and said event category information and comparing said event route segment location with said route segment strings of drivers by searching and selecting, if any, said route-driver data and said driver interest category in said route-driver database.

According to one embodiment of the system described in U.S. Pat. No. 8,566,026, logic is provided to extract said driver identification from said selected route-driver data and to direct transmission of alert message information by an event alert device, which may be the same or another modem, to selected drivers from said selected route-driver data. The event alert device also receives responses to the transmitted event alerts from said selected drivers.

The received driver responses from said selected drivers include current driver GPS geographic coordinates. Driver route segment location calculator logic, which may be executable by the same or a different processing unit, determines the driver's current geographic location from said driver GPS geographic coordinates, and determines driver route segment location in relation to the said event route segment location.

A transmitting device, which may be the same or a different modem, is directed by the driver position calculator logic, to notify said identified drivers of said event information if the said driver current route segment locations are prior to and within practical distance to said event route segment location. The practical distance (e.g. 300 feet, 3, 30, 300, 3000 miles, etc., depending on the nature of the event) may be a single predefined value, or determined by the logic based on the applicable event information, or selected by the driver.

According to another embodiment of the system described in U.S. Pat. No. 8,566,026, the location of the vehicle may optionally be monitored continuously by a centralized highway navigation system, so that time and distance to an enroute event can be continuously updated, so that event alerts that determine driver current geographic location would not be required.

It should be understood that there may be multiple sources of information about an enroute event, in which case a plurality of information data is received based on different event criteria.

It should also be understood that enroute information about multiple events may be provided based on information data received based on different criteria.

It should also be understood that the usefulness of the system described in U.S. Pat. No. 8,566,026 is applicable to other travelers aside from vehicle drivers.

In accordance with aspects of the the prior work described in U.S. Pat. No. 8,566,026 a system for generating travel route data includes a modem, which preferably forms part of a transceiver, a processor, such as a personal computer or server processor, and a database.

The modem is configured to receive (i) first user route parameter data from a first user, (ii) second user route parameter data from a second user, and (iii) third user route parameter data from a third user. Preferably, the modem is configured such that it is capable of receiving the route parameter data via the Internet. The users are typically individuals intending to take a trip. The users could, for example, be drivers planning a road trip in an automobile. Thus, users are sometimes referred to as drivers, but could be virtually any type of traveler, e.g. a train or plane traveler, or could be someone acting on behalf of a traveler. The user route parameter data for each respective user includes a start location and end location for future travel.

The processor is configured with logic, typically in the form of instructions stored on a storage media, e.g. a memory, but could be in the form of hardware or firmware. This logic causes the processor to function so as to generate (i) first user route data based on the received first user route parameter data, (ii) second user route data based on said received second user route parameter data, and (iii) third user route data based on said received third user route parameter data.

The generated first user route data includes first geographic coordinate data with imbedded strings of first geographic coordinate identifiers corresponding to strings of first geographic coordinates defining a travel path between the start and end locations included in the first user route parameter data. The generated second user route data includes second geographic coordinate data with imbedded strings of second geographic coordinate identifiers corresponding to strings of second geographic coordinates defining a travel path between the start and end locations included in the second user route parameter data. The generated third user route data includes third geographic coordinate data with imbedded strings of third geographic coordinate identifiers corresponding to strings of third geographic coordinates defining a travel path between the start and end locations included in the third user route parameter data. It should be understood that data tables can be, and preferably are, assembled so as construct an "imbedded geographic coordinate string" based on the imbedded string of geographic coordinate identifiers for the required functionality. Although the imbedded strings of geographic coordinate identifiers corresponding to strings of geographic coordinates could be the strings of geographic coordinates themselves, preferably there is not a stand-alone record that contains all the coordinate strings for a route, since this would require much more data storage without an offsetting gain of functionality or efficiency.

The database is configured to store (i) the generated first route data in association with an identifier of the first user and contact information for contacting the first user while in route, (ii) the generated second route data in association with an identifier of the second user and contact information for contacting the second user in route, and (iii) the generated third route data in association with an identifier of the third user and contact information for contacting the third user while traveling.

Preferably, the modem is also configured to receive reported event data, including a description of an event and an event location. The event may be related to a commercial offering, sightseeing, recreation, an emergency, weather, traffic or construction. If reported event data is received, the processor is further configured to compare geographic coordinates corresponding to the received event location with the strings of geographic coordinates corresponding to the stored imbedded strings of geographic coordinate identifiers of the first user route data, the second user route data, and the third user route data. The processor then determines, based on the coordinate comparison, if (i) the stored first user route data corresponds to the received event location, (ii) the stored second user route data corresponds to the received event location, and (iii) the stored third user route data corresponds to the received event location.

For example, the user route data may be determined to correspond to the received event location if the stored applicable user route data includes geographic coordinates that match the geographic coordinates corresponding to the received event location. Most preferably, the user route data is determined to correspond to the received event location if the strings of geographic coordinates corresponding to the stored imbedded strings of the applicable geographic coordinate identifiers include geographic coordinates within a predefined proximity to the geographic coordinates corresponding to the received event location.

The predefined proximity could, for example, be a single distance set by the processor, a distance set by the processor based on the type of event reported in the event data, a distance selected by the user or some other predefined distance. This is described further below with reference to the first and second embodiments of the system described in U.S. Pat. No. 8,566,026. However, the predefined proximity could alternatively be a driving time parameter as will be further described below with reference to the first and second embodiments of the present invention as will be further described below.

The processor next directs the modem to transmit a message regarding the event (i) to the first user based on the stored contact information for contacting the first user only if it is determined that said stored first user route data corresponds to said received event location, (ii) to the second user based on the stored contact information for contacting the second user only if it is determined that said stored second user route data corresponds to said received event location, and (iii) to the third user based on the stored contact information for contacting the third user only if it is determined that said stored third user route data corresponds to the received event location.

According to other preferred aspects of the system described in U.S. Pat. No. 8,566,026, the received event location is defined by other than geographic coordinates, e.g. a street address or a route and mile number. If so, the processor is further configured to determine the geographic coordinates corresponding to the received event location, and the comparing of geographic coordinates is performed using the determined geographic coordinates corresponding to the received event location.

In accordance with still other preferred aspects of the system described in U.S. Pat. No. 8,566,026, the processor may be further configured to also compare the geographic coordinates corresponding to the received event location with geographic coordinates representing a current location of each of the first, second and third users, but only if it has been determined that the stored user route data for the applicable user corresponds to the received event location. If the comparison with the geographic coordinates representing a current location of the applicable user has been performed, the processor also determines, based on that comparison, if that user has not traveled along the travel path defined by the stored route data for that user, beyond the received event location. Accordingly, the message regarding the event is transmitted (i) to the first user only if it is also determined that the first user has not traveled along the travel path defined by the stored first user route data beyond the received event location, (ii) to the second user only if it is also determined that the second user has not traveled along the travel path defined by the stored second user route data beyond the received event location, and (iii) to the third user only if it is determined that the third user has not traveled along the travel path defined by the stored third user route data beyond the received event location.

For example, if only the stored first user route data and the stored second user route data are determined to correspond to the received event location, the message regarding the event is transmitted only to the first user and the second user, and not to the third user. In such a case, the modem is further configured to receive from the first user, in response to the transmitted message regarding the event, current travel location data, representing a current location of the first user along the travel path defined by the stored first user route data, and to receive from the second user, in response to the transmitted message regarding the event, current travel location data, representing a current location of the second user along the travel path defined by the stored second user route data.

The processor is further configured to compare the geographic coordinates corresponding to the received event location with geographic coordinates corresponding to the received first user current travel location data and to the received second user current travel location data. The process or determines, based on the comparison with the geographic coordinates corresponding to the received first user current travel location data, if the first user has not traveled along the travel path defined by the stored first user route data beyond the received event location. The processor also determines, based on the comparison with the geographic coordinates corresponding to the received second user current travel location data, if the second user has not traveled a long the travel path defined by the stored second user route data beyond the received event location. Finally, the processor directs the modem to transmit another message, including a notification of the event, to the first user based on the stored contact information for contacting the first user only if it is determined that the first user has not traveled beyond the received event location, and to transmit another message, including a notification of the event to the second user based on the stored contact information for contacting the second user only if it is determined that the second user has not traveled beyond the received event location.

First Embodiment of System Described in U.S. Pat. No. 8,566,026

The invention disclosed in U.S. Pat. No. 8,566,026 is described in the context of preferred apparatus, method and software that improve both the relevancy and usefulness to the driver of reported event information by confining the dissemination of such information to drivers whose routes take them directly past, or in close proximity to, the reported event, by limiting information only to that which is of interest to the driver, and also improving the timeliness and efficiency of the delivery of this information.

Although the embodiments herein are illustrated and described with respect to "smartphone" and GPS technology, the they are applicable to other appropriate existing and future technologies.

FIG. 1 is a high-level functional diagram depicting the Driver Selection & Notification System (DSNS) 600 described in U.S. Pat. No. 8,566,026 and its interaction, facilitated by Internet 100, with Highway Trip Planners 200 using input devices 210 by which user route parameter data 201 is prepared and sent to said DSNS 600, Service Providers 300 sending event reports 301 to said DSNS 600, Emergency Services 400 sending event reports 401 to said DSNS 600, Driver Observations 500 sending event reports 501 to said DSNS 600, and Drivers 700 receiving event report alerts 601 from said DSNS 600, sending responses 701 to said DSNS 600, and receiving event notifications 602 from said DSNS 600.

Figure 2:
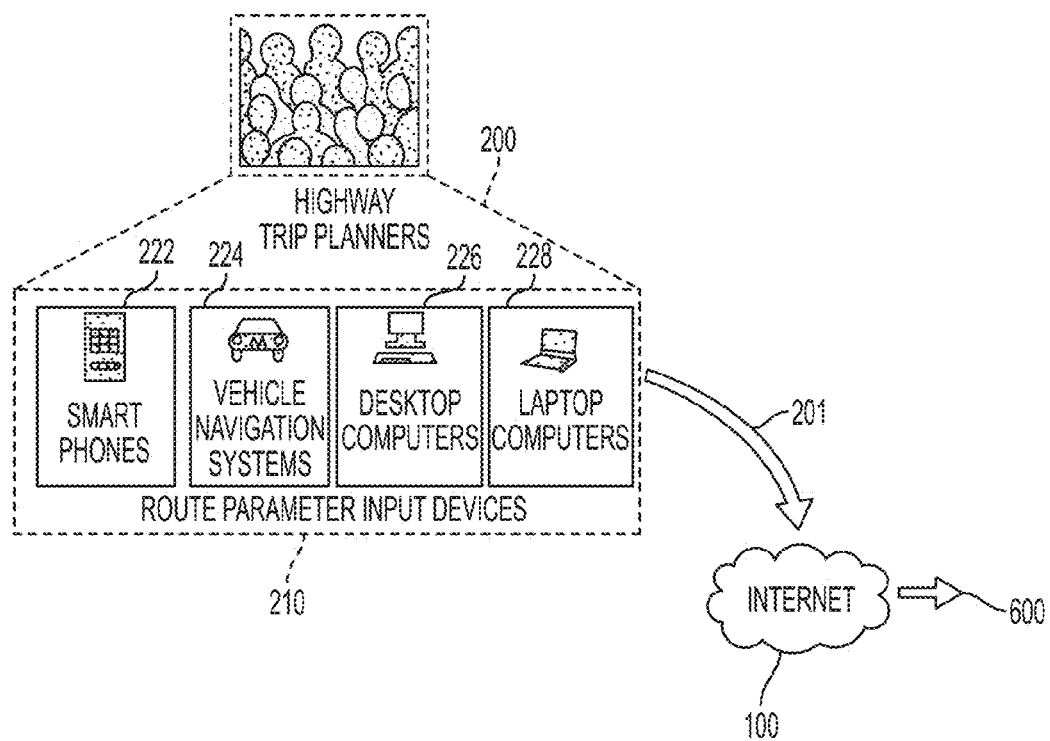
FIG. 2 displays the data flow from different types of input devices that highway trip planners use to create route parameters (origination, destination, trip preferences, etc) that are then transmitted to the DSNS for producing highway driving routes.

FIG. 2 illustrates said Highway Trip Planners 200 using said input devices 210, such as smartphone devices 222, vehicle navigation system devices 224, desktop computer devices 226 and laptop computer devices 228 to send said route parameter data 201 to said DSNS 600 via said Internet 100. Said route parameter data 201 includes, at a minimum, trip origin, destination, driver interest category and driver contact information.

Figure 3:
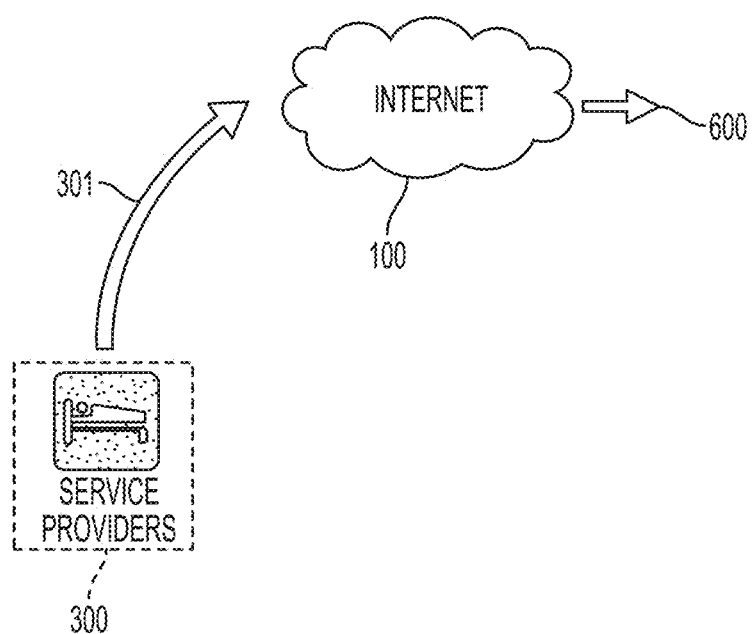
FIG. 3 illustrates the data flow from service providers (hotels, restaurants, retail shops, etc.) who send event reports (commercial offerings) to the DSNS to be processed and transmitted only to selected drivers, i.e. those drivers whose route, interests and timing are germane to the information.

FIG. 3 describes said event reports 301 created by said Service Providers 300, such as hotels, restaurants and shopping facilities. Said Service Providers 300 send said event reports 301 to said DSNS 600 via said Internet 100. The information of said event reports 301 would include geographic coordinates or address, as well as commercial offerings for selected route drivers, such as special advertisements or promotion.

Figure 4:
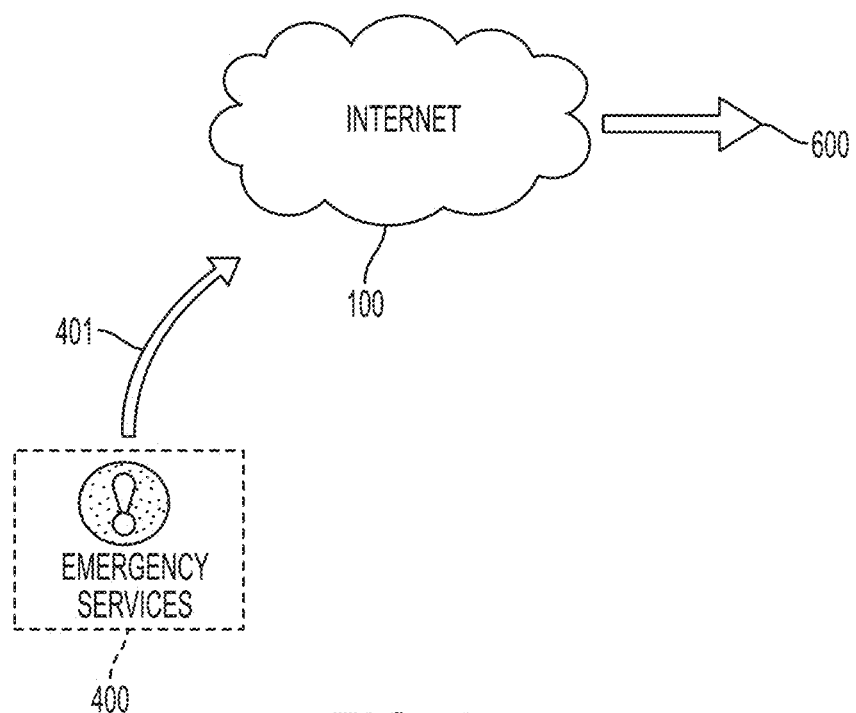
FIG. 4 illustrates the data flow of emergency reports (traffic accidents, road obstructions, etc.) that are sent to the DSNS to be processed and transmitted to selected drivers.

FIG. 4 describes said event reports 401 created by said Emergency Services 400, such as police, highway department and radio/television facilities. Said Emergency Services 400 send said event reports 401 to said DSNS 600 via said Internet 100. The information of said event reports 401 would include geographic coordinates or address, as well as information affecting road travel, such as traffic accidents and road conditions.

Figure 5:
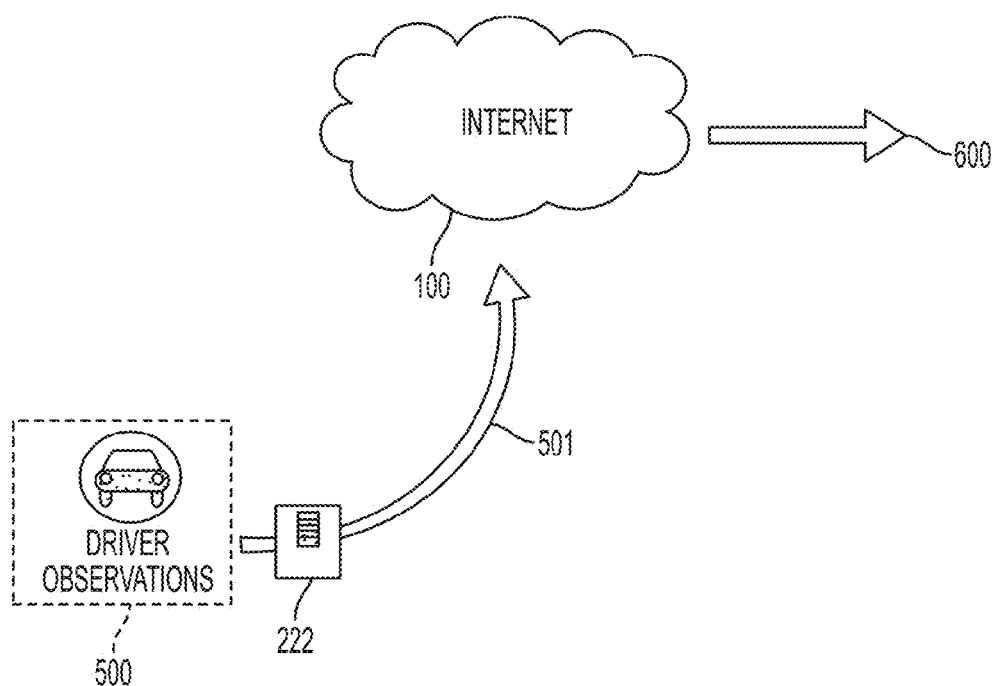
FIG. 5 illustrates the data flow from drivers who use smartphones to send event reports (observations) to the DSNS for processing and transmission to selected drivers.

FIG. 5 describes said event reports 501 created by said Driver Observations 500 using mobile devices, such as smartphone technology. Said Driver Observations 500 send said event reports 501 to said DSNS 600 via said Internet 100. The information of said event reports 501 would include geographic coordinates, as well as information of interest, such as a panoramic site, a memorable café or antique buys.

Referring again to the various components of said DSNS 600 shown in FIG. 1, as noted above, all logic elements operate in conjunction with Processor 622 and Memory 624. Route Parameter Receiver 642 receives said route parameter data 201 from said Highway Trip Planners 200 via said input devices 210. Event Report Receiver device 646 receives said event report data 301, 401 and 501 from said event report sources 300, 400 and 500. Event Alert Transceiver device 644 sends said event alert data 601 to said Drivers 700 and receives said response data 701 from said Drivers 700. Event Notifier logic 648 directs said event notification data 602 to said Drivers 700. Route-Driver Table Generator logic 662 creates Route-Driver data tables, that include route segment strings, segment and node geographic coordinate latitude and longitude values, and driver identification and interest information, including driver contact information such as a smartphone address, based on said route parameter data 201, and stores the Route-Driver data in Route-Driver Database 664. Route-Driver Data Selector logic 682 selects said Route-Driver data and assembles the geographic coordinate location corresponding to the received event report, i.e. the received event location, data 301, 401 and 501, and identifies drivers whose routes include segments where events are located. Driver Position Calculator logic 684 calculates selected driver route segment position within said selected Route-Driver data from said response data 701 and identifies those drivers associated with the previously selected Route-Driver data who are correctly positioned to find the applicable event notification data relevant and useful. That is, the Driver Position Calculator identifies only those of the originally selected drivers who have not already passed the location associated with the event beyond a practical distance, or who are too far behind the event for the event information to be useful given the interest category, or who are not otherwise currently positioned, e.g. because the driver has diverted from the original trip routing, such that the event information is irrelevant. The Event Notifier device 648, which may be the same or a different modem, is directed by the Driver Position Calculator 684 to transmit the event notification data 602 to only the identified drivers.

Figure 6:
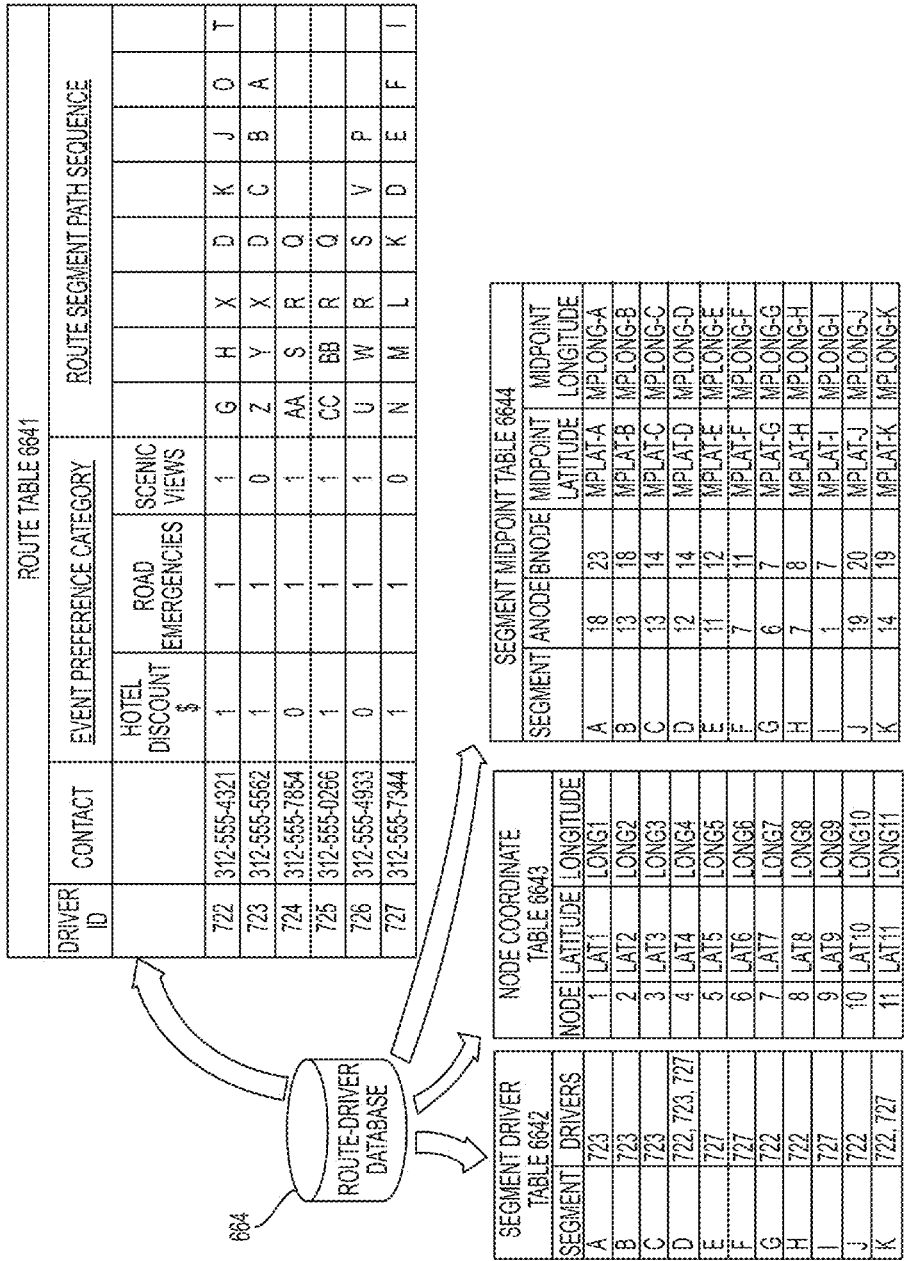
FIG. 6 illustrates four data tables that are generated and stored in the Route-Driver Database for DSNS processing in accordance with the present invention.

FIG. 6 shows the four main data tables that comprise the Route-Driver Database 664 and are used to assemble data to determine and relate locations of said event report and positions of said current drivers. Route Table 6641 contains driver identification, contact and preference information, and the strings of route segments that comprise each said driver's route. Segment Driver Table 6642 contains the list of route segments that are being used by one or more said Drivers 700, and, for each segment, the list of said Drivers 700 that use said segment. Node Coordinate Table 6643 list the geographic nodes of said route segments, and the geographic coordinates of each said node. Segment Midpoint Table 6644 contains a list of said route segments, the geographic nodes for each said route segment, and the geographic coordinates for the geographic midpoints of said route segments.

Figure 7:
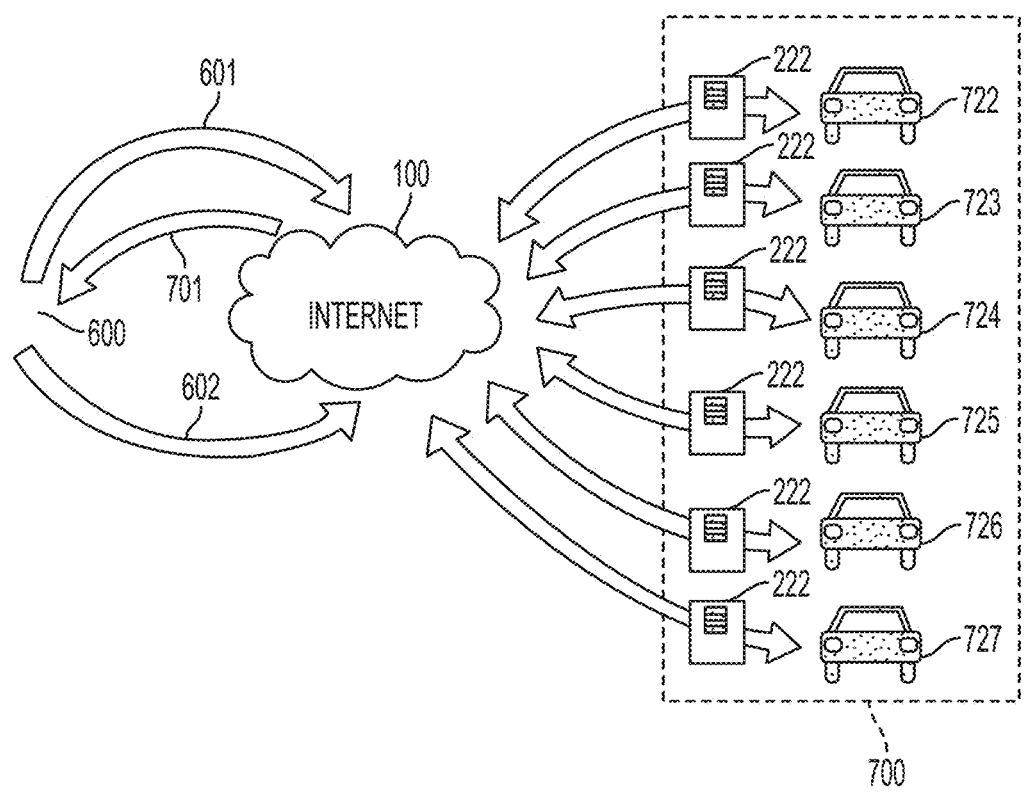
FIG. 7 shows the community of drivers who use mobile devices, such as smartphones, to receive/respond to event alerts and receive event notifications from the DSNS.

FIG. 7 shows Drivers 700, the figurative community of drivers who would communicate with said DSNS 600 using said Smartphone device 222. FIG. 7 illustrates individual Drivers 722, 723, 724, 725, 726, and 727. Said DSNS 600 sends said event alerts, receives said driver responses, and transmits said event notifications to a selected set of Drivers 700, depending upon the locations associated with said event reports 301, 401 and 501, and the current position of drivers along their routes.

Figure 8:
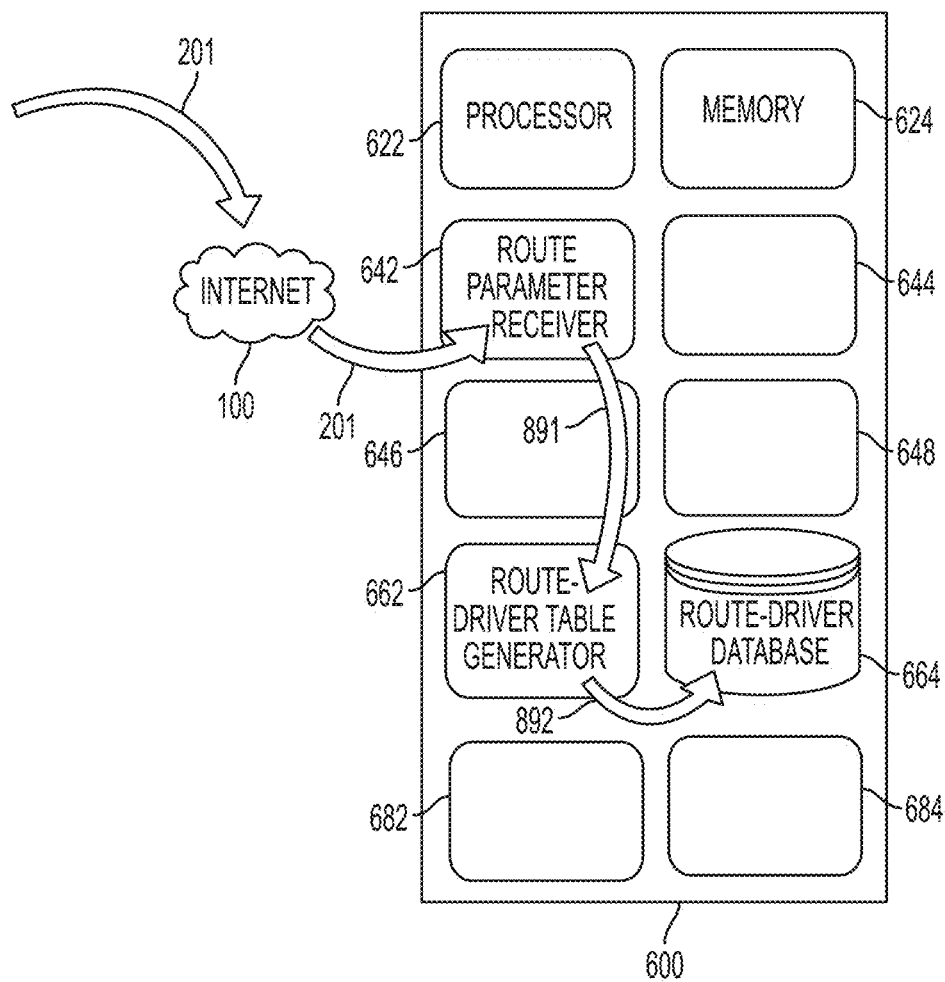
FIG. 8 illustrates the data flow of route parameters received by the DSNS, Route-Driver data tables generated from these parameters, and the storage of same in the Route-Driver Database in accordance with the the prior work described in U.S. Pat. No. 8,566,026.

FIG. 8 shows route table generation by said DSNS 600. Said Route Parameter Receiver device 642 receives said route parameter data 201 and, in interaction 891, transfers said route parameter data to said Route-Driver Table Generator logic 662. Said Route-Driver Table Generator logic 662 generates said Route Table 6641, said Segment Driver Table 6642, said Node Coordinate Table 6643, and said Segment Midpoint Table 6644 from said route parameter data. Said Route-Driver Table Generator logic, in interaction 892, transfers and stores said Route-Driver Table data in said Route-Driver Database 664.

Figure 9:
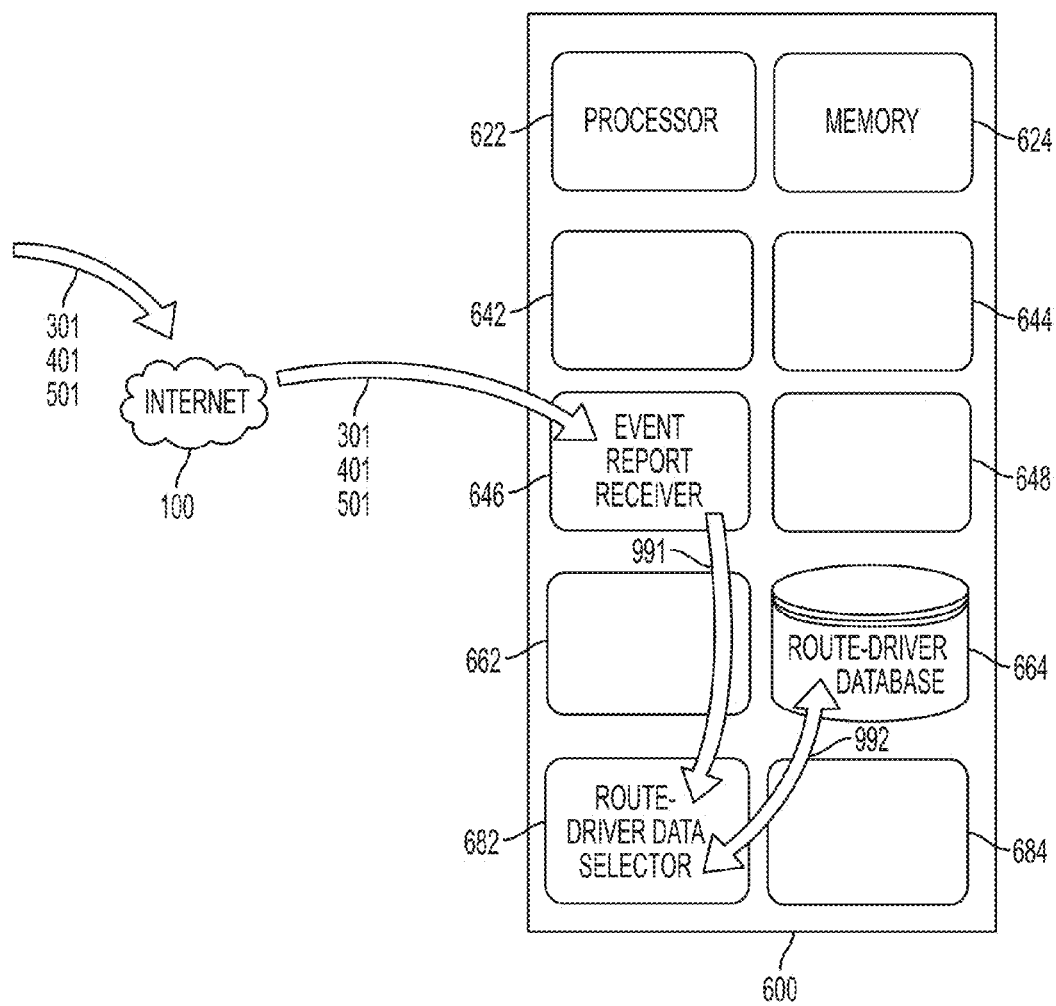
FIG. 9 illustrates the data flow of an event report received by the DSNS and the selection by the DSNS of Route-Driver data tables that include the event location in accordance with the prior work described in U.S. Pat. No. 8,566,026.

FIG. 9 shows event reporting and route-driver data selection by said DSNS 600. Said Event Report Receiver 646 receives said event report 301, 401 or 501, and, through interaction 991, transfers said event report data 301, 401 or 501 to said Route-Driver Data Selector logic 682. Said Route-Driver Data Selector logic 682, through interaction 992 with said Route-Driver Database, identifies, selects and assembles Route-Driver data records which include the geographic coordinate location corresponding to the location of said event report data 301, 401, or 501.

Figure 10:
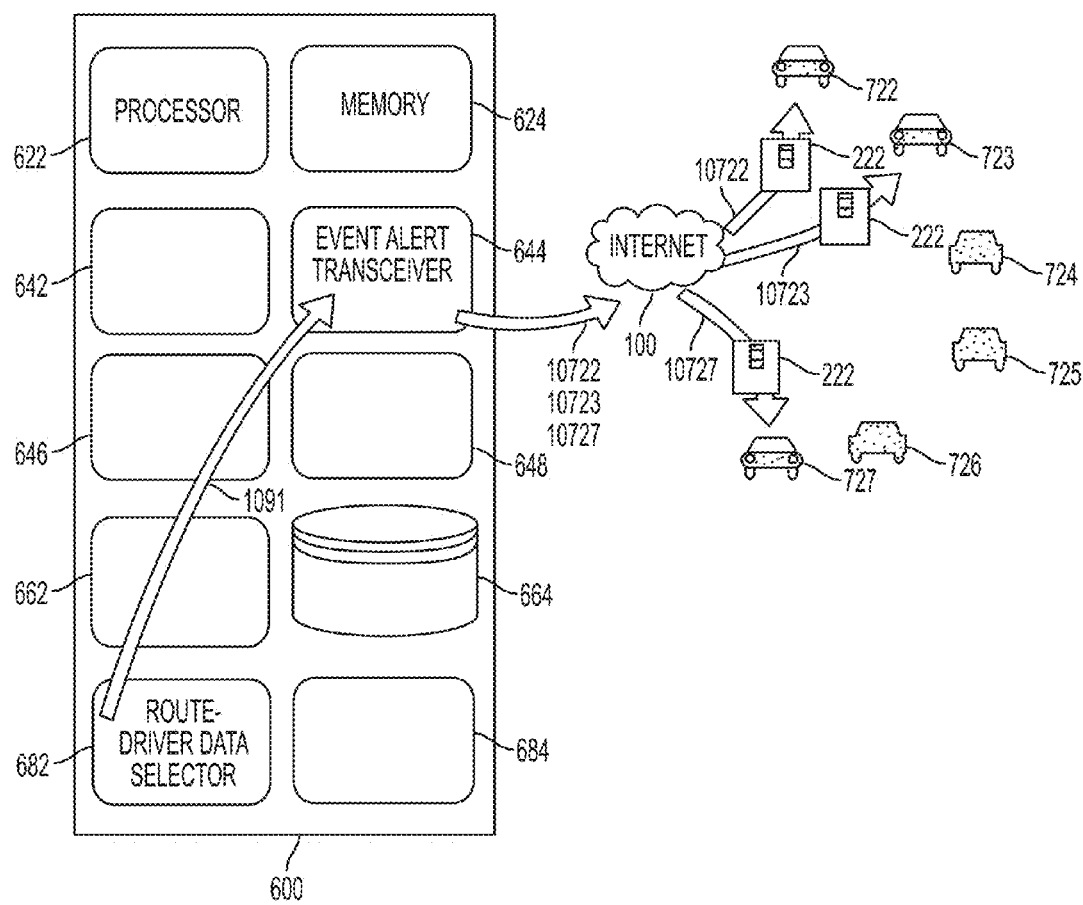
FIG. 10 illustrates the data flow for transmission of event report alerts to drivers of the selected routes by the DSNS, in accordance with the prior work described in U.S. Pat. No. 8,566,026.

FIG. 10 shows the event alert messaging by said DSNS 600. If said Route-Driver Data Selector logic 682 selects at least one said Route-Driver Route Table 6641 record, an appropriate Event Alert including driver contact information is directed to said Event Alert Transceiver device 644 through interaction 1091. Said Event Alert Transceiver transmits said Event Alert to the selected driver(s) via smartphone technology 222. In the FIG. 10 example, said Event Alert Transceiver device 644 prepares and transmits said event alerts 10722, 10723 and 10727 via the Internet 100 to Drivers 722, 723 and 727.

Figure 11:
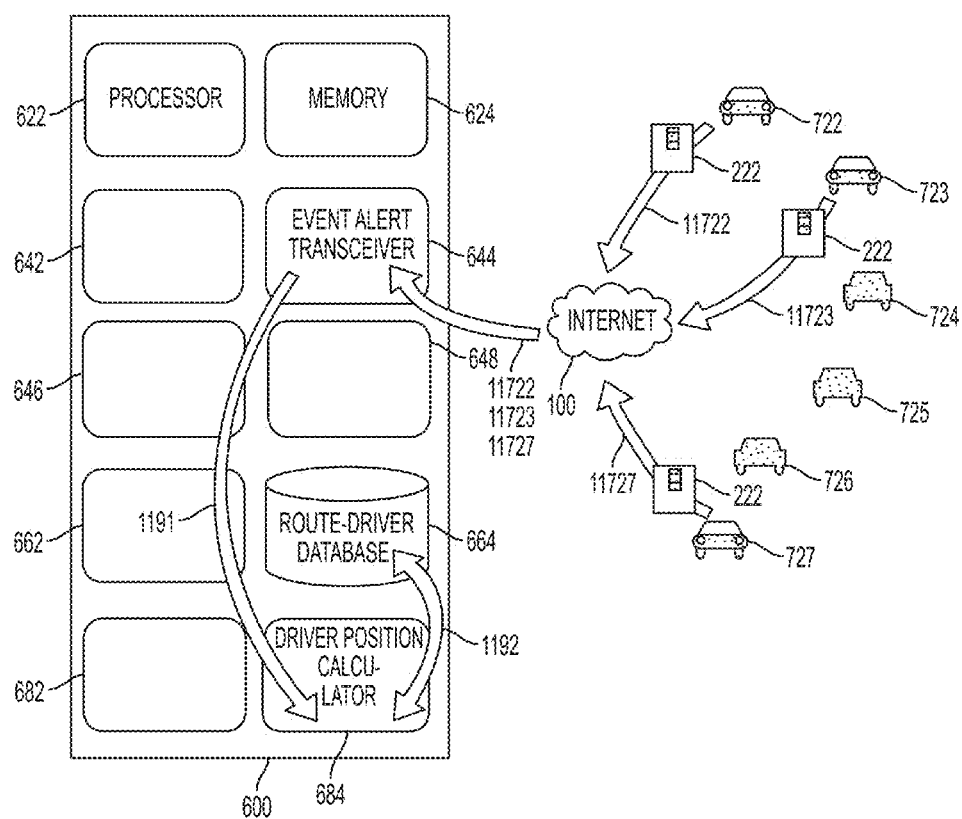
FIG. 11 illustrates the data flow of selected driver responses to the event report alerts, in accordance with the prior work described in U.S. Pat. No. 8,566,026.

FIG. 11 shows driver alert response messaging and driver route position calculating by said DSNS 600. Said Event Alert Transceiver device 644 receives alert responses from the selected drivers to whom the Event Alert 10722, 10723 and 10727 have been previously transmitted, including geographic coordinate information via smartphone technology 222. In the FIG. 11 example, said Event Alert Transceiver receives responses 11722, 11723 and 11727 from drivers 722, 723 and 727. Said Event Alert Transceiver device 644, through interaction 1191 transfers the received geographic coordinate information to said Driver Position Calculator 684. Said Driver Position Calculator 684, through interaction 1192 with said Route-Driver Database 664, identifies each driver's current position along said selected Route-Driver route associated with that driver using geographic coordinate information contained in said responses 11722, 11723 and 11727 coupled with the assemblage of Route-Driver data to calculate driver route position.

Figure 12:
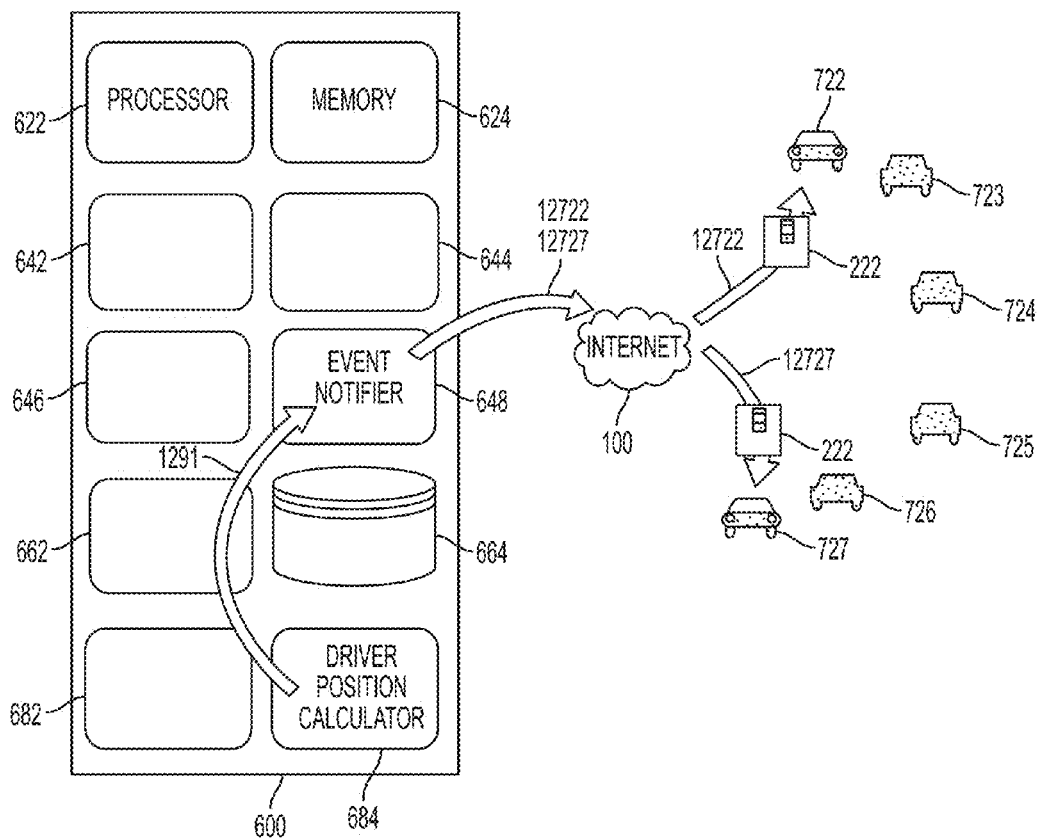
FIG. 12 illustrates the data flow of driver notification by the DSNS of event information, in accordance with the prior work described in U.S. Pat. No. 8,566,026.

FIG. 12 shows the selected driver event notification messaging by said DSNS 600. If at least one driver of the drivers 722, 723 and 727 is positioned so as the said event 301, 401 or 501 is located ahead of the driver's current position, said Driver Position Calculator logic 684, through interaction 1291, transfers the driver contact information for the applicable driver(s) to said Event Notifier device 648. In the FIG. 12 example, said Event Notifier device 648 prepares and transmits event notifications 12722 and 12727 to Drivers 722 and 727, as directed by the Driver Position Calculator logic in interaction 1291. Driver 723 does not receive the event notification because the Driver Position Calculator logic 684 determined that the applicable event is not ahead of driver 723 or is such a short term event that it is too far ahead of driver 723, so as to be irrelevant to driver 723, and hence did not transfer driver contact information for driver 723 to the Event Notifier 648 or direct the Event Notifier to transmit the event notification to driver 723.

Six Driver/Six Route Illustrative Examples of Route-Driver Database Use

Figure 13:
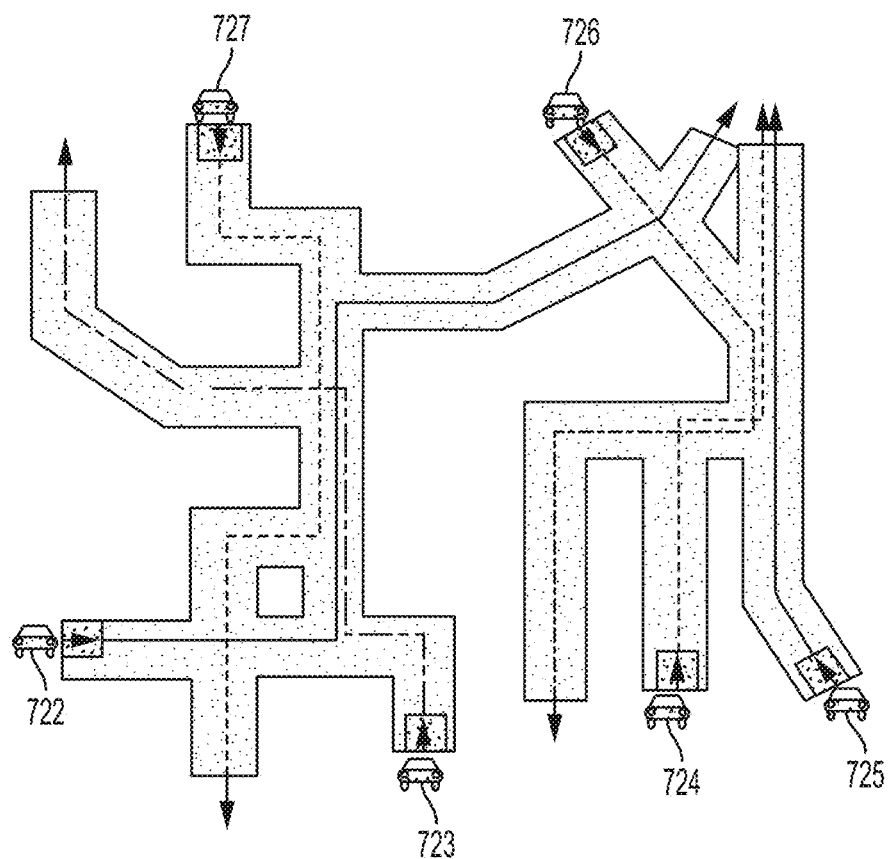
FIG. 13 displays an illustrative six-driver six-trip route schematic depicting driver starting positions and initial portions of their planned routes.

FIG. 13 illustrates a route schematic example of the routes and starting positions of said Drivers 722, 723, 724, 725, 726 and 727.

Figure 13A:
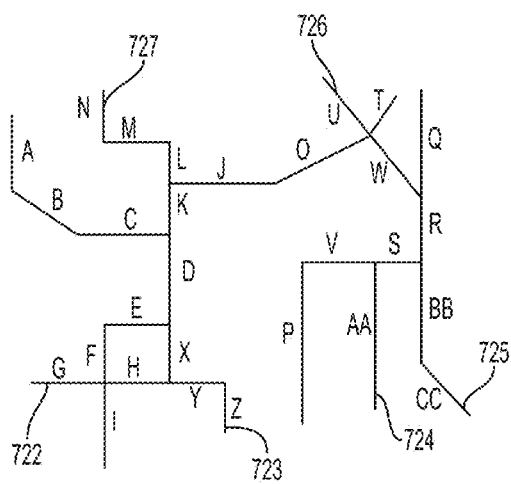
FIG. 13a illustrates the route configuration data that emanates from the Route and Segment Driver Tables within the Route-Driver Database in accordance with the prior work described in U.S. Pat. No. 8,566,026.

FIG. 13*a* displays, for said route schematic example, the route configuration with labeled route segments. Said Route Table 6641 contains sequential segment strings of said Drivers 722, 723, 724, 725, 726, and 727, as well as driver contact information and preferred driver event category. Said Segment Driver Table 6642 is a tabulation of all segments currently utilized by said Drivers 722, 723, 724, 725, 726, 727, and delineates the drivers that utilize each of the segments.

Figure 13B:
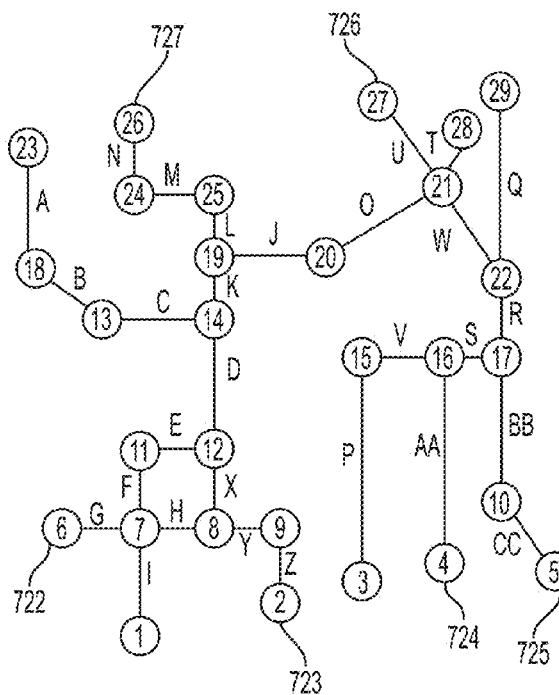
FIG. 13b illustrates the route configuration data that emanates from the Route, Segment Driver and Node Coordinate Tables within the Route-Driver Database in accordance with the prior work described in U.S. Pat. No. 8,566,026.

FIG. 13*b* displays, for said route schematic example, the route configuration with labeled route segments and labeled segment nodes. Said Node Coordinate Table 6643 contains the latitude and longitude coordinates for each of the said segment nodes numbers.

Figure 13C:
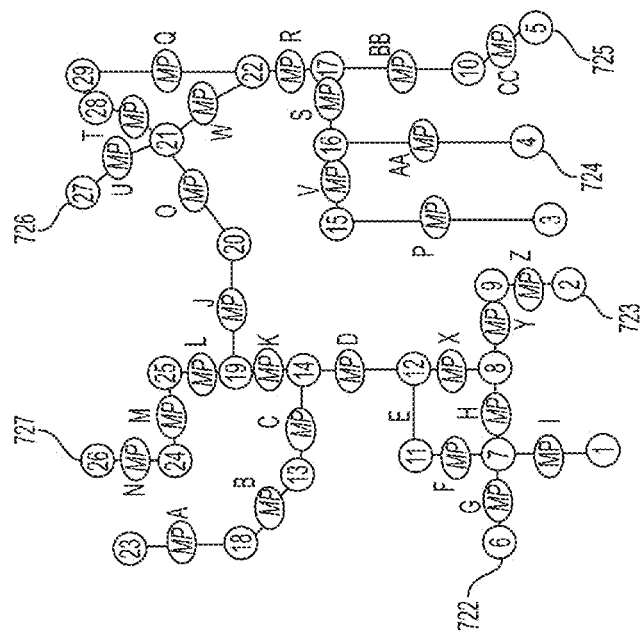
FIG. 13c illustrates the route configuration data that emanates from the Route, Segment Driver, Node Coordinate and Segment Midpoint Tables within the Route-Driver Database in accordance with the prior work described in U.S. Pat. No. 8,566,026.

FIG. 13*c* displays, for said route schematic example, the route configuration with labeled route segments, segment nodes and segment geographic coordinate midpoints. A segment midpoint is calculated as the exact geographic center of the segment.

Figure 14:
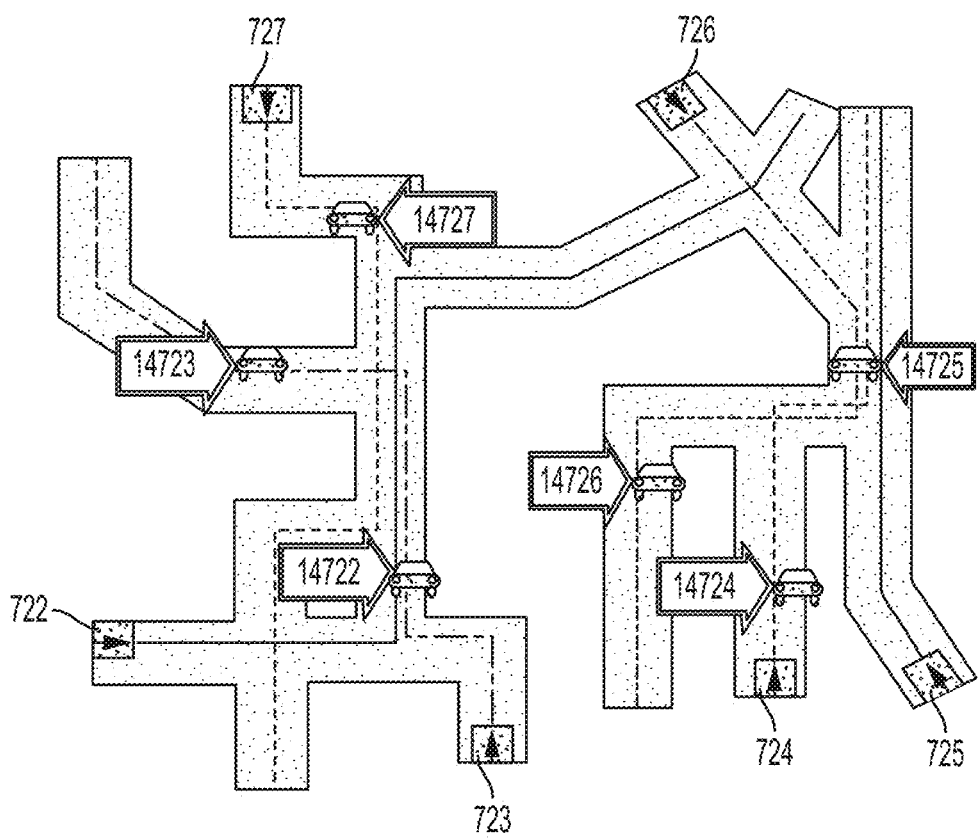
FIG. 14 displays the illustrative six-driver six-route schematic depicting current driver route positions and initial portions of their planned routes.

FIG. 14 illustrates a route schematic example of the routes and current positions of Drivers 14722, 14723, 14724, 14725, 14726 and 14727.

Figure 15:
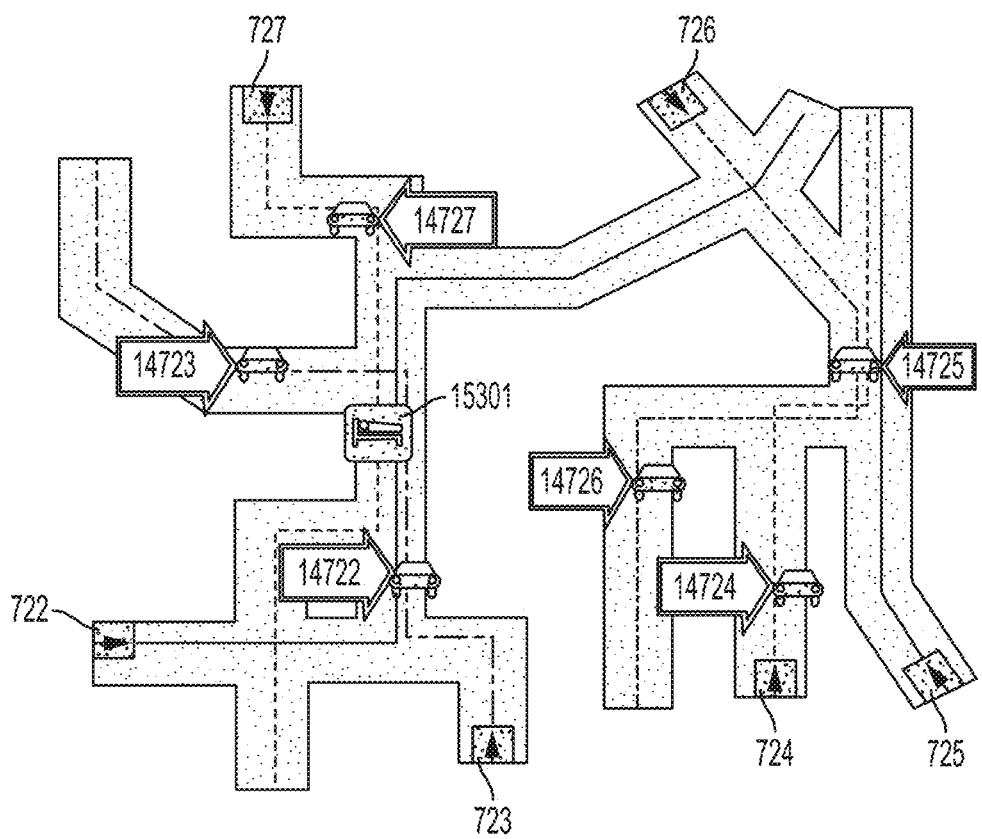
FIG. 15 displays an illustrative route schematic depicting the location of a Service Provider-reported event (a hotel service offering) with current driver route positions.

FIG. 15 illustrates a route schematic example of the routes, current positions of said Drivers 14722, 14723, 14724, 14725, 14726 and 14727 and the location of Service Provider Event Report 15301.

Figure 15A:
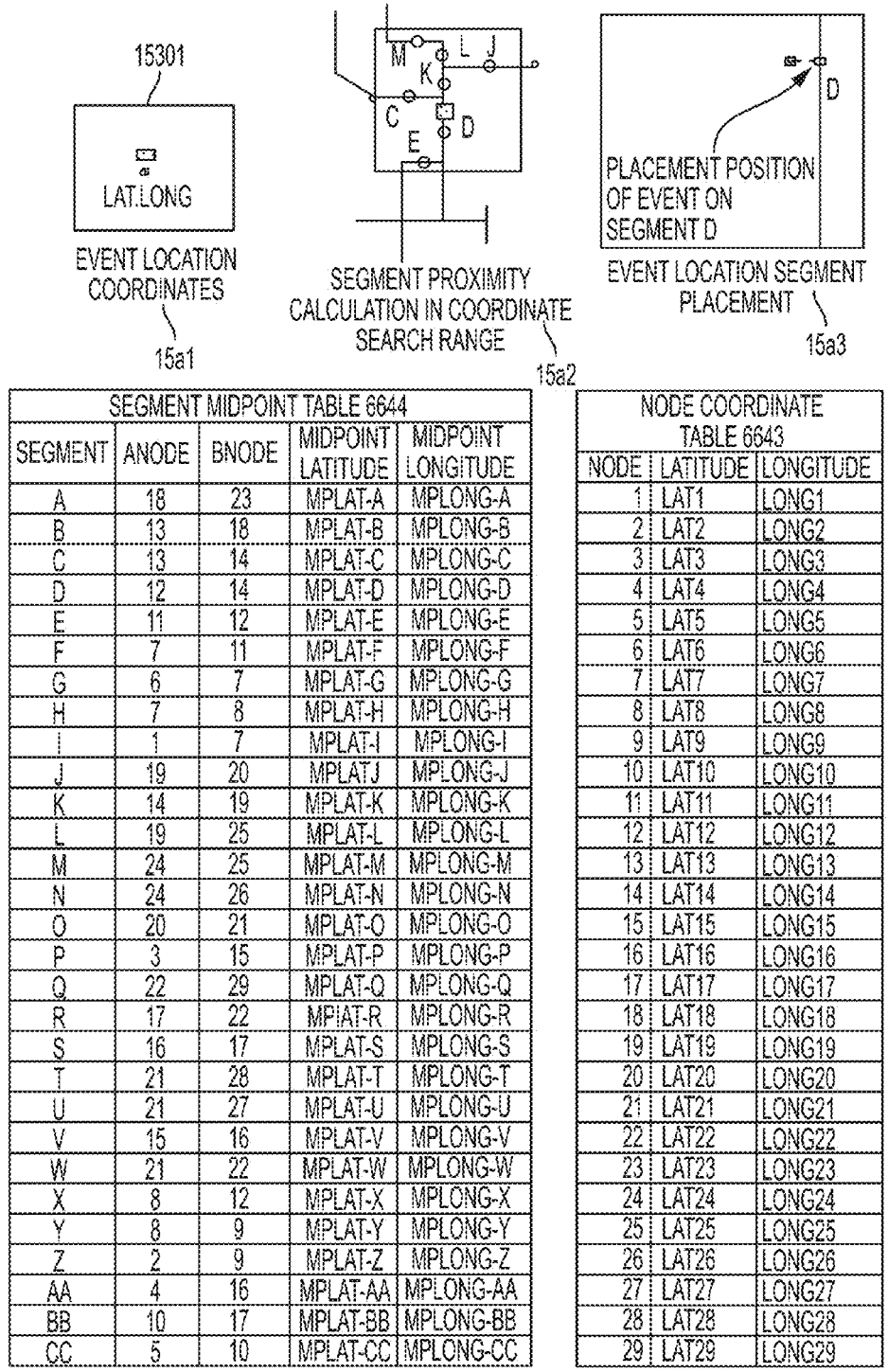
FIG. 15a illustrates the process by which an event report location is placed on the closest route segment using Route-Driver Database tables in accordance with the prior work described in U.S. Pat. No. 8,566,026.

FIG. 15*a* illustrates the process by which said event report is placed on a route segment through the use of said Route-Driver Tables. The geographic coordinates of said Service Provider Event Report 15301 are shown as Event Location Coordinates 15*a*1. From said geographic coordinates a geographic coordinate area search range 15*a*2 is constructed. All midpoints from said Segment Midpoint Table 6644 that lie within midpoint coordinate search range 15*a*2 are identified. Segment numbers and node numbers from said Segment Table 6644 and said Node Coordinate Table 6643 are then used to geographically construct a set of segments for proximity search, in this illustrative case, these segments are C, D, E, J, K, L, and M. Proximity search, in this case, determines that segment D is in closest proximity to the event location, consequently the said Service Provider Report 15301 is to be placed in its offset location on Segment D, which can be observed in 15*a*3.

Figure 15B:
FIG. 15b illustrates the process by which drivers whose routes include the event report location are selected and alerted using Route-Driver Database tables in accordance with the prior work described in U.S. Pat. No. 8,566,026.

FIG. 15*b* illustrates how drivers are selected and alerted by an event report through the use of said Route-Driver Tables. Said Service Provider Event Report 15301 placement location on segment D can be observed in 15*b*1. Said Segment Driver Table 6642 is accessed to determine the drivers whose routes include said segment D. Said Route Table 6641 is then accessed to filter out drivers whose preferences do not include the event report interest category. Said Route Table 6641 is then used to acquire driver contact information so that driver alerts can be made.

Figure 15C:
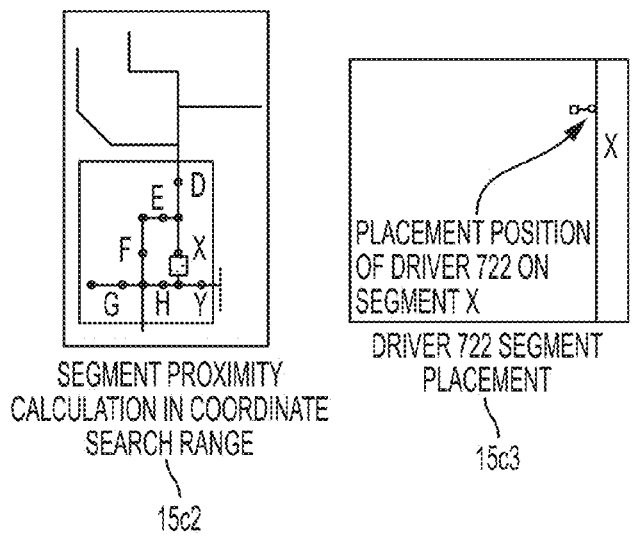
FIG. 15c illustrates the process by which an alerted driver location is placed on the closest route segment using Route-Driver Database tables in accordance with the prior work described in U.S. Pat. No. 8,566,026.

FIG. 15*c* illustrates how the current location of alerted drivers are determined so that notification will be made only to drivers positioned to find the event information relevant and useful, in this illustration, the focus is driver 722. The current geographic coordinates of alerted said driver 722 is displayed in 15*c*1. From said geographic coordinates a geographic coordinate area search range 15*c*2 is constructed. All midpoints from said Segment Midpoint Table 6644 that lie within midpoint coordinate search range 15*c*2 are identified. Segment numbers and node numbers from said Segment Table 6644 and said Node Coordinate Table 6643 are then used to geographically construct a set of segments for proximity search, in this illustrative case, these segments are D, E, F, G, H, X and Y. Proximity search, in this case, determines that segment X is in closest proximity to the current position of said driver 722, consequently said driver 722 is to be placed in its offset location on Segment X, which can be observed in 15*c*3. Said Route Table 6641 is then accessed, where it determined that segment X is prior to segment D, which is where said Service Provider Event Report 15301 is placed, so that said driver 722 will be notified of said Service Provider Event Report. Also to be provided will be the distance ahead that said Service Provider Event is located along the route of said driver 722. Note: should an event location and a current driver location both be placed on the identical segment, the placement distance between both entities on the single segment is calculated.

Figure 16:
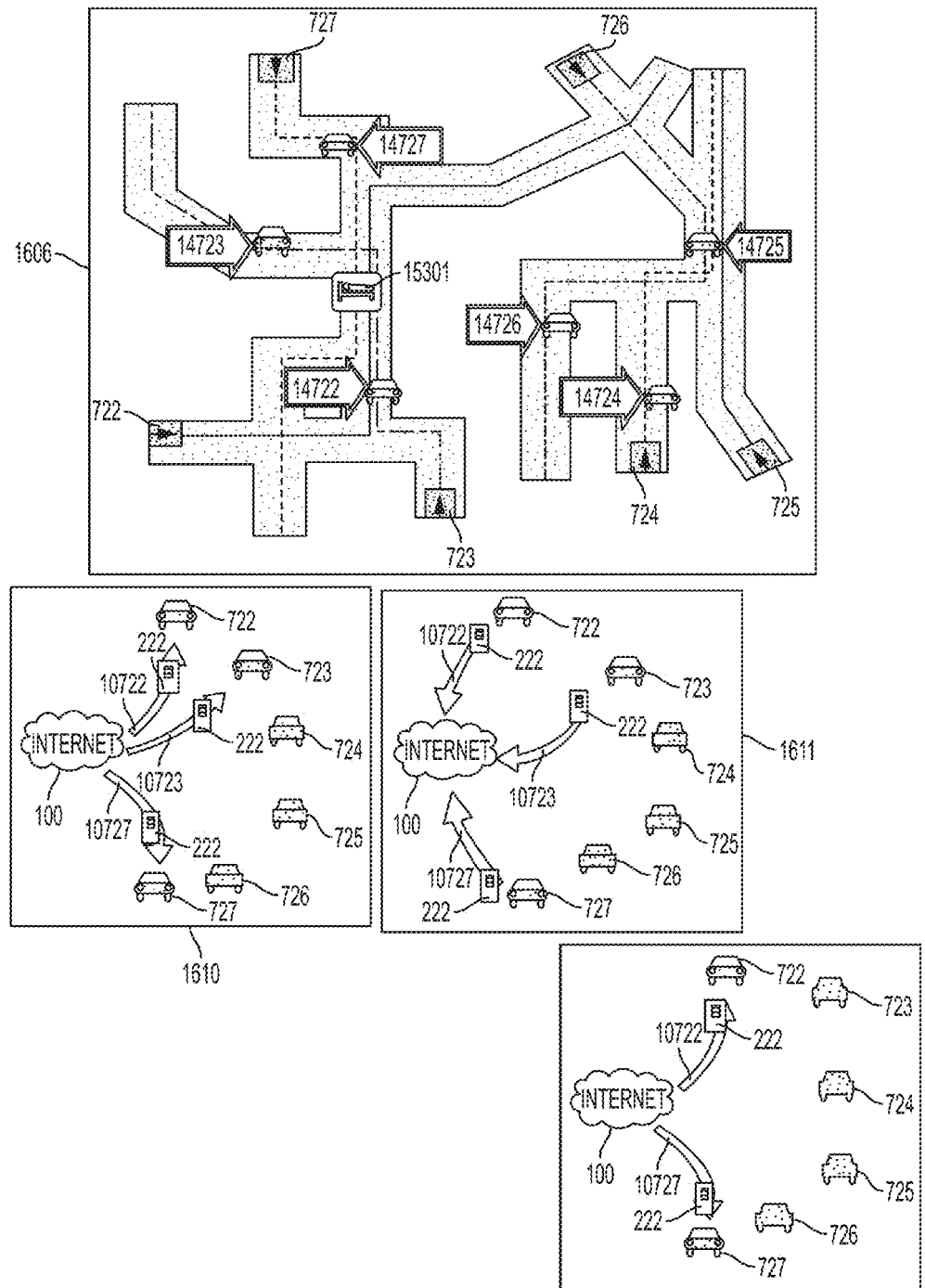
FIG. 16 displays the data flow summary process for driver alert and notification for a service provider event report, in accordance with the prior work described in U.S. Pat. No. 8,566,026.
Figure 17:
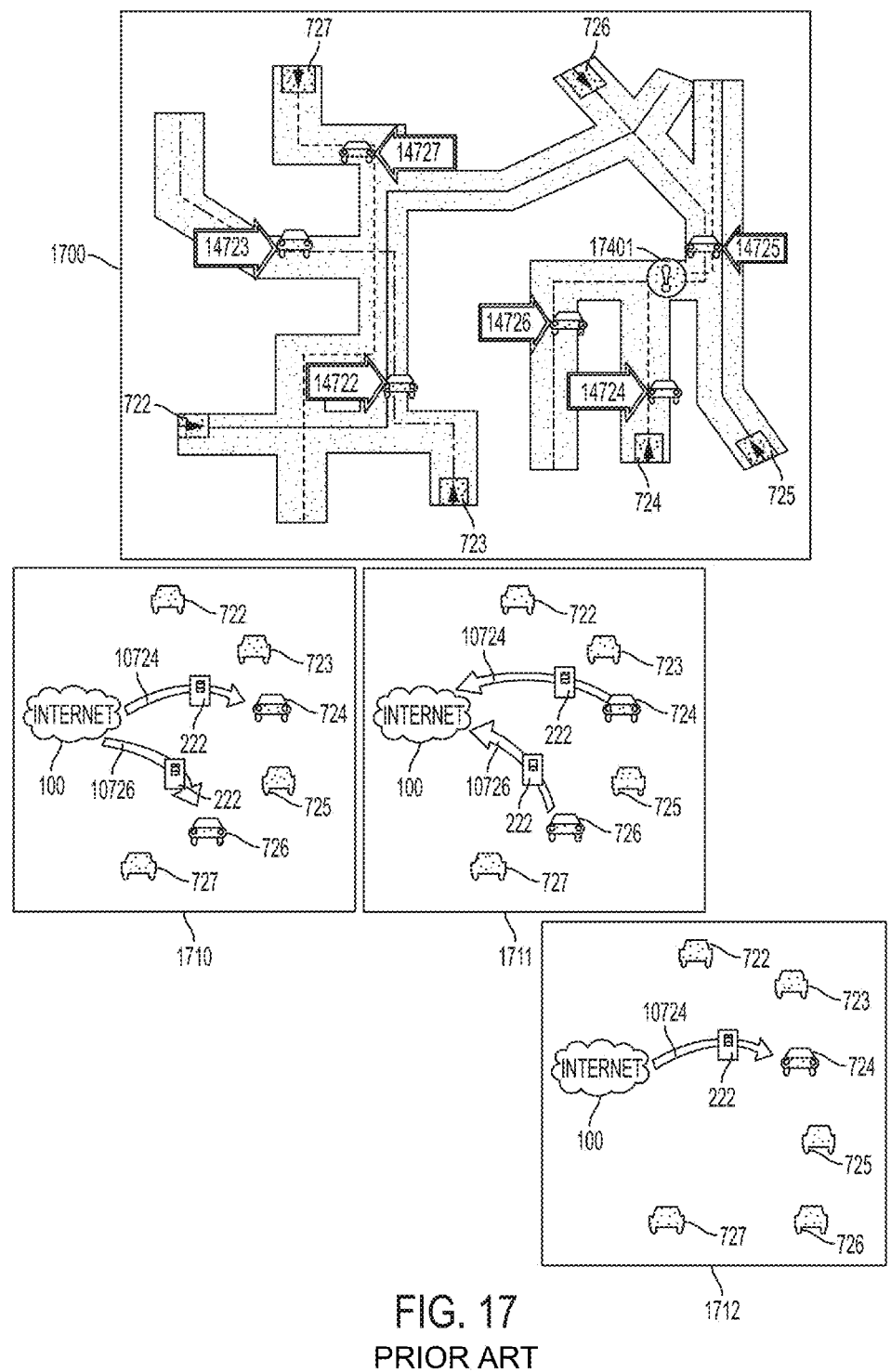
FIG. 17 displays the data flow summary process for driver alert and notification for an emergency event report in accordance with the prior work described in U.S. Pat. No. 8,566,026.
Figure 18:
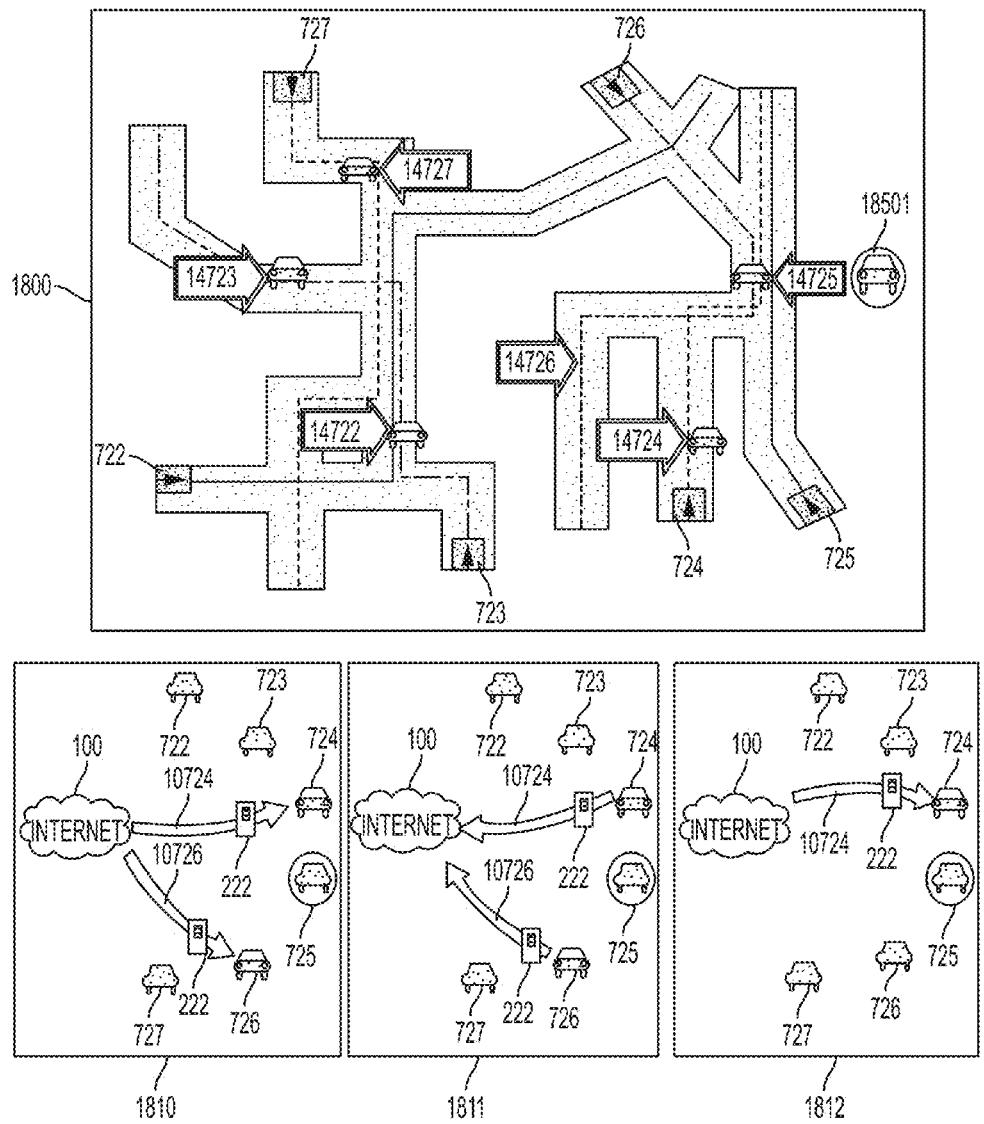
FIG. 18 displays the data flow summary process for driver alert and notification for a Driver-Initiated event report in accordance with the prior work described in U.S. Pat. No. 8,566,026.

FIG. 16 summarizes the driver selection and notification process for a sample service provider event report 15301, incorporating route schematic 1606, event alert 1610, response 1611 and event notification 1612. FIG. 17 summarizes the driver selection and notification process for a sample emergency event report 17401, incorporating route schematic 1706, event alert 1710, response 1711 and event notification 1712. FIG. 18 summarizes the driver selection and notification process for a sample driver observation event report 18501, incorporating route schematic 1806, event alert 1810, response 1811 and event notification 1812.

Second Embodiment of the System Described in
U.S. Pat. No. 8,566,026

Figure 19:
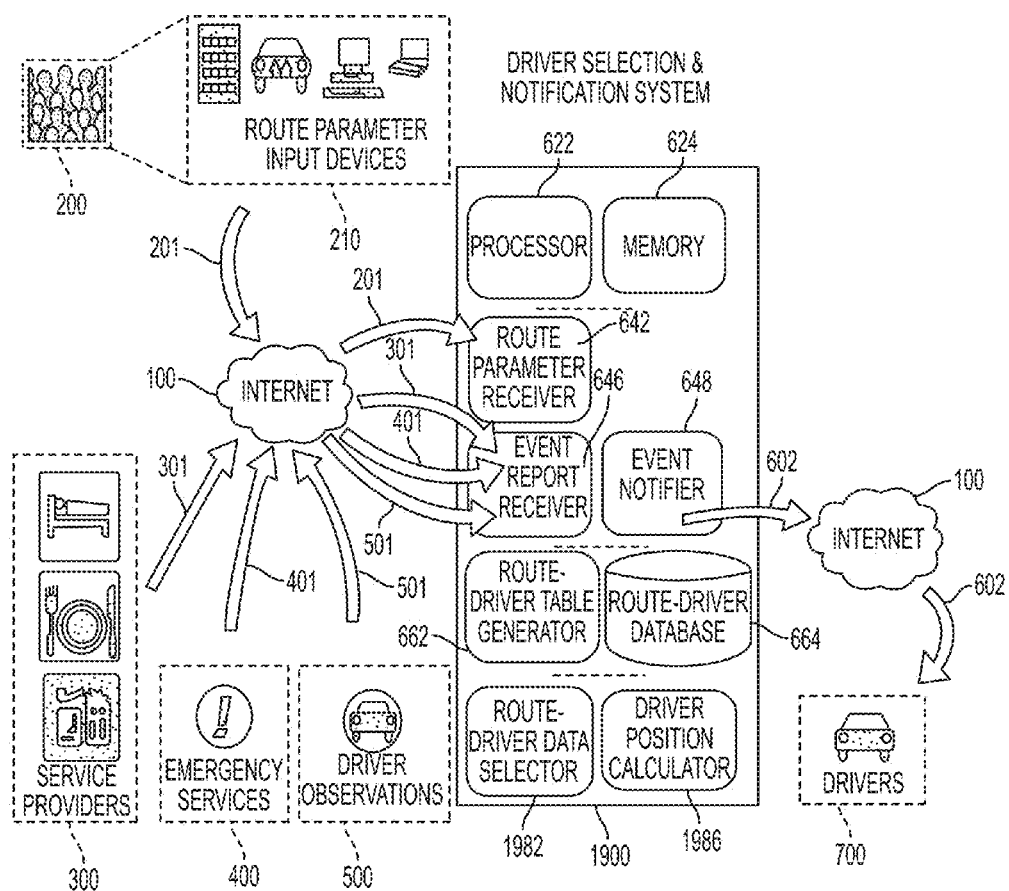
FIG. 19 illustrates a second embodiment of the Driver Selection & Notification System (DSNS) applicable for a centralized highway navigation service, in accordance with the prior work described in U.S. Pat. No. 8,566,026.

FIG. 19 shows a second embodiment of a Driver Selection & Notification System (DSNS) 1900 described in U.S. Pat. No. 8,566,026, which differs from said DSNS 600 in that it incorporates a centralized navigation service technology into the functionality, and primarily differentiates itself from said DSNS 600 by negating the requirement for event alerts to obtain driver positioning information. Instead, the DSNS 1900 utilizes the centralized navigation service to maintain consistent GPS positional contact with all drivers. FIG. 19 is a high-level functional diagram depicting the said DSNS 1900 and its interactions, using similar components as those described above with reference to DSNS 600 and facilitated by Internet 100, with said Highway Trip Planners 200 using said input devices 210 by which said user route parameter data 201 is prepared and sent to said DSNS 1900, said Service Providers 300 sending event reports 301 to said DSNS 1900, said Emergency Services 400 sending event reports 401 to said DSNS 1900, said Driver Observations 500 sending event reports 501 to said DSNS 1900, and said Drivers 700 receiving event notifications 602 from said DSNS 1900.

Figure 20:
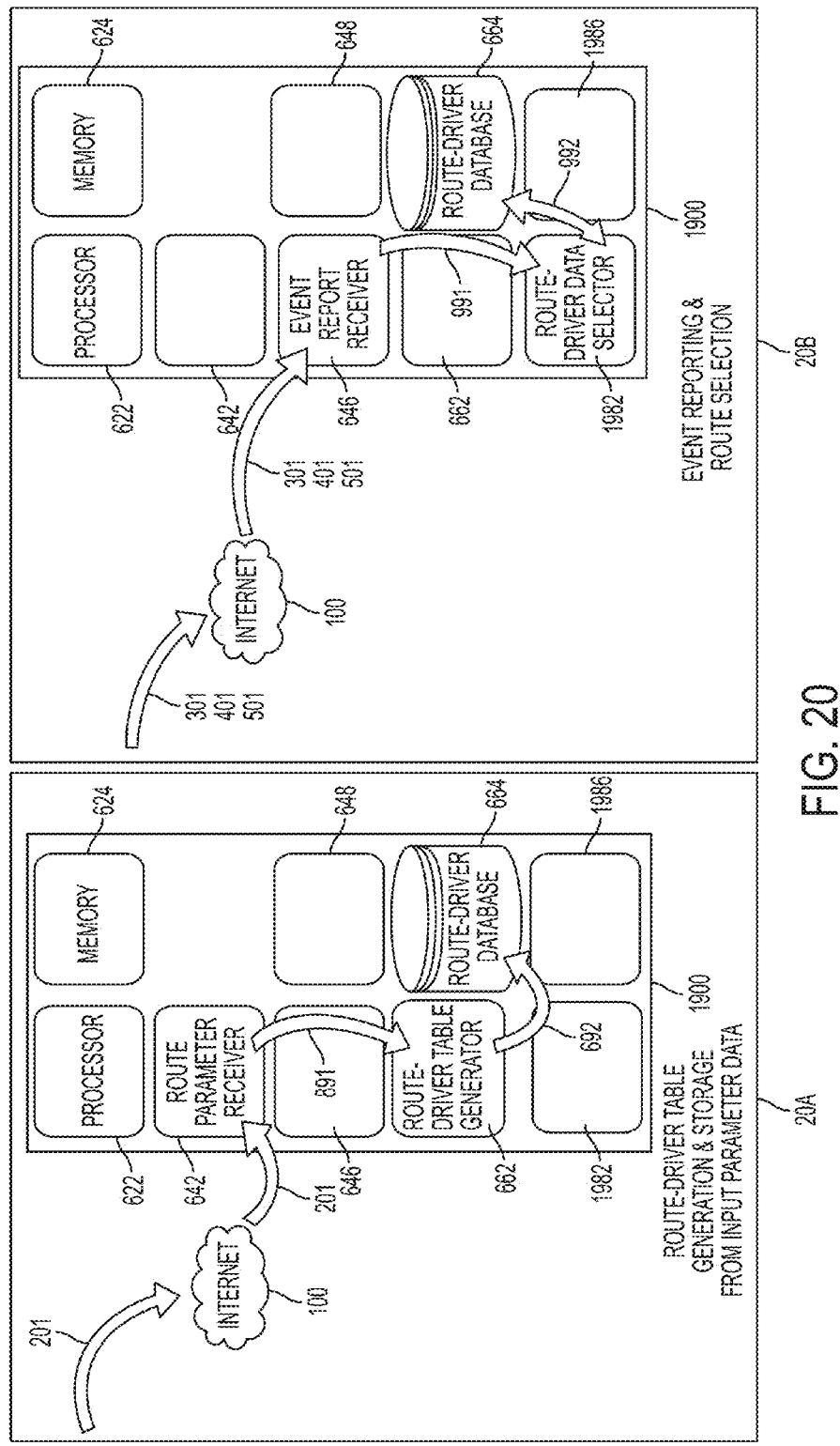
FIG. 20 illustrates interactions with the DSNS applicable for a centralized highway navigation service including the data flow of route parameters received by the DSNS, generating and storing the associated Route-Driver data tables, and the data flow of an event report received by the DSNS and the selection of routes and drivers that include the event location, in accordance with the prior work described in U.S. Pat. No. 8,566,026.

FIG. 20 shows, in block 20A, the route generation performed by said DSNS 1900 in a centralized navigation service technology environment. Said Route Parameter Receiver device 642 receives said route parameter data 201 and, in said interaction 891, transfers data to said Route-Driver Table Generator logic 662. Said Route-Driver Table Generator logic 662 creates Route-Driver data tables, that include route segment strings, segment and node geographic coordinate latitude and longitude values, and driver identification and interest information, including driver contact information such as a smartphone address, based on said route parameter data 201, and stores the Route-Driver data in Route-Driver Database 664. In block 20B is shown the event reporting and route-driver data selection by said DSNS 1900 in a centralized navigation service technology environment. Said Event Report Receiver 646 receives said event report 301, 401 or 501, and, through said interaction 991, transfers said event report data 301, 401 or 501 to said Route-Driver Selector device 1982. Said Route-Driver Selector device 1982, through said interaction 992 with said Route-Driver Database, identifies and selects Route-Driver data records which contain the geographic location corresponding to the location included in said event report data 301, 401, or 501.

Figure 21:
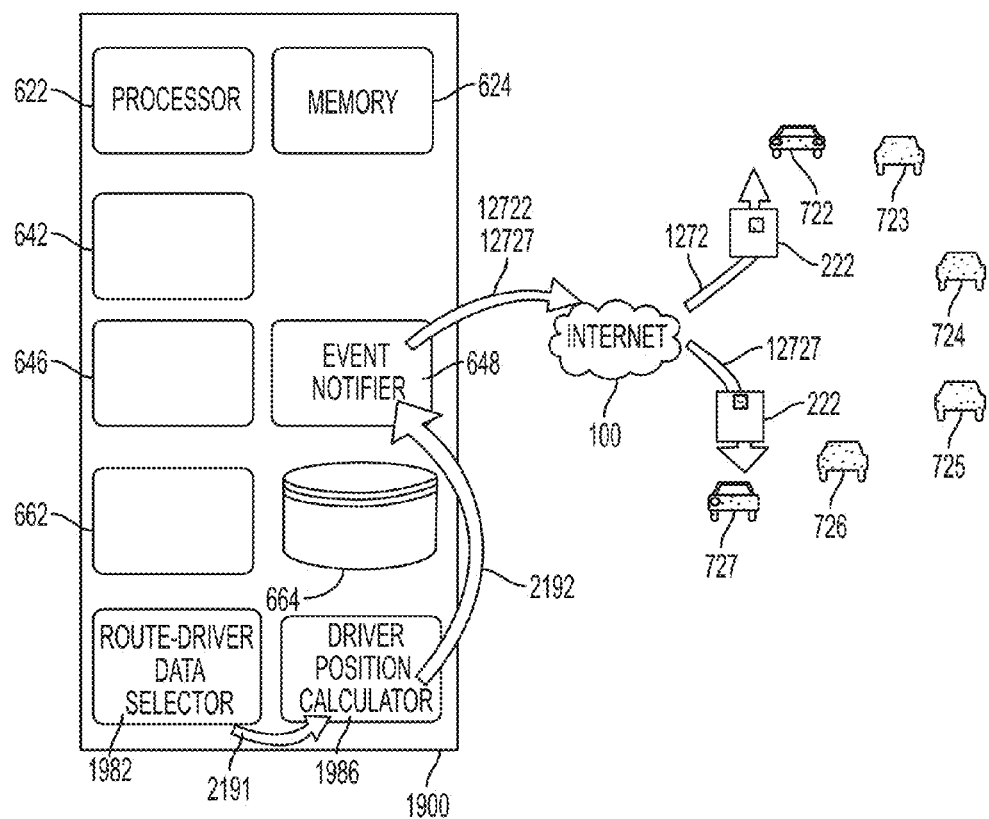
FIG. 21 illustrates the data flow to and from the DSNS applicable for a centralized highway navigation service associated with driver event notification, in accordance with the prior work described in U.S. Pat. No. 8,566,026.

FIG. 21 displays the selected driver event notification by said DSNS 1900 in a centralized navigation service technology environment. If at least one said Route-Driver data record is selected by said Route-Driver Selector logic 1982, through interaction 2191, Driver Position Calculator logic 1986 accesses the current location of selected drivers using the centralized navigation service. If at least one of the selected drivers has a compatible preference category and is positioned so as said event 301, 401 or 501 is located ahead of the driver's current position, but not so far ahead as to make the event irrelevant, said Driver Position Calculator logic 1986, through interaction 2192, transfers driver identification information and a directive to transmit the applicable event notification to the identified driver, to said Event Notifier device 648. In the FIG. 21 example, said Event Notifier device 648 prepares and transmits event notifications 12722 and 12727 to Drivers 722 and 727 in accordance with the directives from the Driver Position Calculator logic 1986.

Overview of the Present Invention

According to an embodiment of the present Invention, the driver is notified of preferred event accessibility expressed in terms of estimated driving time in addition to driving distance. This takes into account and is based on at least the estimated driving time between the driver's current route and the location of the preferred event.

According to another embodiment of the present Invention, the user may initiate and transmit an inquiry as to whether a preferred event is located ahead along the driver's route and within a specified driving time criteria. The driver may also frame the inquiry in terms of driving time or driving distance ahead along the route to the preferred event. An example of a driver-initiated query might be to transmit an inquiry as to whether or not a particular brand of drugstore is located between 3 and 4 hours ahead along the route with no more than a 10 minute off-route driving time.

First Embodiment Of Present Invention

Figure 22:
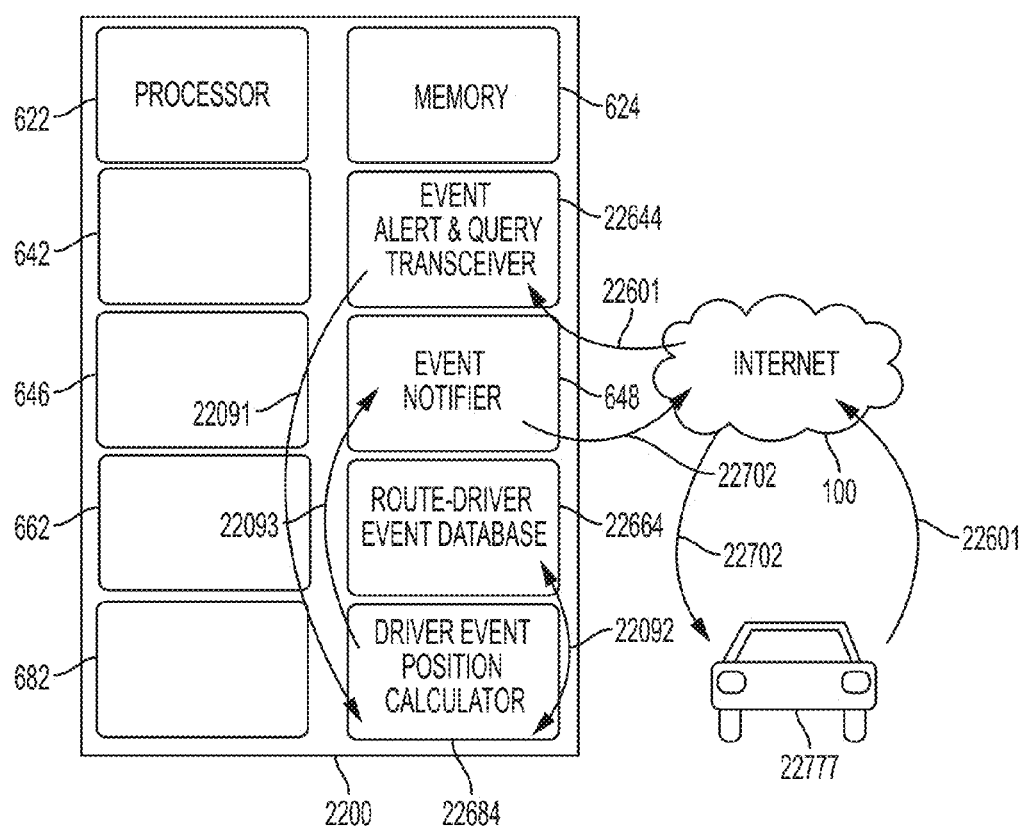
FIG. 22 illustrates an enhanced embodiment of the FIG. 1 Driver Selection & Notification System (DSNS) to include driver-initiated event queries and illustrates augmented data flow that support the driver-initiated inquiry features in accordance with the present Invention.

FIG. 22 shows a first embodiment of a Driver Selection & Notification System (DSNS) 2200, which differs from said DSNS 600 shown in FIG. 1 in that, in addition to said Event Report data, it also includes driver-defined event specification query functionality.

Driver 22777 transmits an Event Specification Query 22601 using smart phone technology 222 and Internet 100, to Event Alert and Query Transceiver device 22644. Event Specification Query 22601 includes at least an event description, any driving time preferences and the current location geographic coordinates of Driver 22777. Event Alert and Query device 22644 receives the Event Specification Query 22601 and, through interaction 22091, transfers the information received in the Event Specification Query 22601 to Driver-Event Position Calculator device 22684.

Driver-Event Position Calculator device 22684, through interaction 22092 with the Route-Driver-Event Database 22664, identifies the current route position of said Driver 22777 using the geographic coordinate information received in Event Specification Query 22601. The Driver-Event Position Calculator device 22684, through interaction 22092 with Route-Driver-Event Database 22664, also searches and identifies event descriptions and locations, if any, which match the driver preferences included of the Event Specification Query 22601. The results of the Event Specification Query 22601 search by the Driver-Event Position Calculator device 22684 are transferred, through interaction 22093, to Event Notifier device 648. Event Notifier device 648 prepares and transmits event notifications 22702, including information regarding events identified as a result of the search, via the Internet 100 to the Driver 22777.

Second Embodiment Of Present Invention

Figure 23:
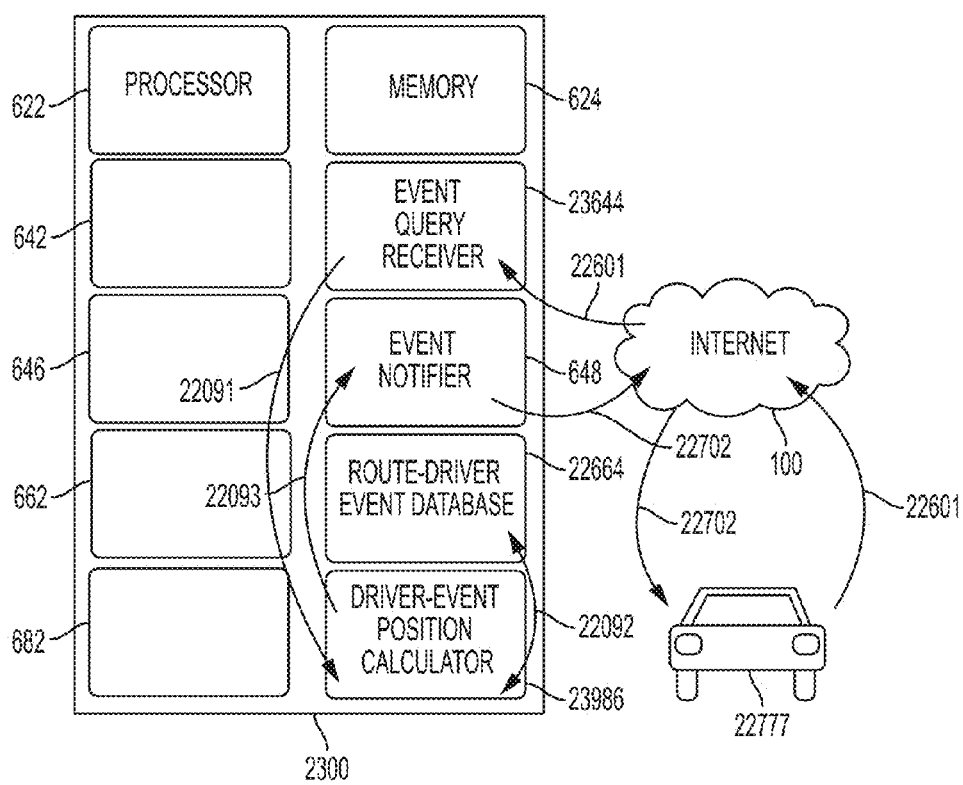
FIG. 23 illustrates an enhanced embodiment of the FIG. 19 Driver Selection & Notification System (DSNS), which incorporates a centralized navigation service technology, and which includes driver-initiated event queries and illustrates augmented data flow that support the driver-initiated inquiry features in accordance with the present Invention.

FIG. 23 displays a second embodiment of a Driver Selection & Notification System (DSNS) 2300, which differs from said DSNS 1900 in that, in addition to said Event Report data, also includes driver-defined event specification query functionality.

Driver 22777 transmits Event Specification Query 22601 using smart phone technology 222 and said Internet 100 to Event Query Receiver device 23644. Event Specification Query 22601 includes at least an event description, driving time preferences and the current location geographic coordinates of Driver 22777. The Event Query Receiver device 23644 receives Event Specification Query 22601 and, through interaction 22091, transfers the information included in the received Event Specification Query 22601 to Driver-Event Position Calculator device 23986.

Driver-Event Position Calculator device 23986, through interaction 22092 with Route-Driver-Event Database 22664, searches and identifies event descriptions and locations, if any, which match the driver preferences in the Event Specification Query 22601. The results of the Event Specification Query 22601 search by the Driver-Event Position Calculator device 22684 are transferred, through interaction 22093, to Event Notifier device 648. The Event Notifier device 648 prepares and transmits event notifications 22702, including the information regarding events identified as a result of the search, via the Internet 100, to the Driver 22777.

FIGS. 24a-24d are a series of drawings that demonstrate how average road segment estimated driving time is derived from a road segment string of coordinate pairs and at least posted speed and distance.

As will be described further below, FIG. 24a-FIG. 24b help to illustrate why driving time is a key factor to be considered by drivers when choosing to travel off-route (that is, off the intended origination to destination planned trip route) to access a particular event.

Figure 24A:
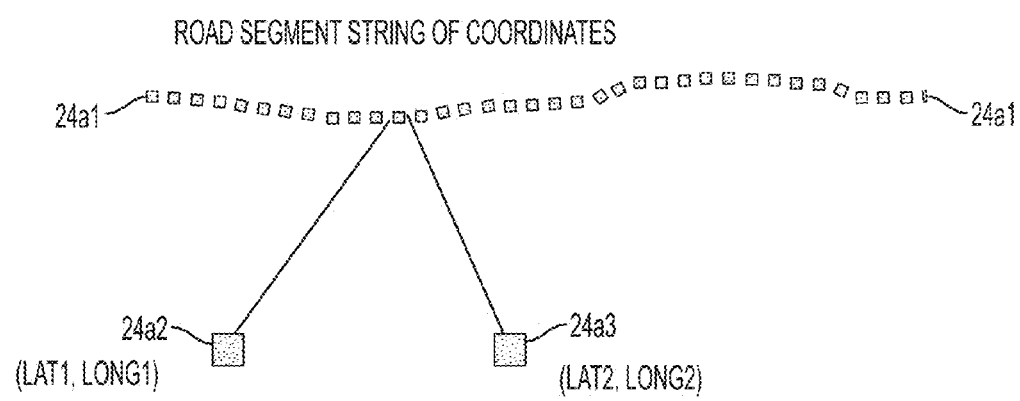
FIG. 24a illustrates a road segment and its string of geographic coordinates.
Figure 24B:
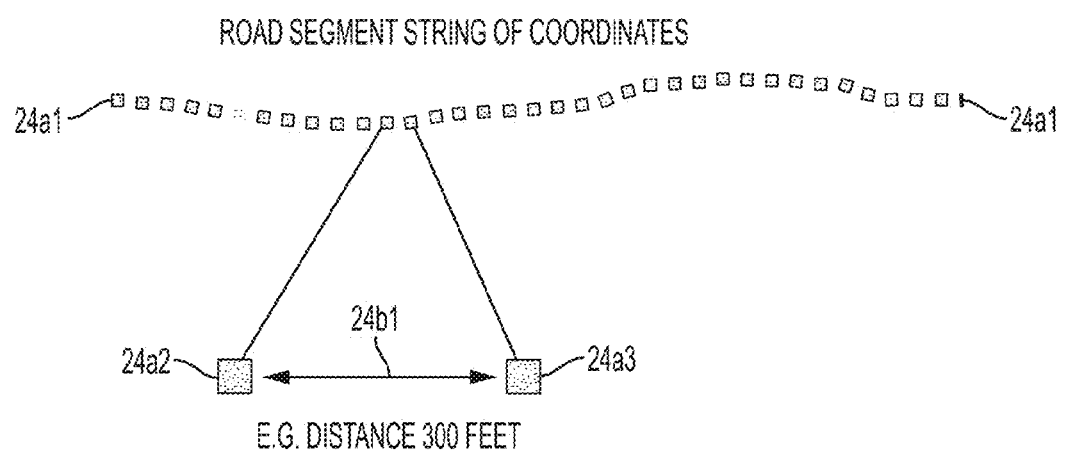
FIG. 24b illustrates coordinate pair distance.

More particularly, FIG. 24a shows Road Segment 24a1, composed of a string of coordinates, with Coordinate Point 24a2 and Coordinate Point 24a3 identified. FIG. 24b shows an exemplary distance of 300 feet between said Coordinate Point 24a2 and said Coordinate Point 24a3.

FIG. 24c is a table of various travel time calculations for traversing the 300 feet based on the designated speed limit, in miles per hour (MPH), along Road Segment 24a1.

Figure 24D:
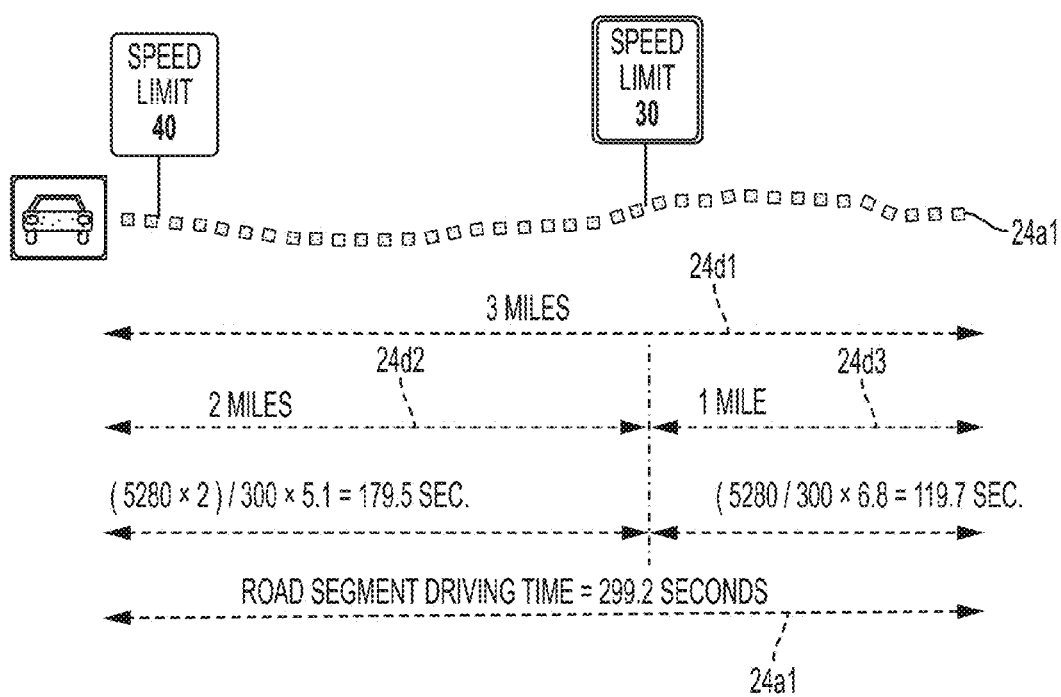
FIG. 24d illustrates how speed limits on a road segment impact driving time on a road segment.

FIG. 24d depicts computations of driving time for Road Segment 24a1. In the depicted example, Road Segment 24a1 has a distance of 3 miles, and is divided into Road Sub-Segment 24d2 having a distance of 2 miles with a posted speed limit of 40 MPH, and Road Sub-Segment 24d3 having a distance of 1 mile with posted speed limit of 30 MPH. Using the Average Speed Table shown in FIG. 24c, the driving time to traverse Sub-Segment 24d2, the driving time to traverse Sub-Segment 24d3, and the total estimated driving time to traverse Road Segment 24a1 can be calculated at least to a tenth of a second.

Figure 25A:
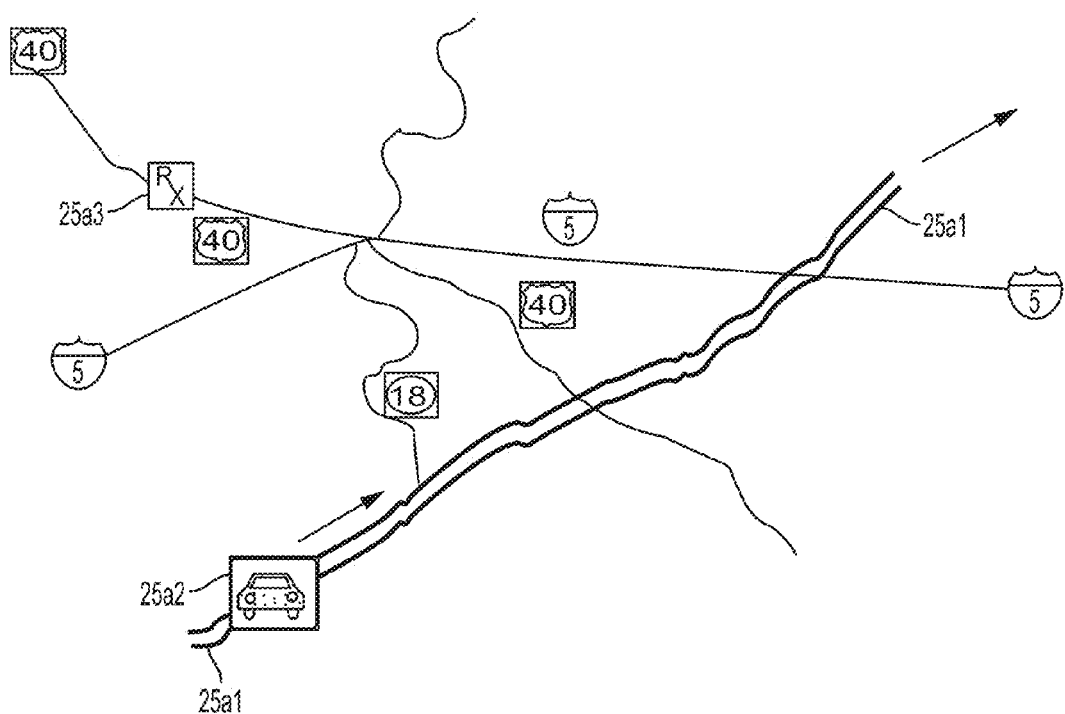
FIG. 25a illustrates a spatial configuration of a driver's route, an off-route event, and alternative roads available that can be used to reach the event.

FIGS. 25a-25e are a series of drawings that demonstrate how off-route driving time is affected by the posted speed limits of road types and other factors. As will be described in detail below, FIG. 25a-FIG. 25e illustrate examples of off-route preferences to an off-route event based on both driving times and driver preferences More particularly, FIG. 25a shows an exemplary Driver 25a2 at a current position on Driver Route 25a1. Said Driver 25a2 has a preference to access Off-Route Event 25a3, which is accessible by said Driver 25a2 via various alternative off-route road segments.

Figure 25B:
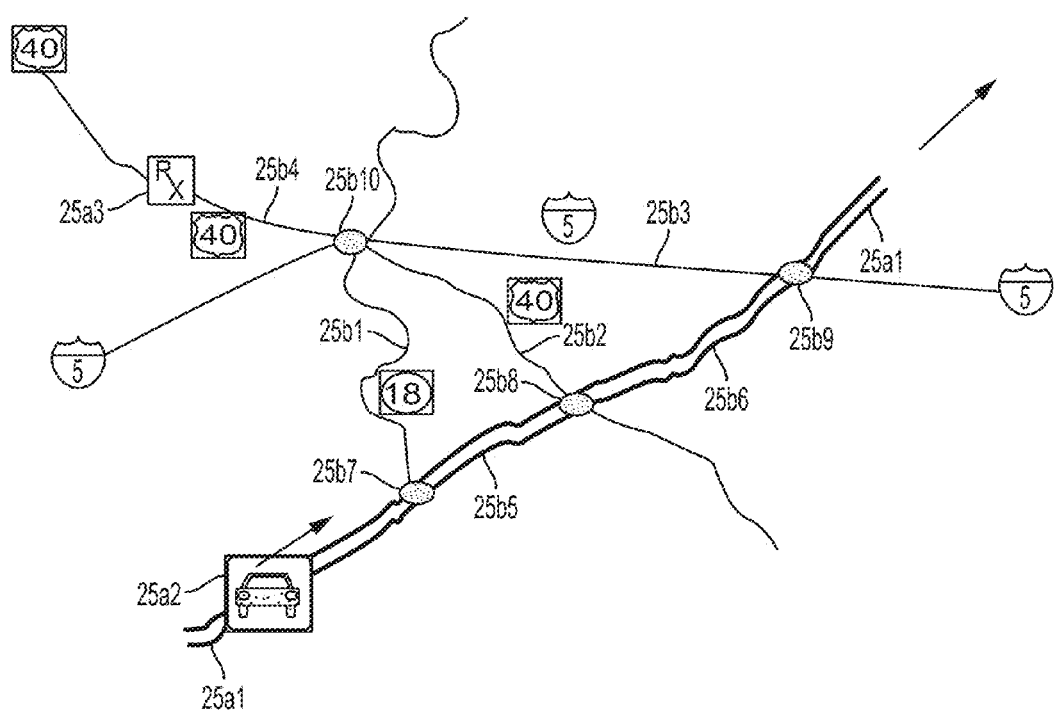
FIG. 25b illustrates pertinent road intersections and alternative road segments that can be used by a driver to reach the off-route event.

FIG. 25b depicts the various alternative off-route Road Segment 25b1, Road Segment 25b2 and Road Segment 25b3 that connect to common Road Segment 25b4 along which said Event 25a3 is located. These various alternative Road Segments can be accessed by said Driver 25a2 turning at Route Intersections 25b7, Route Intersection 25b8 or Route Intersection 25b9.

Figure 25C:
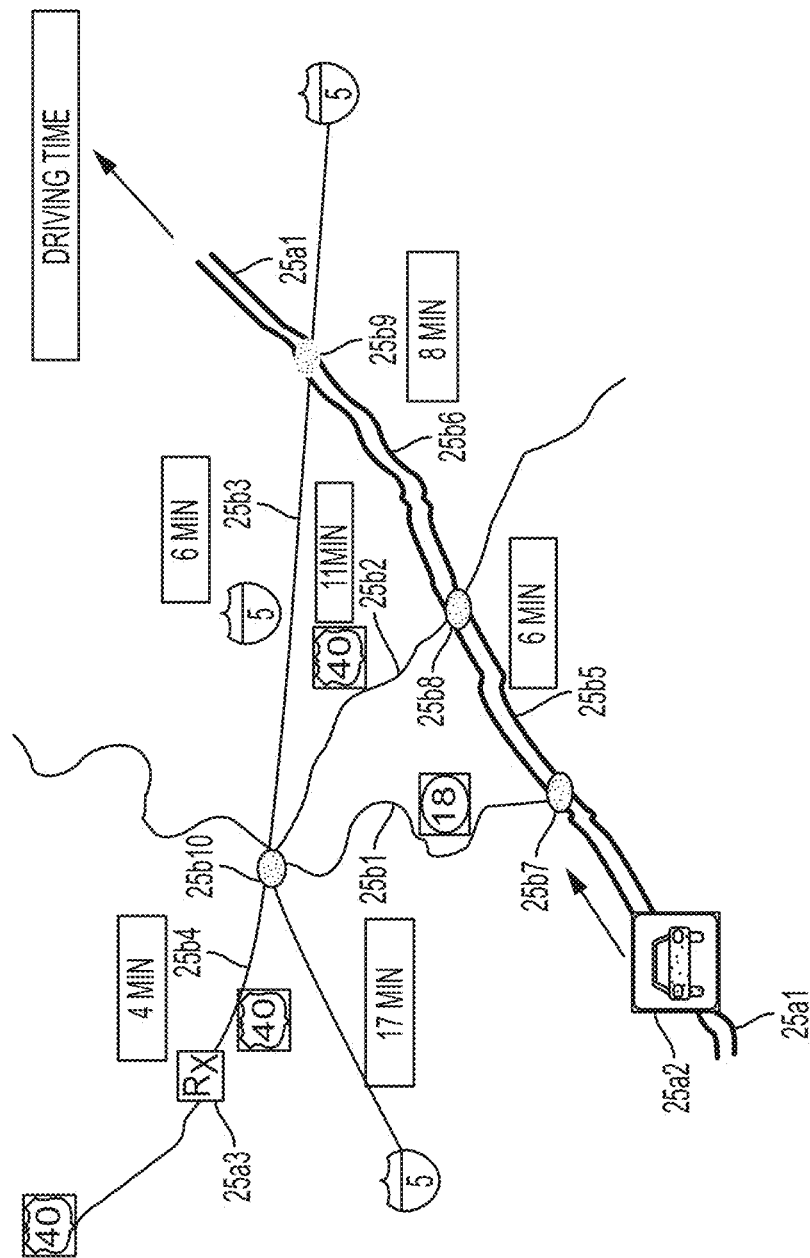
FIG. 25c illustrates alternative road segment driving times that can be used to reach the event.

FIG. 25c shows selected segment driving times, computed as described above with reference to FIG. 24a-24d, for said Road Segment 25b1 (17 minutes), said Road Segment 25b2 (11 minutes), said Road Segment 25b3 (6 minutes), said Road Segment 25b4 (4 minutes), Route Segment 25b5 (6 minutes), and Route Segment 25b6 (8 minutes).

Figure 25D:
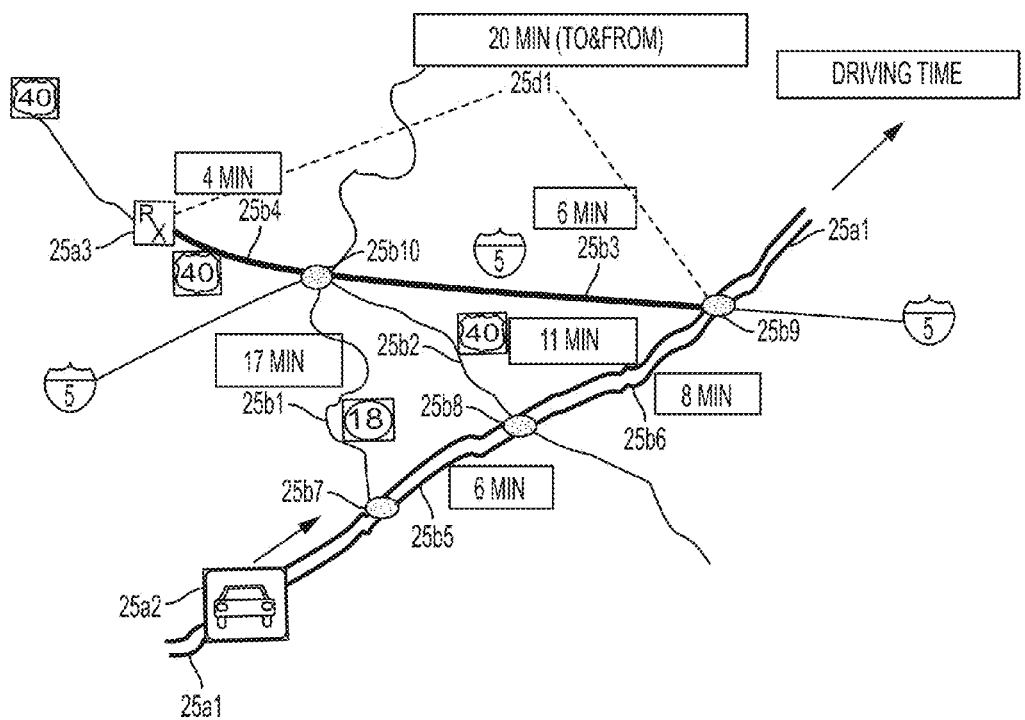
FIG. 25d illustrates the off-route path that should be used by a driver to minimize off-route driving time in accordance with the present Invention.

FIG. 25d depicts a first alternative Off-Route Path 25d1 to said Off-Route Event 25a3 from said Driver Route 25a1, and returning to said Driver Route 25a1 using said Off-Route Path 25d1. The said first alternative Off-Route Path 25d1 to and from said Off-Route Event 25a3 will be the preferred Off-Route Path if the driver preference is to minimize off-route driving time, which, in this example, is a total of 20 minutes. However, it should be noted that the total driving time using first alternative Off-Route Path 25d1 from Route Intersection 25b8 is 28 minutes (said Route Segment 25b6 is used).

As shown in FIG. 25d, Off-Route Path 25d1 includes said Road Segment 25b3 and said Road Segment 25b4, turning off said Driver Route 25a1 at Route Intersection 25b9 to access said Off-Route Event 25a3, and returning back to said Driver Route 25a1, utilizing said Off-Route Path 25d1, at Route Intersection 25b9.

Figure 25E:
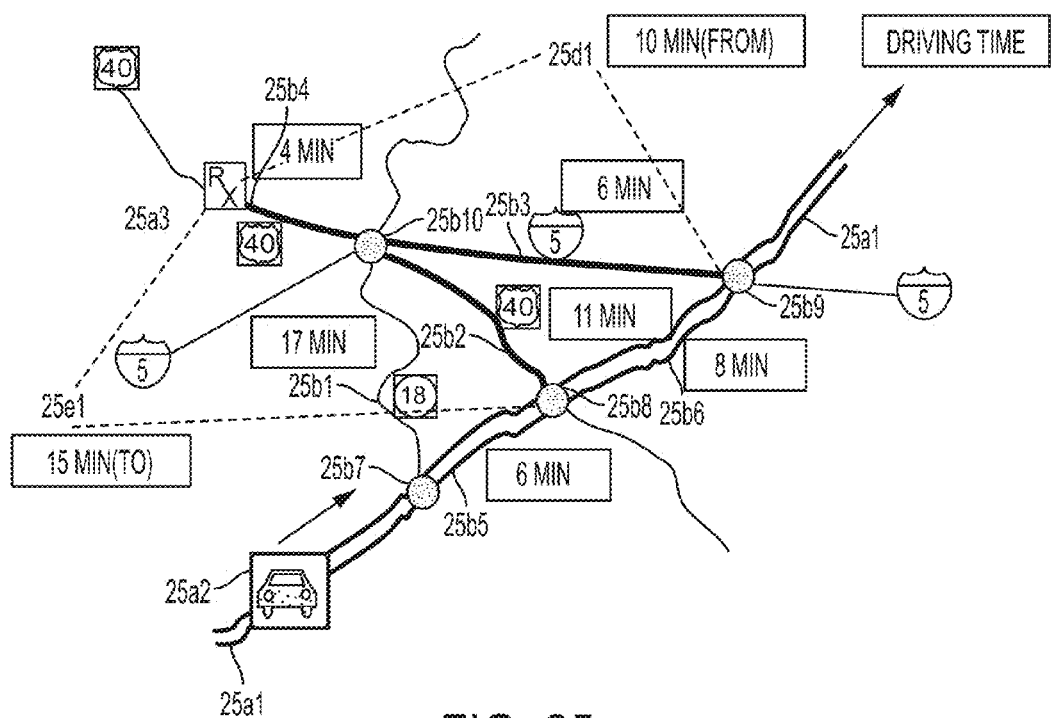
FIG. 25e illustrates the off-route paths that should be used by a driver to minimize overall trip driving time in accordance with the present Invention.

FIG. 25e depicts a second alternative Off-Route Path 25e1 to said Off-Route Event 25a3 and returning to said Driver Route 25a1 using said Off-Route Path 25d1. The second alternative will be the preferred Off-Route Path if the driver preference is to minimize total trip driving time, which in this example is 25 minutes (said Route Segment 25b6 is not used). However, it should be noted that the total off-route driving time using the second alternative Off-Route Path 25e2 is 25 minutes.

As shown in FIG. 25e, Off-Route Path 25e1 includes said Road Segment 25b2 and said Road Segment 25b4, turning off said Driver Route 25a1 at said Route Intersection 25b8 to access said Off-Route Event 25a3, and returning back to said Driver Route 25a1, utilizing Off-Route Path 25d1, at Route Intersection 25b9.

FIGS. 26a-26j are a series of drawings that demonstrate a methodology to both identify an off-route path to an off-route event that minimizes off-route driving time and identify an off-route path that minimizes overall trip driving time. As will be described in further detail below, these drawings illustrate how to search and identify off-route events that meet the preferences of the driver and to identify the off-route path that a motorist should use to access an off-route event if preferences include minimizing off-route driving time or minimizing trip driving time.

Figure 26A:
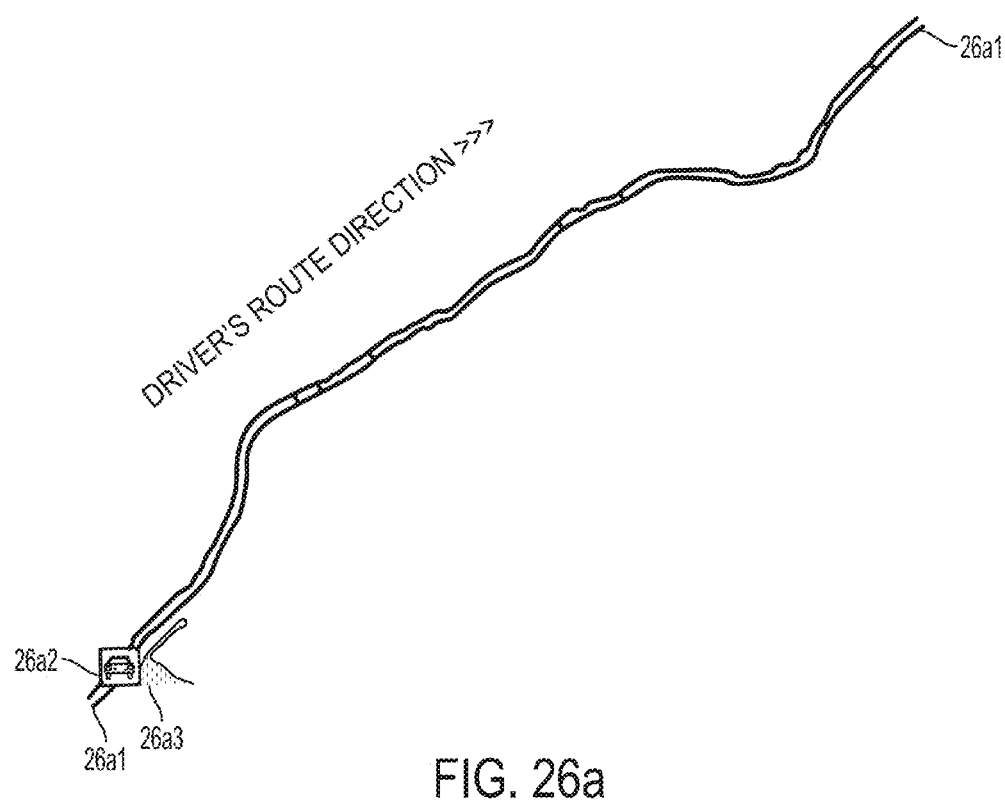
FIG. 26a illustrates a typical spatial road configuration identifying the driver route and current driver position in accordance with the present Invention.

FIG. 26a illustrates Driver Route 26a1 with the current location of Driver 26a2 and topographic Body of Water 26a3.

Figure 26B:
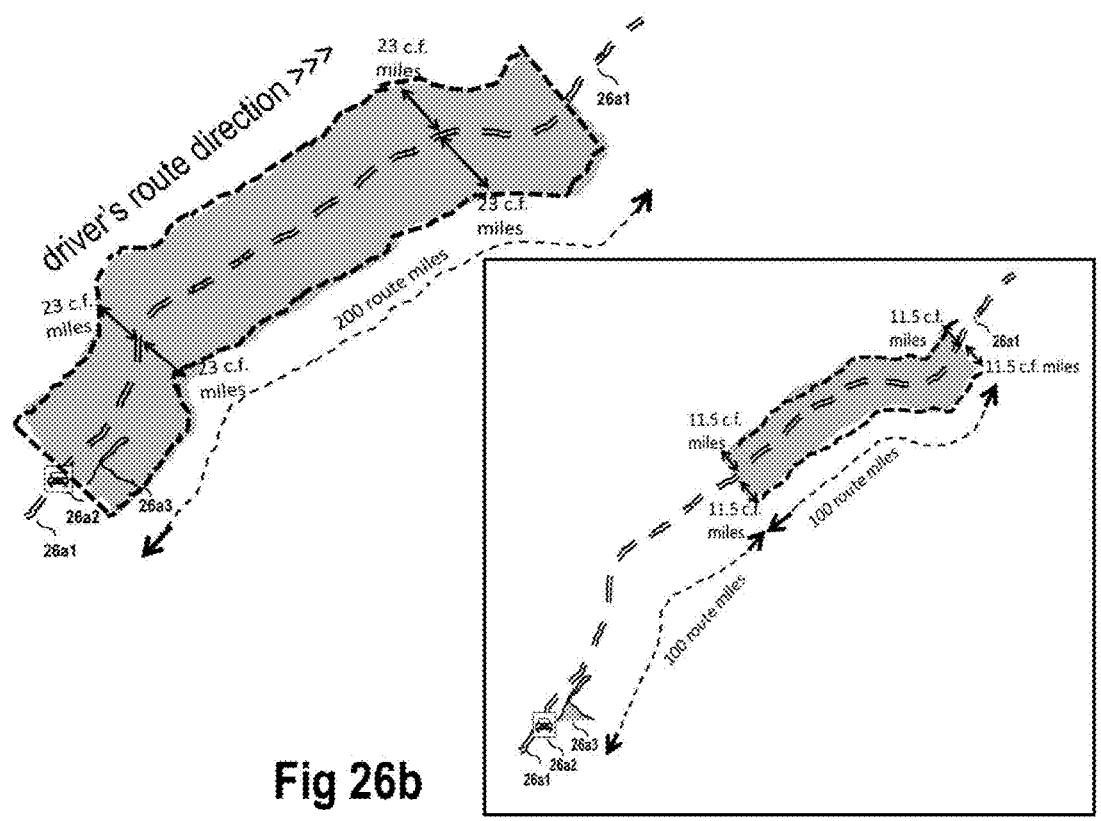
FIG. 26b illustrates an event search corridor as created from driver event preferences in accordance with the present Invention.

FIG. 26b illustrates a method to identify the locations of events, using driver event preferences in accordance with the present Invention. In this example, driver preferences include a request for drugstore events that are located ahead of said Driver 26a2 along said Driver Route 26a1 from the Driver's current position for 200 miles, with a maximum off-route driving time of 20 minutes. Based on these preferences, the present Invention constructs Event Search Corridor 26b1 which is defined from the current position of said Driver 26a2 along said Driver Route 26a1 for 200 miles, with an approximate width of 23 miles either side of said Route 26a1. This corridor width distance can be calculated using a Default Speed, such as 70 MPH, coupled with Driver driving time preference, which in this example is 20 minutes. In this example (i.e. using 70 MPH and 20 minutes), the result is an approximate width of 23 miles either side of said Driver Route 26a1. The Default Speed could also reflect maximum state speed limits, a speed limit based on the priority of the driver preferences, weather conditions, or some other factor. It will be understood that the purpose of using a maximum speed, and an imaginary "crow-fly" straight road to establish the corridor width, is to assure that no identified event will be located beyond the corridor and still be within the driver's driving time preference, regardless of the characteristics of the particular roads involved—unless, of course, the driver was speeding!. It will also be recognized by those skilled in the art that other formulas or techniques could be used to define the corridor width.

Had said Driver 26a2 preferences included a request for drugstore events that are located between 100 and 200 miles ahead along said Driver Route 26a1 with a maximum off-route driving time of 10 minutes, the present Invention would construct Event Search Corridor 26b2, with a corridor width of approximately 11.5 crow-fly miles beginning 100 miles ahead of the Driver's current position along the said Route 26a1 to 200 miles ahead of the Driver's current position. Should the Driver's request specify a minimum and maximum driving time ahead along said Driver Route 26a1, then the length of the event search corridor would be based on the actual speed limit(s) of said Driver Route 26a1.

Figure 26C:
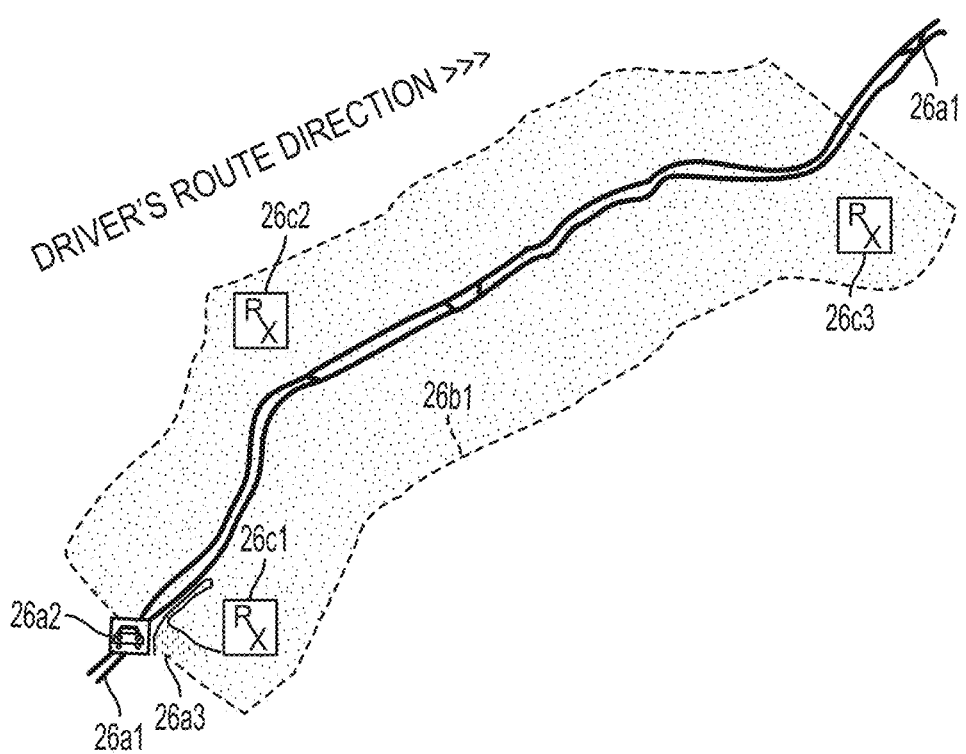
FIG. 26c illustrates the identification of events that are located within the event search corridor in accordance with the present Invention.

FIG. 26c illustrates the identification and locations of events that geographically qualify as being located within the said Event Search Corridor 26b1, as defined by said Driver 26a2 preferences, namely Event 26c1, Event 26c2 and Event 26c3.

Figure 26D:
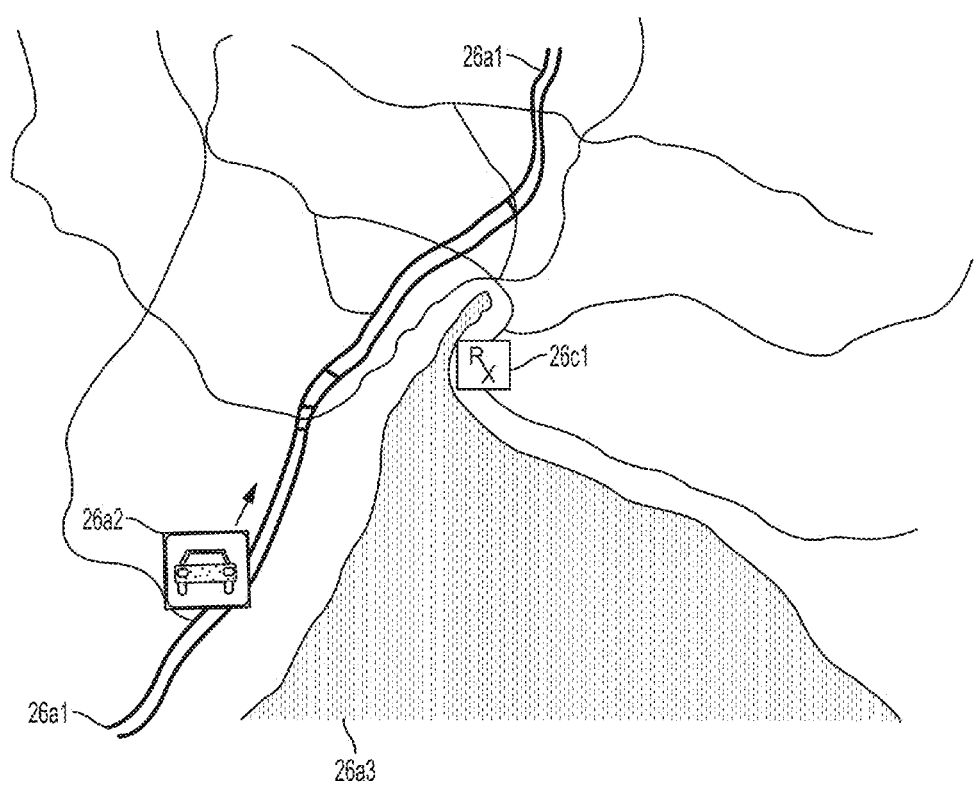
FIG. 26d illustrates a road configuration identifying the driver route, current driver position and an off-route event located within a search corridor in accordance with the present Invention.

FIG. 26d illustrates the road segment configuration surrounding said Off-Route Event 26c1 and displays said Driver Route 26a1 and location of said Driver 26a2 in relation to said Event 26c1.

Figure 26E:
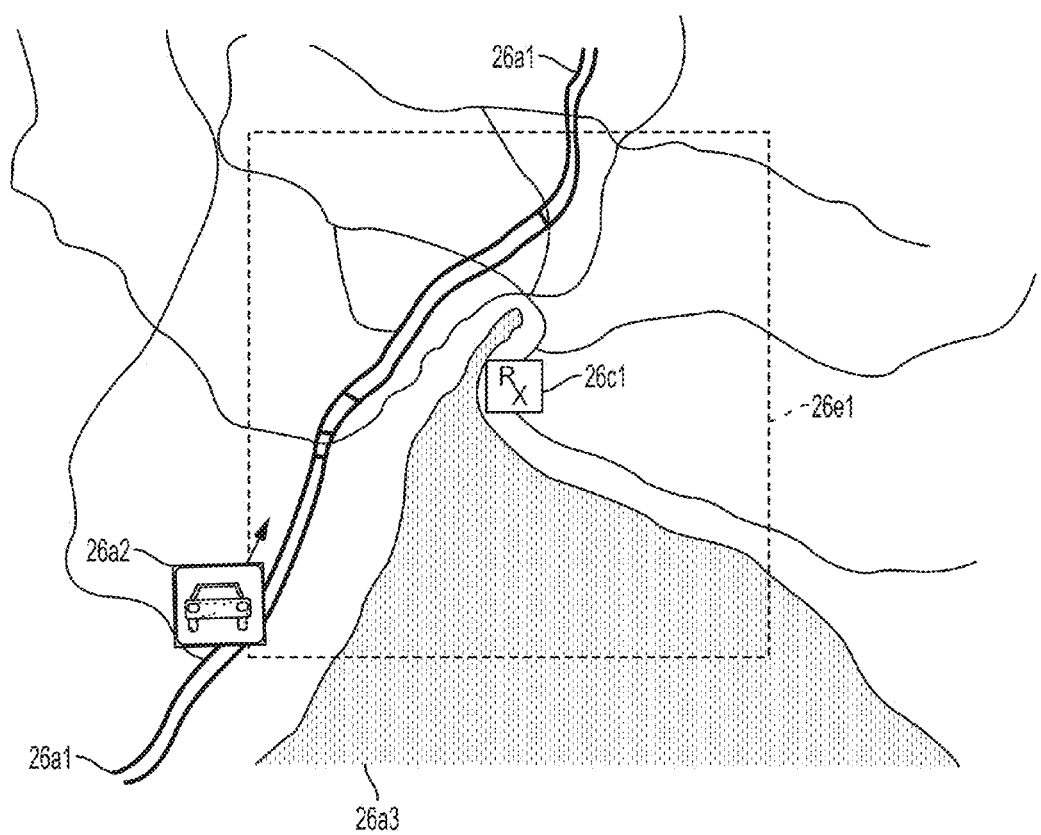
FIG. 26e illustrates a route intersection search area around the off-route event in accordance with the present Invention.

FIG. 26e illustrates Route Intersection Search Area 26e1, which is established based on the geographic coordinates of Off-Route Event 26c1. More particularly, the Route Intersection Search Area 26e1 size is established based on one or more factors. The factors may include a standard geographic range, the local topography, the type of event, the level of urgency, and/or other factors relevant under the particular circumstances to a driver's access to a particular preferred Off-Route Event from the driver's current Driver Location.

Figure 26F:
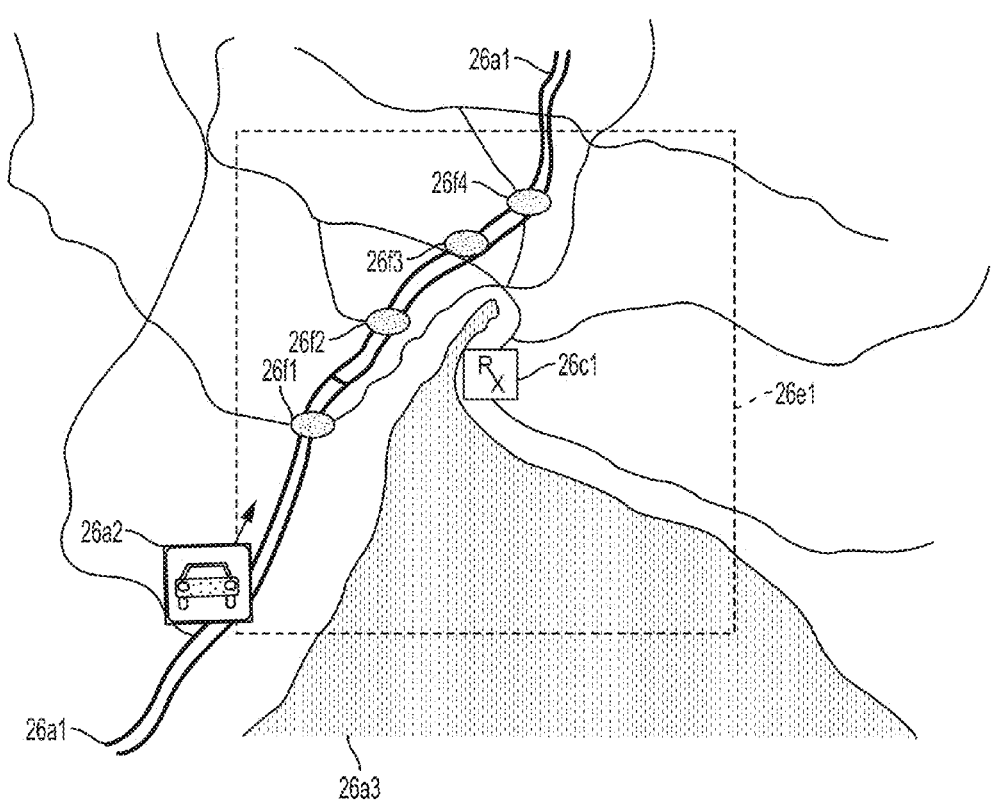
FIG. 26f illustrates driver route intersections that are located within the route intersection search area in accordance with the present Invention.

FIG. 26f shows Route Intersection 26f1, Route Intersection 26f2, Route Intersection 26f3, and Route Intersection 26f4 along Driver Route 26a1 within Route Intersection Search Area 26e1.

Figure 26G:
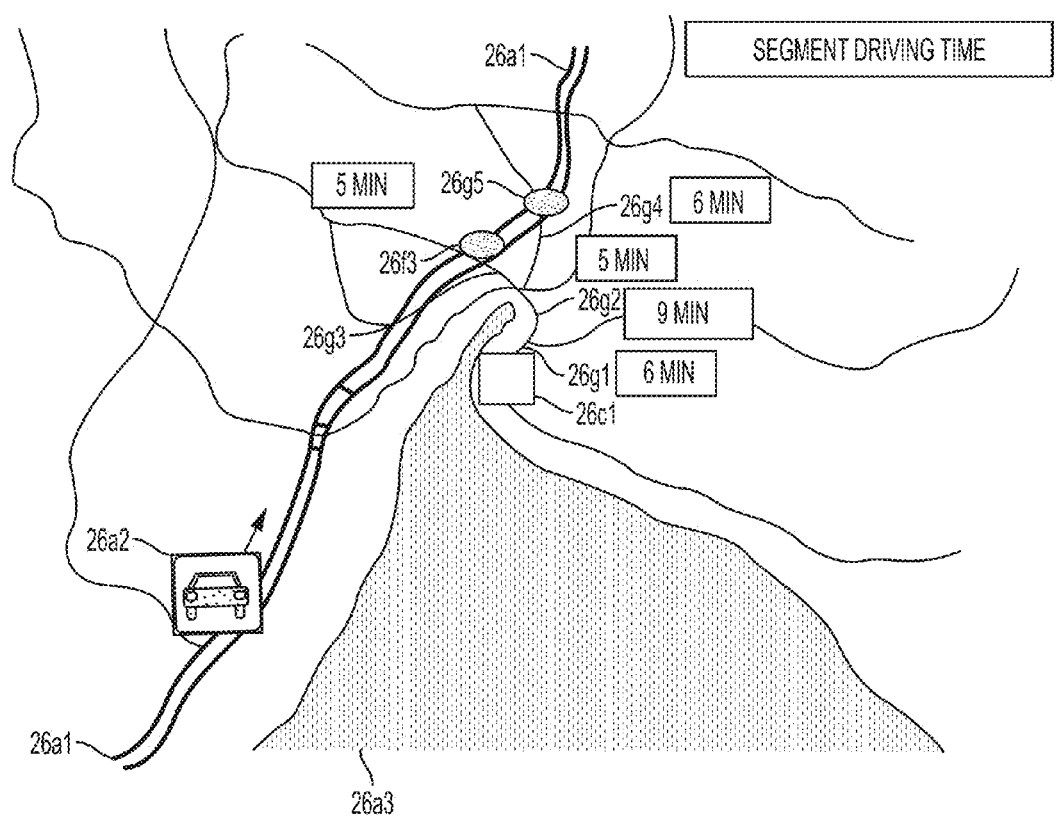
FIG. 26g illustrates the segment driving times of the off-route path that minimizes off-route driving time to an off-route event in accordance with the present Invention.

FIG. 26g depicts pertinent road and route segments and segment driving times that will meet the driver preferences of minimizing off-route driving time and minimizing trip driving time; Road Segment 26g1 (6 minutes), Road Segment 26g2 (9 minutes), Road Segment 26g3 (5 minutes), Road Segment 26g4 (6 minutes) and Route Segment 26g5 (5 minutes) associated with segment driving times between said Off-Route Event 26c1 and said Driver Route 26a1.

Figure 26H:
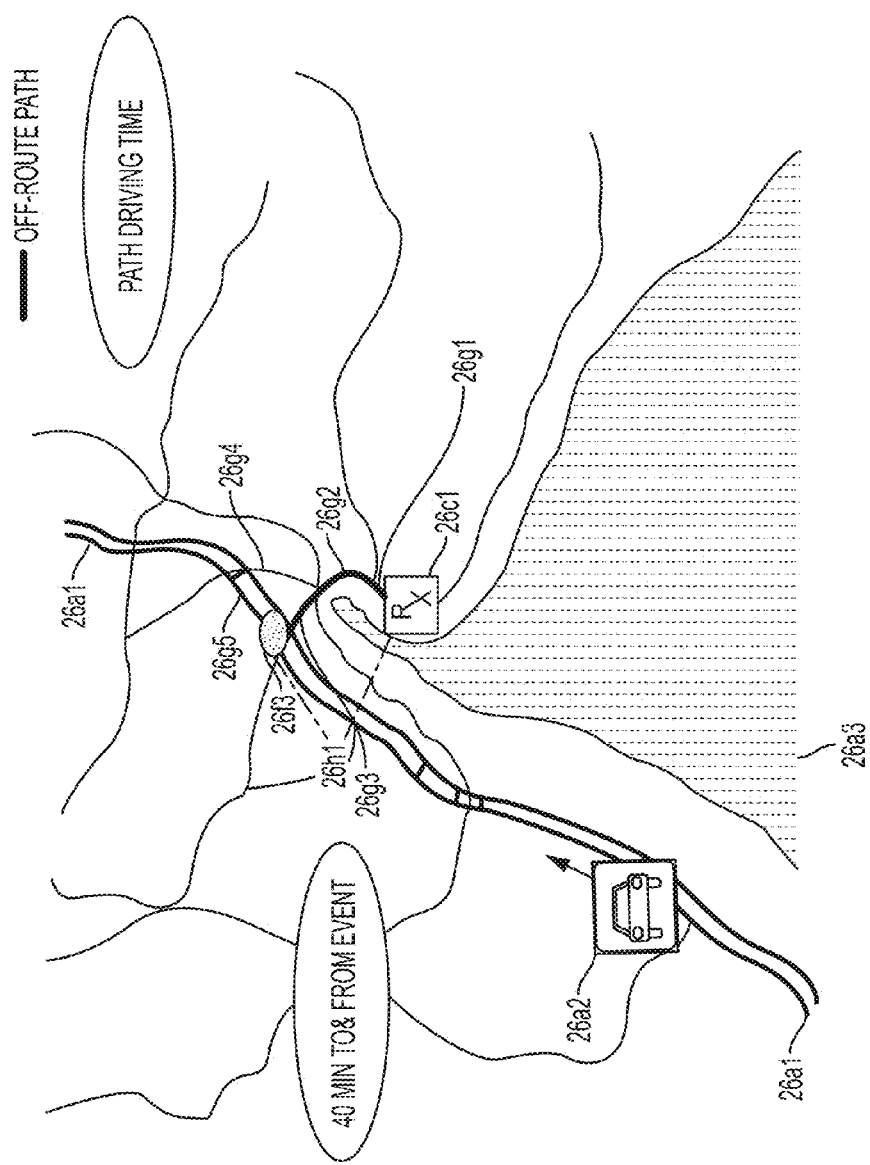
FIG. 26h illustrates the one-way off-route path that minimizes off-route driving time in accordance with the present Invention.

FIG. 26h depicts a first alternative Off-Route Path 26h1 having the minimum off-route driving time between said Off-Route Event 26c1 and said Driver Route 26a1. Thus, this first alternative off-route path will be the preferred Off-Route Path if the driver preference is to minimize off-route driving time.

As shown in FIG. 26h said Off-Route Path 26h1 includes said Road Segment 26g1, said Road Segment 26g2 and said Road Segment 26g3, turning off said Driver Route 26a1 at said Route Intersection 26f3 to access said Off-Route Event 26c1, and returning back to said Driver Route 26a1 at said Route Intersection 26f3, utilizing the same said Off-Route Path 26h1.

In this example, said Off-Route Path 26h1 is the minimum off-route driving time to said Off-Route Event 26c1 and also first alternative return off-route path for a total of 40 minutes, which minimizes off-route driving time. However, it should be noted that the total driving time to said Route Intersection 26c4 using the said Off-Route Path 26h1 both to and from said Off-Route Event 26c1 is 45 minutes, because it would include an additional 5 minutes of driving time on said Route Segment 26g5.

Figure 26I:
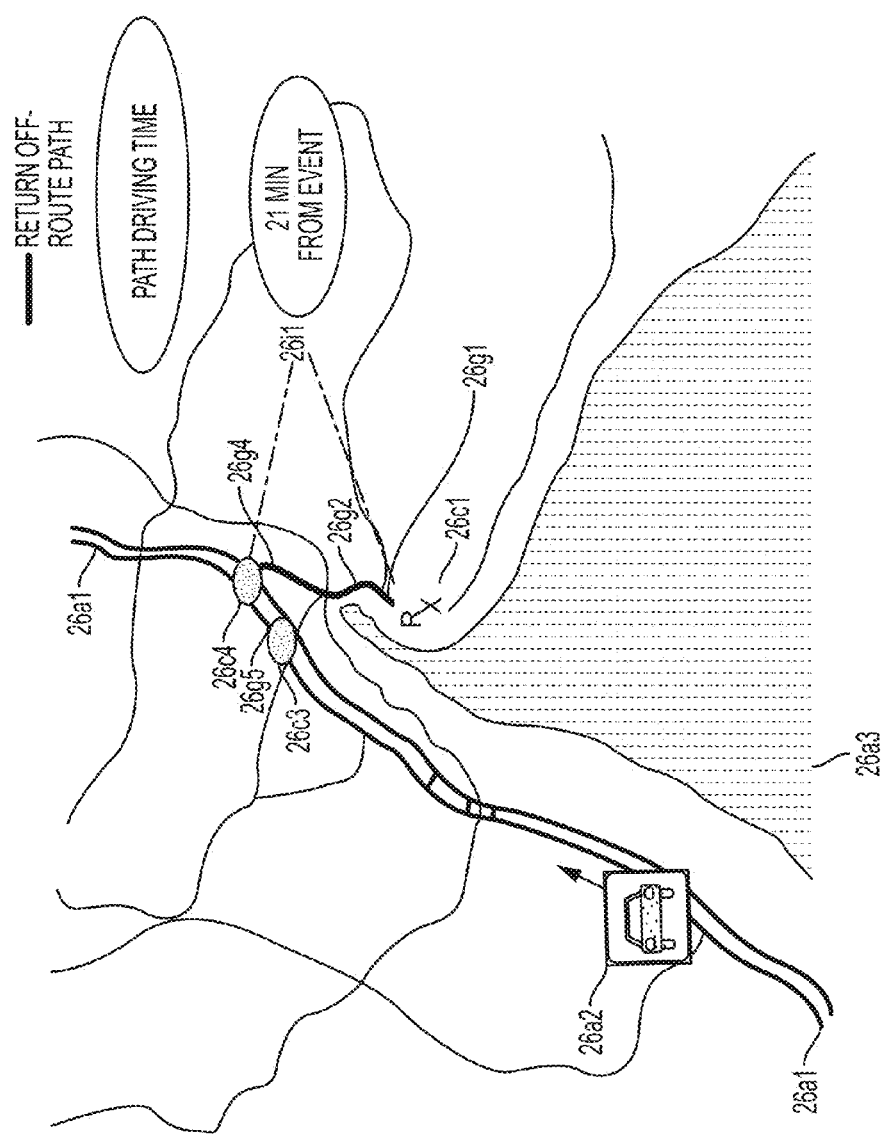
FIG. 26i illustrates the return off-route path that minimizes trip driving time delay in accordance with the present Invention.

FIG. 26i depicts a second alternative return Off-Route Path 26i1 having the minimum off-route driving time of 21 minutes between said Off-Route Event 26c1 and said Driver Route 26a1 at said Intersection 26c4. Thus, this said second alternative return Off-Route Path 26i will be the preferred return off-route path if the driver preference is to minimize total trip driving time, because the driver does not have to absorb the 5 minute driving time required to traverse said Route Segment 26c5.

Figure 26J:
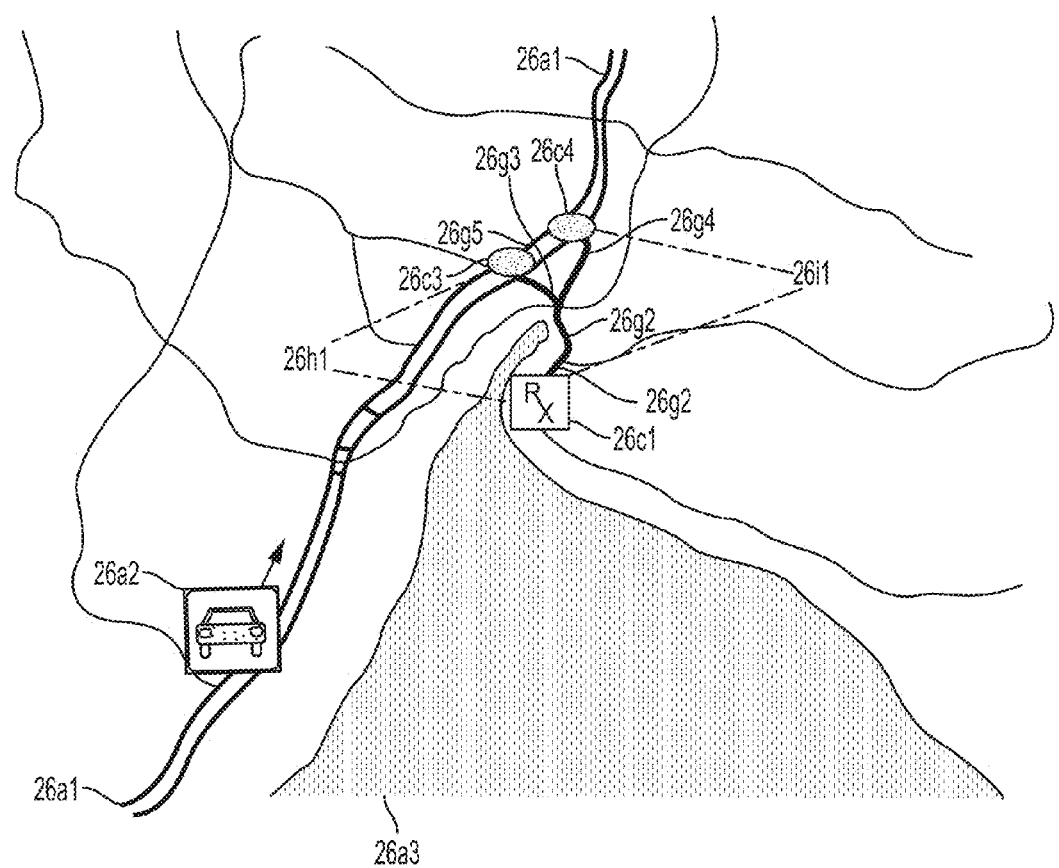
FIG. 26j illustrates alternate off-route paths that minimize either off-route trip driving time or trip driving time delay in accordance with the present Invention.

FIG. 26j illustrates the driving time comparison between driver preferences that minimize off-route driving time and driver preferences that minimize trip driving time delay.

In this illustration, drivers that prefer to minimize off-route delay would use said Off-Route Path 26h1 in both directions for a total of 40 minutes. Then Driver 26a2 continues along said Driver Route 26a1 on said Route Segment 26g5 to said Route Intersection 26c4 for an additional 5 minutes driving time, totaling 45 minutes.

Drivers that prefer to minimize trip driving time delay would drive to said Off-Route Event 26c1 using said Off-Route Path 26h1 (20 minutes driving time), but would return to said Driver Route 26a1 at said Intersection 26c4 using said Off-Route Path 26i1 (21 minutes driving time) for a total driving time delay of 41 minutes (said Route Segment 26g5 not used).

It will be recognized by those skilled in the art that common geographic coordinate area search routines, which can be used to identify applicable route intersections and minimum impedance algorithms and methodologies that generate a minimum impedance (e.g. driving time) "tree" to identify a specific road intersection using applicable road network segments can be easily adapted for used in accordance with the present Invention to assist in identifying minimum off-route driving time and/or minimum total driving time to and from an off-route event.

Figure 27:
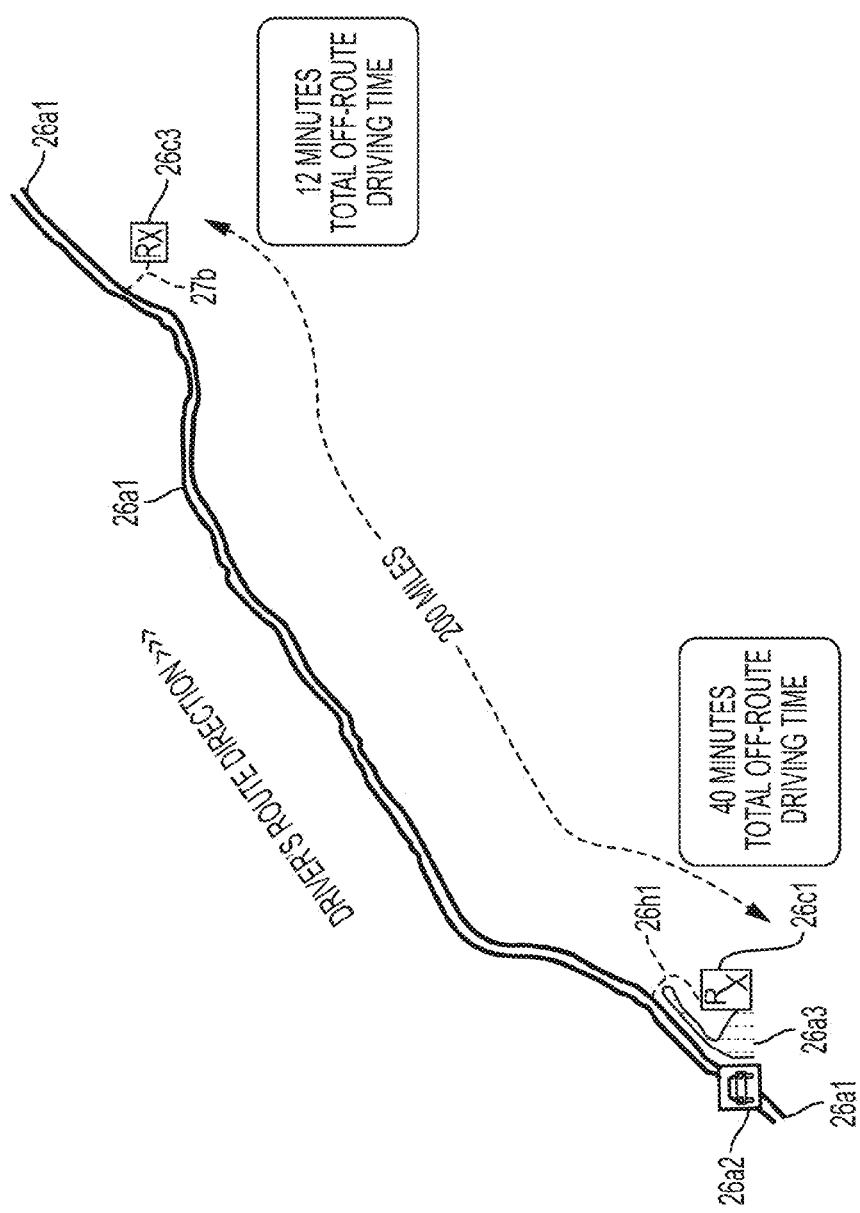
FIG. 27 illustrates driving times to different events, one located in the vicinity of the driver's current position, and a similar event further along the driver's route with less off-route driving time in accordance with the present Invention.

FIG. 27 illustrates an important aspect of a driver being informed of comparative off-route driving time to similar off-route events. As shown, the driver is currently positioned on said Driver Route 26a1 at said Driver Position 26a2. Besides being informed of said Off-Route Path 26h1 to access said Off-Route Event 26c1, the driver is also informed of a similar said Off-Route Event 26c3 some distance ahead along said Driver Route 26a1 that has only a relatively short driving time Off-Route Path 27b. Being so informed, the driver is in a better position to consider the nature of the need at hand.

In this example: Should the driver be in urgent need for drugstore items, the driver may choose to absorb the trip delay to drive to said Off-Route Event 26c1. Should the driver need to have a prescription filled, the total trip delay time could be hours longer if the driver still needs to contact his/her personal doctor to authorize the prescription, and to wait for the prescription to be filled.

If a prescription is needed, being aware there is a second drugstore a few hours ahead, the driver may choose to avoid the potentially long trip delay that could be incurred to drive to said Off-Route Event 26c1, and instead use Off-Route Path 27b drive to said Off-Route Event 26c3. Furthermore, while proceeding to said Off-Route Event 26c3 along the planned trip route, the driver can contact his/her personal doctor to have the medical authorization sent to said Off-Route Event 26c3 to have the prescription prepared and ready for pickup when the driver arrives, thus significantly reducing overall trip time delay.

It is perhaps worthwhile to note here that said Off-Route Event 26c2 was not included in the illustrations of FIG. 27 because its off-route driving time exceeded the driver preferences threshold, even though it was geographically located within the said Event Search Corridor 26b1.

Figure 28:
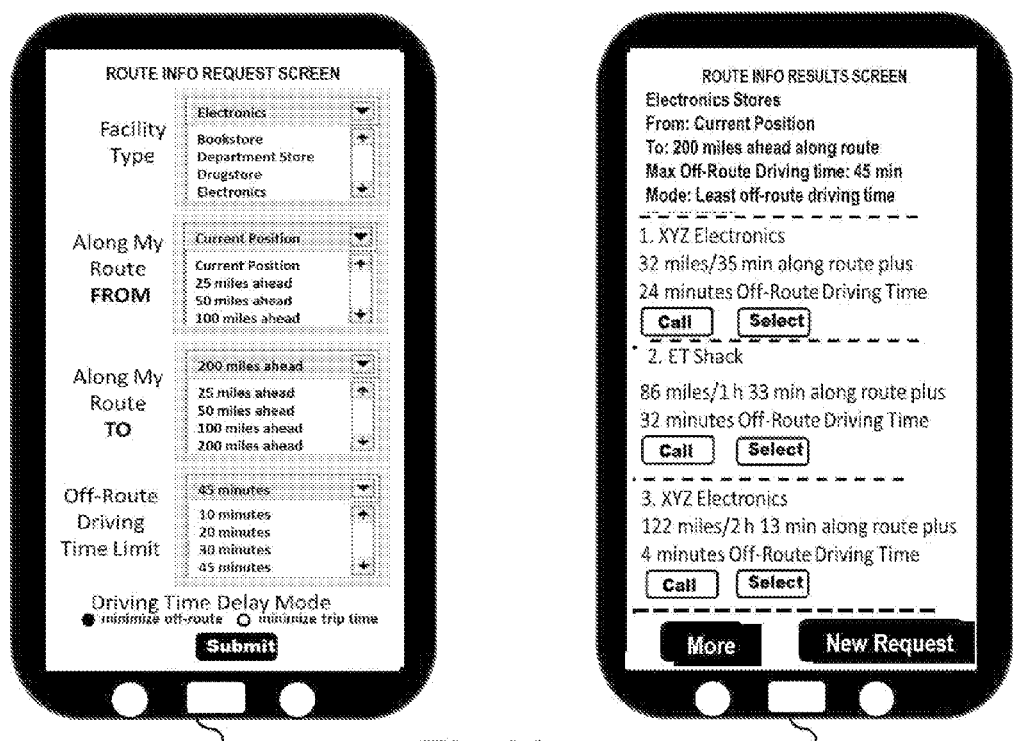
FIG. 28 illustrates a rendering of a smartphone device with driver event request and request results screens in accordance with the present Invention.

FIG. 28 illustrates a rendering of a smartphone device that a driver could utilize to interact with DSNS 2200 or 2300 to utilize the features of the present Invention. Screen 28a displays exemplary driver request preferences: type of facility event, starting and stopping points along the driver's route for the event search, maximum off-route driving time, and whether preference is to minimize off-route driving time or to minimize trip delay. Screen 28b displays exemplary results of the Screen 28a request preferences.

The present Invention provides a technique for drivers to inquire and to be informed of only those events that are germane to individual trip routes and preferences, and in doing so, avoids unnecessary delays in vehicle trip driving time, and becomes a major basis for developing useful highway travel strategies.

As described in detail above, the present Invention provides improvements not found in the previously proposed methodologies. For example, the present Invention provides an improved technique for generating and interrelating multiple types of trip routing information. It also provides a technique for confining traveler notification of events to only those that are germane to individual trip routes and interests. It also provides a technique for informing travelers of transitory events that occur along their travel route. It also provides an improved technique which facilitates the consistent delivery of relevant and useful information to a traveler in a timely and efficient manner. The present Invention also provides a technique for drivers to inquire and to be informed of distances and driving times to preferred events that are located ahead or in the vicinity of their individual trip routes, and in doing so, avoids unnecessary delays in vehicle trip driving time.

I claim:

1. A system for determining whether to notify a traveler of events proximate to a travel path, comprising:
   a global positioning receiver to obtain a current travel position of user;
   a user data store configured to store, an identifier of the user in association with (i) contact information for contacting the user while traveling and (ii) a user in-route travel path including geographic coordinates defining a start point and an end point of each of multiple contiguous segments between a start location and an end location of the user in-route travel path;
   an event data store configured to store, for each of multiple events, an event identifier in association with (i) a description of the applicable event and (ii) geographic coordinates defining a location of the applicable event;
   a processor configured to:
   receive, from the user, a description of an event of interest to the user, and geographic coordinates of a current travel location of the user along the stored user in-route travel path,
   establish, based on the received geographic coordinates of the user's current travel location, an event search area for searching for events of interest to the user, including a maximum off-route crow-fly distance from the stored user in-route travel path,
   determine that one or more of the multiple events identified by the stored event identifiers is of interest to the user, based on the received event description, the established event search area, the stored descriptions of the multiple events, and the stored geographic coordinates of the multiple event locations,
   determine each of the off-route travel paths that connects each of the determined one or more events to the stored user in-route travel path;
   compute, for each of the determined off-route travel paths, (i) an off-route driving time from the stored user in-route travel path to the applicable determined event, and (ii) an off-route driving time from the applicable determined event to the stored user in-route travel path,
   compute for each of the determined one or more events, based on the computed off-route driving time for each of the determined off-route travel paths, a total in-route and off-route driving time to go from the stored user in-route travel path to the applicable determined event and from the applicable determined event to the stored user in-route travel path,
   determine, based on a total driving time to go from the user's current travel location to the applicable determined event, events that will expire or events that will be closed upon the user's arrival based on the total driving time;
   identify, for each of the determined one or more events, excluding the events that will expire or the events that will close, the one of the determined off-route travel paths connecting the stored user in-route travel path to the applicable determined event that has a minimum computed off-route driving time to go from the stored user in-route travel path to the applicable determined event and from the applicable determined event to the stored in-route travel path,
   identify, for each of the determined one or more events, the one or more of the determined off-route travel paths connecting the stored user in-route travel path to the applicable determined event that has a minimum computed total in-route and off-route driving time to go from the stored user in-route travel path to the applicable determined event and from the applicable determined event to the stored user in-route travel path, and
   direct transmission to the user in accordance with the stored user contact information, for each of the determined one or more events, at least one of (i) the minimum computed off-route driving time and the identified off-route travel path having the minimum computed off-route driving time, and (ii) the minimum computed total in-route and off-route driving time and the identified one or more off-route travel paths having the minimum computed total in-route and off-route driving time.

2. The system in accordance with claim 1, wherein the identified one or more off-route travel paths having the minimum computed total in-route and off-route driving time excluding expired or closed events at user arrival time are a first off-route travel path for going from the stored user in-route travel path to that event and a different second off-route travel path for going from that event to the stored user in-route travel path.

3. The system in accordance with claim 2, wherein the first and the second off-route travel paths are partially overlapping.

4. The system in accordance with claim 1, wherein the maximum off-route crow-fly distance included in the established search area is a distance extending out from both sides of the user in-route travel path in a direction substantially perpendicular thereto.

5. The system in accordance with claim 1, wherein:
the processor is further configured to (i) receive, from the user, a maximum off-route driving time to event value, excluding expired or closed events at user arrival time and (ii) determine a crow-fly distance based on the received maximum off-route driving time to event value; and
the maximum crow-fly distance included in the established search area is based on the determined crow-fly distance.

6. The system in accordance with claim 1, wherein:
the processor is further configured to:
receive, from the user, at least one of (a) a minimum travel distance value for travel along the user in-route travel path from the received geographic coordinates of the user's current travel location to the event of interest, and (b) a maximum travel distance value for travel along the user in-route travel path from the received geographic coordinates of the user's current travel location to the event of interest,
determine based on the received minimum travel distance value, if the minimum travel distance value is received from the user, a start search area distance extending from the received geographic coordinates of the user's current travel location along the user in-route travel path, and
determine based on the received maximum travel distance value, if the maximum travel distance value is received from the user, an end search area distance extending from the received geographic coordinates of the user's current travel location along the user in-route travel path; and
the established search area (i) begins at the determined start search area distance from the received geographic coordinates of the user's current travel location along the user in-route travel path, if the minimum travel distance value is received, and (ii) ends at the determined end search area distance from the received geographic coordinates of the user's current travel location along the user in-route travel path if the maximum travel distance value is received.

7. The system in accordance with claim 1, wherein:
the processor is further configured to:
receive, from the user, at least one of (a) a minimum travel time value for travel along the user in-route travel path from the received geographic coordinates of the user's current travel location to the event of interest, and (b) a maximum travel time value for travel along the user in-route travel path from the received geographic coordinates of the user's current travel location to the event of interest excluding expired or closed events at user arrival time,
determine based on the received minimum travel time value, if the minimum travel time value is received from the user, a start search area distance extending from the received geographic coordinates of the user's current travel location along the user in-route travel path, and
determine based on the received maximum travel time value, if the maximum travel time value is received from the user, an end search area distance extending from the received geographic coordinates of the user's current travel location along the user in-route travel path; and
the established search area (i) begins at the determined start search area distance from the received geographic coordinates of the user's current travel location along the user in-route travel path, if the minimum travel time value is received, and (ii) ends at the determined end search area distance from the received geographic coordinates of the user's current travel location along the user in-route travel path, if the maximum travel time value is received.

8. The system in accordance with claim 1, wherein:
the crow-fly distance included in the search area is also establish based on a predetermined maximum speed limit of the user in-route travel path.

9. The system in accordance with claim 1, wherein:
the processor is further configured to (i) receive, from the user, a threshold route distance to event parameter, (ii) compute a route distance between the identified closest offset event location and the identified closest offset user location, and (iii) compare the received threshold route distance to the computed route distance; and
the processor determines if the user is to be notified of the event based also on a result of the comparison.

10. The system in accordance with claim 9, wherein:
the processor is further configured to (i) determine, based on the received description of an event, a threshold route distance to event parameter, (ii) compute a route distance between the identified closest offset event location and the identified closest offset user location, (iii) and compare the determined threshold route distance to the computed route distance; and
the processor determines if the user is to be notified of the event based also on a result of the comparison.

11. The system in accordance with claim 9, wherein:
the processor is further configured to (i) receive, from the user, a threshold proximity distance, (ii) compute an offset distance between the identified closest offset event location and the event location, and (iii) compare the received threshold proximity distance to the computed offset distance; and
the processor determines if the user is to be notified of the event based also on a result of the comparison.

12. The system in accordance with claim 9, wherein:
the processor is further configured to (i) determine, based on the received description of an event, a threshold proximity distance, (ii) compute an offset distance between the identified closest offset event location and the event location, (iii) and compare the received threshold proximity distance to the computed offset distance; and
the processor determines if the user is to be notified of the event based also on a result of the comparison.

13. A method for determining whether to notify a traveler of events proximate to a travel path, comprising:
obtaining a current travel position of a user using a global positioning receiver;
receiving, from the user, (i) a description of an event of interest to the user, and (ii) a current travel location of the user along a user in-route travel path;
establishing, based on the received users current travel location, an event search area for searching for events of interest to the user, including a maximum off-route crow-fly distance from a user in-route travel path;
determining one or more of multiple events of interest to the user, based on the received event description, the established event search area, known descriptions of the multiple events, and known locations of the multiple events;

determining each of the off-route travel paths that connects each of the determined one or more events to the user in-route travel path;

computing, for each of the determined off-route travel paths, (i) an off-route driving time from the user in-route travel path to the applicable determined event excluding expired or closed events at user arrival time and (ii) an off-route driving time from the applicable determined event to the user in-route travel path;

computing for each of the determined one or more events, based on the computed off-route driving time for each of the determined off-route travel paths, a total in-route and off-route driving time to go from the user in-route travel path to the applicable determined event and from the applicable determined event to the user in-route travel path;

determining, based on a total driving time to go from the user's current travel location to the applicable determined event, events that will expire or events that will be closed upon the user's arrival based on the total driving time;

identifying, for each of the determined one or more events based on the computed off-route driving times, excluding the events that will expire or the events that will close, the one determined off-route travel path connecting the user in-route travel path to the applicable determined event that has a minimum computed off-route driving time to go from the user in-route travel path to the applicable determined event and from the applicable determined event to the in-route travel path;

identifying, for each of the determined one or more events based on the computed total in-route and off-route driving times, the one or more of the determined off-route travel paths connecting the user in-route travel path to the applicable determined event that has a minimum computed total in-route and off-route driving time to go from the user in-route travel path to the applicable determined event and from the applicable determined event to the user in-route travel path; and notifying the user, for each of the determined one or more events, at least one of (i) the minimum computed off-route driving time and the identified off-route travel path having the minimum computed off-route driving time, and (ii) the minimum computed total in-route and off-route driving time and the identified one or more off-route travel paths having the minimum computed total in-route and off-route driving time.

14. The method in accordance with claim 13, further comprising:

receiving, from the user, a maximum off-route driving time to event value excluding expired or closed events at user arrival time;

determining a crow-fly distance based on the received maximum off-route driving time to event value; and wherein the maximum crow-fly distance included in the established search area is based on the determined crow-fly distance.

15. The method in accordance with claim 13, further comprising:

receiving, from the user, at least one of (a) a minimum travel distance value for travel along the user in-route travel path from the received user current travel location to the event of interest, and (b) a maximum travel distance value for travel along the user in-route travel path from the received user current travel location to the event of interest;

determining based on the received minimum travel distance value, if the minimum travel distance value is received from the user, a start search area distance extending from the received user current travel location along the user in-route travel path; and determining based on the received maximum travel distance value, if the maximum travel distance value is received from the user, an end search area distance extending from the received user current travel location along the user in-route travel path; and wherein the established search area (i) begins at the determined start search area distance from the received user current travel location along the user in-route travel path, if the minimum travel distance value is received, and (ii) ends at the determined end search area distance from the received user current travel location along the user in-route travel path if the maximum travel distance value is received.

16. The method in accordance with claim 13, further comprising:

receiving, from the user, at least one of (a) a minimum travel time value for travel along the user in-route travel path from the received user current travel location to the event of interest, excluding expired or closed events at user arrival time, and (b) a maximum travel time value for travel along the user in-route travel path from the received user current travel location to the event of interest;

determining based on the received minimum travel time value, if the minimum travel time value is received from the user, a start search area distance extending from the received user current travel location along the user in-route travel path; and determining based on the received maximum travel time value, if the maximum travel time value is received from the user, an end search area distance extending from the received user current travel location along the user in-route travel path; and wherein the established search area (i) begins at the determined start search area distance from the received user current travel location along the user in-route travel path, if the minimum travel time value is received, and (ii) ends at the determined end search area distance from the received user current travel location along the user in-route travel path, if the maximum travel time value is received.

17. The method in accordance with claim 13, further comprising:

receiving, from the user, a threshold route distance to event parameter;

computing a route distance between the identified closest offset event location and the identified closest offset user location;

comparing the received threshold route distance to the computed route distance; wherein determining if the user is to be notified of the event is based also on a result of the comparison.

18. The method in accordance with claim 17, further comprising:

determining, based on the received description of an event, a threshold route distance to event parameter;

computing a route distance between the identified closest offset event location and the identified closest offset user location;

comparing the determined threshold route distance to the computed route distance;
wherein determining if the user is to be notified of the event is based also on a result of the comparison.

19. The method in accordance with claim 17, further comprising: receiving, from the user, a threshold proximity distance;
computing an offset distance between the identified closest offset event location and the event location; and
comparing the received threshold proximity distance to the computed offset distance;
wherein determining if the user is to be notified of the event is based also on a result of the comparison.

20. The method in accordance with claim 17, further comprising:
determining, based on the received description of an event, a threshold proximity distance;
computing an offset distance between the identified closest offset event location and the event location; and
comparing the received threshold proximity distance to the computed offset distance;
wherein determining if the user is to be notified of the event is based also on a result of the comparison.

21. An article of manufacture for determining whether to notify a traveler of events proximate to a travel path, comprising:
a global positioning receiver to obtain a current travel position of a user;
non transitory storage media; and
logic stored on the storage media, wherein the stored logic is configured to be executable by a processor and thereby cause the processor to operate so as to:
receive, from the user, (i) a description of an event of interest to the user, and (ii) a current travel location of the user along a user in-route travel path;
establish, based on the received user current travel location, an event search area for searching for events of interest to the user, including a maximum off-route crow-fly distance from a user in-route travel path;
determine one or more of multiple events of interest to the user, based on the received event description, the established event search area, known descriptions of the multiple events, and known locations of the multiple events;
determine each of the off-route travel paths that connects each of the determined one or more events to the user in-route travel path;
compute, for each of the determined off-route travel paths, (i) an off-route driving time from the user in-route travel path to the applicable determined event, excluding expired or closed events at user arrival time, and (ii) an off-route driving time from the applicable determined event to the user in-route travel path;
compute for each of the determined one or more events, based on the computed off-route driving time for each of the determined off-route travel paths, a total in-route and off-route driving time to go from the user in-route travel path to the applicable determined event and from the applicable determined event to the user in-route travel path;
determining, based on a total driving time to go from the user's current travel location to the applicable determined event, events that will expire or events that will be closed upon the user's arrival based on the total driving time;
identify, for each of the determined one or more events based on the computed off-route driving times, excluding the events that will expire or the events that will close, the one determined off-route travel path connecting the user in-route travel path to the applicable determined event that has a minimum computed off-route driving time to go from the user in-route travel path to the applicable determined event and from the applicable determined event to the in-route travel path;
identify, for each of the determined one or more events based on the computed total in-route and off-route driving times, the one or more of the determined off-route travel paths connecting the user in-route travel path to the applicable determined event that has a minimum computed total in-route and off-route driving time to go from the user in-route travel path to the applicable determined event and from the applicable determined event to the user in-route travel path; and
direct transmission to the user, for each of the determined one or more events, at least one of (i) the minimum computed off-route driving time and the identified off-route travel path having the minimum computed off-route driving time, and (ii) the minimum computed total in-route and off-route driving time and the identified one or more off-route travel paths having the minimum computed total in-route and off-route driving time.

22. The article of manufacture in accordance with claim 21, wherein the identified one or more off-route travel paths having the minimum computed total in-route and off-route driving time are a first off-route travel path for going from the user in-route travel path to that event and a different second off-route travel path for going from that event to the user in-route travel path.

23. The article of manufacture in accordance with claim 22, wherein the first and the second off-route travel paths are partially overlapping.

24. The article of manufacture in accordance with claim 21, wherein the maximum off-route crow-fly distance included in the established search area is a distance extending out from both sides of the user in-route travel path in a direction substantially perpendicular thereto.

25. The article of manufacture in accordance with claim 21, wherein:
execution of the stored logic also causes the processor to operate so as to (i) receive, from the user, a maximum off-route driving time to event value, excluding expired or closed events at user arrival time, and (ii) determine a crow-fly distance based on the received maximum off-route driving time to event value; and
the maximum crow-fly distance included in the established search area is based on the determined crow-fly distance.

26. The article of manufacture in accordance with claim 21, wherein:
execution of the stored logic also causes the processor to operate so as to (i) receive, from the user, at least one of (a) a minimum travel distance value for travel along the user in-route travel path from the received user current travel location to the event of interest, and (b) a maximum travel distance value for travel along the user in-route travel path from the received user current travel location to the event of interest, (ii) determine based on the received minimum travel distance value, if the minimum travel distance value is received from the user, a start search area distance extending from the received user current travel location along the user in-route travel path, and (iii) determine based on the received maximum travel distance value, if the maximum travel distance value is received from the user, an end search area distance extending from the received user current travel location along the user in-route travel path; and the established search area (i) begins at the determined start search area distance from the received user current travel location along the user in-route travel path, if the minimum travel distance value is received, and (ii) ends at the determined end search area distance from the received user current travel location along the user in-route travel path if the maximum travel distance value is received.

27. The article of manufacture in accordance with claim 21, wherein:

execution of the stored logic also causes the processor to operate so as to (i) receive, from the user, at least one of (a) a minimum travel time value for travel along the user in-route travel path from the received user current travel location to the event of interest, excluding expired or closed events at user arrival time, and (b) a maximum travel time value for travel along the user in-route travel path from the received user current travel location to the event of interest, (ii) determine based on the received minimum travel time value, if the minimum travel time value is received from the user, a start search area distance extending from the received user current travel location along the user in-route travel path, and (iii)

determine based on the received maximum travel time value, if the maximum travel time value is received from the user, an end search area distance extending from the received user current travel location along the user in-route travel path; and the established search area (i) begins at the determined start search area distance from the received user current travel location along the user in-route travel path, if the minimum travel time value is received, and (ii) ends at the determined end search area distance from the received user current travel location along the user in-route travel path, if the maximum travel time value is received.

28. The article of manufacture in accordance with claim 21, wherein:

the crow-fly distance included in the search area is also establish based on a predetermined maximum speed limit of the user in-route travel path.

29. The article of manufacture in accordance with claim 21, wherein execution of the stored logic thereby causes the processor to operate so as to also:

receive, from the user, a threshold route distance to event parameter;

compute a route distance between the identified closest offset event location and the identified closest offset user location;

compare the received threshold route distance to the computed route distance; wherein determining if the user is to be notified of the event is based also on a result of the comparison.

30. The article of manufacture in accordance with claim 29, wherein execution of the stored logic thereby causes the processor to operate so as to also:

determine, based on the received description of an event, a threshold route distance to event parameter;

compute a route distance between the identified closest offset event location and the identified closest offset user location;

compare the determined threshold route distance to the computed route distance;

wherein determining if the user is to be notified of the event is based also on a result of the comparison.

31. The article of manufacture in accordance with claim 29, wherein execution of the stored logic thereby causes the processor to operate so as to also:

receive, from the user, a threshold proximity distance;

compute an offset distance between the identified closest offset event location and the event location; and compare the received threshold proximity distance to the computed offset distance;

wherein determining if the user is to be notified of the event is based also on a result of the comparison.

32. The article of manufacture in accordance with claim 29, wherein execution of the stored logic thereby causes the processor to operate so as to also:

determine, based on the received description of an event, a threshold proximity distance;

compute an offset distance between the identified closest offset event location and the event location; and compare the received threshold proximity distance to the computed offset distance;

wherein determining if the user is to be notified of the event is based also on a result of the comparison.

* * * * *